United States Patent
Zhao et al.

(10) Patent No.: US 10,841,593 B2
(45) Date of Patent: Nov. 17, 2020

(54) INTRA PREDICTION AND INTRA MODE CODING

(71) Applicant: QUALCOMM Incorporated, San Diego, CA (US)

(72) Inventors: Xin Zhao, San Diego, CA (US); Jianle Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 15/184,051

(22) Filed: Jun. 16, 2016

(65) Prior Publication Data

US 2016/0373769 A1 Dec. 22, 2016

Related U.S. Application Data

(60) Provisional application No. 62/181,744, filed on Jun. 18, 2015, provisional application No. 62/192,310, filed on Jul. 14, 2015.

(51) Int. Cl.
*H04N 19/176* (2014.01)
*H04N 19/182* (2014.01)
(Continued)

(52) U.S. Cl.
CPC .......... *H04N 19/176* (2014.11); *H04N 19/11* (2014.11); *H04N 19/117* (2014.11);
(Continued)

(58) Field of Classification Search
CPC .... H04N 19/176; H04N 19/593; H04N 19/11; H04N 19/159; H04N 19/70; H04N 19/463; H04N 19/103; G06T 9/004
(Continued)

(56) References Cited

U.S. PATENT DOCUMENTS 8,750,378 B2   6/2014   Karczewicz et al.
9,008,175 B2   4/2015   Van et al.
(Continued)

FOREIGN PATENT DOCUMENTS

CN   102668569 A   9/2012
CN   102857750 A   1/2013
(Continued)

OTHER PUBLICATIONS

D. Y. Kim, D. K. Kim, and Y. L. Lee, "A New Method for Estimating Intra Prediction Mode in H.264/AVC", IEICE Trans. Fund.s of Electron., Commun. and Computer Scienc., vol. E91-A, Jun. 2008, pp. 1529-1532 (Year: 2008).*
(Continued)

*Primary Examiner* — Daniel Chang
(74) *Attorney, Agent, or Firm* — Campbell C. Chiang; Shumaker & Sieffert, P.A.

(57) ABSTRACT

A device includes one or more processors configured to derive M most probable modes (MPMs) for intra prediction of a block of video data. As part of deriving the M most probable modes, the one or more processors define a representative intra prediction mode for a left neighboring column and use the representative intra prediction mode for the left neighboring column as an MPM for the left neighboring column, and/or define a representative intra prediction mode for an above neighboring row and use the representative intra prediction mode for the above neighboring row as an MPM for the above neighboring row. A syntax element that indicates whether an MPM index or a non-MPM index is used to indicate a selected intra prediction mode for intra prediction of the block is decoded. The one or more processors reconstruct the block based on the selected intra prediction mode.

10 Claims, 20 Drawing Sheets

(51) Int. Cl.
H04N 19/117 (2014.01)
H04N 19/59 (2014.01)
H04N 19/593 (2014.01)
H04N 19/82 (2014.01)
H04N 19/136 (2014.01)
H04N 19/463 (2014.01)
H04N 19/11 (2014.01)
H04N 19/124 (2014.01)
H04N 19/174 (2014.01)
H04N 19/513 (2014.01)

(52) U.S. Cl.
CPC ......... *H04N 19/124* (2014.11); *H04N 19/136* (2014.11); *H04N 19/174* (2014.11); *H04N 19/182* (2014.11); *H04N 19/463* (2014.11); *H04N 19/513* (2014.11); *H04N 19/59* (2014.11); *H04N 19/593* (2014.11); *H04N 19/82* (2014.11)

(58) Field of Classification Search
USPC .......................... 375/240.02, 240.08, 240.12
See application file for complete search history.

(56) References Cited

U.S. PATENT DOCUMENTS

| | | | |
|---|---|---|---|
| 9,654,785 | B2 | 5/2017 | Chien et al. |
| 10,070,126 | B2 | 9/2018 | Guo et al. |
| 2012/0106640 | A1 | 5/2012 | Shen et al. |
| 2012/0183041 | A1 | 7/2012 | Maani |
| 2013/0022115 | A1 | 1/2013 | Oh et al. |
| 2013/0034153 | A1 | 2/2013 | Song et al. |
| 2013/0094581 | A1 | 4/2013 | Tanizawa et al. |
| 2013/0107949 | A1 | 5/2013 | Sim et al. |
| 2013/0114707 | A1* | 5/2013 | Seregin .............. H04N 19/11 375/240.12 |
| 2013/0259117 | A1 | 10/2013 | Fu et al. |
| 2013/0266064 | A1 | 10/2013 | Zhang et al. |
| 2013/0272380 | A1 | 10/2013 | Chien et al. |
| 2014/0079122 | A1 | 3/2014 | Kondow |
| 2014/0086323 | A1 | 3/2014 | Chuang et al. |
| 2014/0119439 | A1* | 5/2014 | Guo ............... H04N 19/70 375/240.12 |
| 2014/0133565 | A1 | 5/2014 | Lee et al. |
| 2014/0219334 | A1 | 8/2014 | Park |
| 2015/0078438 | A1* | 3/2015 | Lim ............... H04N 19/182 375/240.02 |
| 2015/0098505 | A1 | 4/2015 | Oh et al. |
| 2016/0373741 | A1 | 12/2016 | Zhao et al. |
| 2016/0373742 | A1 | 12/2016 | Zhao et al. |
| 2016/0373743 | A1 | 12/2016 | Zhao et al. |
| 2016/0373770 | A1 | 12/2016 | Zhao et al. |
| 2016/0373782 | A1 | 12/2016 | Zhao et al. |
| 2017/0251224 | A1 | 8/2017 | Lee et al. |
| 2018/0255304 | A1 | 9/2018 | Jeon et al. |

FOREIGN PATENT DOCUMENTS

| | | |
|---|---|---|
| CN | 102918844 A | 2/2013 |
| CN | 103248892 A | 8/2013 |
| CN | 103283222 A | 9/2013 |
| CN | 103636203 A | 3/2014 |
| CN | 103636220 A | 3/2014 |
| CN | 104170379 A | 11/2014 |
| CN | 104320666 A | 1/2015 |
| CN | 104378645 A | 2/2015 |
| CN | 104702962 A | 6/2015 |
| EP | 2773118 A1 | 9/2014 |
| JP | 2006081156 A | 3/2006 |
| JP | 2013058939 A | 3/2013 |
| JP | 2013090120 A | 5/2013 |
| JP | 2014501090 A | 1/2014 |
| JP | 2014520476 A | 8/2014 |
| JP | 2014523187 A | 9/2014 |
| JP | 2014523697 A | 9/2014 |
| JP | 2014528670 A | 10/2014 |
| JP | 2014530556 A | 11/2014 |
| KR | 20140129423 A | 11/2014 |
| KR | 20150034699 A | 4/2015 |
| WO | 2009004985 A1 | 1/2009 |
| WO | 2010039492 A2 | 4/2010 |
| WO | 2012044886 A1 | 4/2012 |
| WO | 2012173315 A1 | 12/2012 |
| WO | 2013000324 A1 | 1/2013 |
| WO | 2013051903 A1 | 4/2013 |
| WO | 2013067334 A2 | 5/2013 |
| WO | 2013105622 A1 | 7/2013 |
| WO | 2015000168 A1 | 1/2015 |
| WO | 2017084628 A1 | 5/2017 |
| WO | 2018063886 A1 | 4/2018 |

OTHER PUBLICATIONS

Yeo et al., "Non-CE6: on Intra Prediction Mode Coding," JTC1/SC29/WG11, 7th Meeting, JCTVC-G153, m21706, Nov. 21-30, 2011, 12 pages, XP030110137.

Response to Written Opinion dated Aug. 17, 2016, from International Application No. PCT/US2016/038132, filed on Apr. 14, 2017, 27 pp.

Second Written Opinion from International Preliminary Report on Patentability from International Application No. PCT/US2016/038132, dated May 23, 2017, 8 pp.

International Preliminary Report on Patentability from International Application No. PCT/US2016/038132, dated Sep. 19, 2017, 8 pp.

Chen et al., "Further Improvements to HMKTA-1.0," VCEG meeting, Jun. 19-26, 2015, Warsaw, PO (Video Coding Experts Group of ITU-T SG.16), No. VCEG-AZ07, Jun. 19, 2015, 8 pp.

Chuang et al., "CE6b: Intra prediction mode coding," JCT-VC Meeting; MPEG Meeting; Nov. 21-30, 2011; Geneva, CH (Joint Collaborative Team on Video Coding of ISO/IEC JTC1/SC29/WG11 and ITU-T SG.16), URL: http://wftp3.itu.int/av-arch/jctvc-site/, No. JCTVC-G203, Nov. 7, 2011, 6 pp.

Cohen et al., "Non-CE6: Coding of luma intra prediction modes that are not in the MPM set," Nov. 21-30, 2011; Document: JCTVC-G359_r2, WG11 No. m21921, Joint Collaborative Team on Video Coding (JCT-VC) of ITU-T SG16 WP3 and ISO/IEC JTC1/SC29N/WG11, 7th Meeting: Geneva, CH, Feb. 15, 2013; 13 pp.

Liang et al., "A Light-weight HEVC Encoder for Image Coding," 2013 Visual Communications and Image Processing (VCIP), IEEE, Nov. 17, 2013; 5 pp.

H.264 Prediction; "Chapter 6" In: Iain E. Richardson: "The H.264 Advanced Video Compression Standard, 2nd Edition," Apr. 20, 2010, Wiley, XP030001637, pp. 137-177.

Lainema et al., "Chapter 4 Intra-Picture Prediction in HEVC," In: "High Efficiency Video Coding (HEVC)," Aug. 2014, Springer International Publishing, XP055292569, vol. 29, pp. 91-112.

Lehmann et al., "Survey: Interpolation Methods in Medical Image Processing," IEEE Transactions on Medical Imaging, IEEE Service Center, Piscataway, NJ, US, vol. 18, No. 11, Nov. 1999, pp. 1049-1075.

Matsuo et al., "Improved Intra Angular Prediction by DCT-Based Interpolation Filter," IEEE Proceedings of the 20th European Signal Processing Conference (EUSIPCO), Aug. 27, 2012; pp. 1568-1572.

Zhu et al., "Fast Intra-prediction mode decision algorithm for high efficieny video coding," 2014 9th IEEE Conference on Industrial Electronics and Applications, IEEE, Jun. 9, 2014, pp. 936-939.

Vatis et al., "Two-dimensional non-separable adaptive Wiener Interpolation Filter for H.264/AVC," MPEG Meeting, Apr. 18-22, 2005; (Motion Picture Expert Group or ISO/IEC JTC1/SC29/WG11), No. M11845, Apr. 29, 2005; 6 pp.

Zhao et al., "Fast Mode Decision Algorithm for Intra Prediction in HEVC," Visual Communications and Image Rocessing (VCIP), 2011 IEEE, IEEE, Nov. 6, 2011; 4 pp.

ITU-T H.265, Series H: Audiovisual and Multimedia Systems, Infrastructure of audiovisual services—Coding of moving video,

(56) References Cited

OTHER PUBLICATIONS

Advanced video coding for generic audiovisual services, The International Telecommunication Union. Apr. 2015, 634 pp.
Wang et al., "High Efficiency Video Coding (HEVC) Defect Report," JCT-VC Meeting; Joint Collaborative Team on Video Coding (JCT-VC) of ITU-T SG16 WP3 and ISO/IEC JTC1/SC29/WG11, Jul. 25-Aug. 2, 2013, document No. JCTVC-N1003_v1; Sep. 27, 2013; 312 pp.
Guo et al., "Improved Intra Mode Coding," JCT-VC Meeting; Joint Collaborative Team on Video Coding (JCT-VC) of ITU-T SG16 WP3 and ISO/IEC JTC1/SC29/WG11, Jan. 20-28, 2011; No. JCTVC-D166, Jan. 23, 2011; 7 pp.
International Search Report and Written Opinion from International Application No. PCT/US2016/038132, dated Aug. 17, 2016, 17 pp.
Chen et al., "Further Improvements to HMKTA-1.0," VCEG meeting, Jun. 19-26, 2015, Warsaw, PO (Video Coding Experts Group of ITU-T SG.16), No. VCEG-AZ07_v2, 9 pp.
Matsuo Y., et al., "Video Coding of 8K UHDTV by HEVC/H.265 With Spatio-Gradational Reduction and Its Restoration", Picture Coding Symposium (PCS), May 31-Jun. 3, 2015, pp. 40-44, ISBN: 978-1-4799-7783-3.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668, ISSN: 1051-8215, DOI: 10.1109/TCSVT.2012.2221191 the whole document.
Office Action from U.S. Appl. No. 15/184,033, dated Apr. 12, 2018, 52 pp.
Office Action from U.S. Appl. No. 15/184,067, dated Apr. 13, 2018, 41 pp.
Office Action from U.S. Appl. No. 15/184,089, dated Apr. 12, 2018, 40 pp.
Lainema J., et al., "Infra Coding of the HEVC Standard", IEEE Transactions on Circuits and Systems for Video Technology, Institute of Electrical and Electronics Engineers, USA, vol. 22, No. 12, Dec. 1, 2012 (Dec. 1, 2012), XP011487148, pp. 1792-1801.
Sze., et al., "High Efficiency Video Coding (HEVC): algorithms and architectures", pp. 91-112, ISSN 1558-9412, Springer-2014 (Year: 2014).
Response to Non-Final Office Action dated Apr. 12, 2018 filed Jul. 12, 2018 in U.S. Appl. No. 15/184,033, 18 pp.
Response to Non-Final Office Action dated Apr. 13, 2018 filed Jul. 12, 2018 in U.S. Appl. No. 15/184,067, 17 pp.
Response to Non-Final Office Action dated Apr. 12, 2018 filed Jul. 12, 2018 in U.S. Appl. No. 15/184,089, 15 pp.
Lee S-H., et al., "Fast Intra Prediction Mode Decision based on Rough Mode Decision and Most Probable Mode in HEVC", JBE vol. 19, No. 2, Mar. 2014, 8 pages.
Yinhe Z., et al. "A MPM based Fast Mode Decision Algorithm for Intra Prediction in HEVC", Oct. 31, 2013, pp. 1-7.
Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_used/documents/10_SanDiego/wg11/JVET-J1002-v2.zip.
Chen J., et al., "Algorithm Description of Joint Exploration Test Model 7 (JEM7)", JVET-G1001-V1, Joint Video Exploration Team (JVET)of ITU-T SG 16 WP 3 and ISO/IEC JTC 1/SC 291WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2.
International Search Report and Written Opinion—PCT/US2019/040306—ISA/EPO—dated Sep. 26, 2019.
Iwamura S., et al., "Description of SDR and HDR video coding technology proposal by NHK and Sharp", 10. JVET Meeting; Oct. 4, 2018—Oct. 4, 2018; San Diego; (The Joint Video Exploration Team of ISO/IEC JTC1/SC29/WG11 and ITU-T SG.16 ); URL:http://Phenix.Int-Evry.FR/JVET/ No. JVET-J0027, Apr. 2, 2018 (Apr. 2, 2018), KP030151195, 40 pages, Section 2.1.8 Intra Prediction.
Koo M., et al., "Description of SDR video coding technology proposal by LG Electronics", 10. JVET Meeting; Oct. 4, 2018—Oct. 20, 2018; San Diego; (The Joint Video Exploration Team of ISO/IEC JTC1/SC29/WG11 and ITU-T SG.16 ); URL:http://Phenix.Int-Evry.FR/JVET/ , No. JVET-J0017, Apr. 3, 2018 (Apr. 3, 2018), KP030151177, 70 Pages, Section 2.1.8 Intra prediction.
Van Der Auwera (QUALCOMM) G., et al., "CE3: Intra Reference Sample Interpolation Filter Selection Using MDIS Conditions (Test 3.1.2)", 124. MPEG MEETING; Oct. 8, 2018-Oct. 12, 2018; MACAO; (Motion Picture Expert Group or ISO/IEC JTC1/SC29/WG11) No. m44348, Oct. 2, 2018 (Oct. 2, 2018), XP030191689, pp. 1-14, Retrieved from the Internet: URL: http://phenix.int-evry.fr/mpeg/doc_end_user/documents/124_Macao/wg11/m44348-JVET-L0324-v2-JVET-L0324-v2.zipJVET-L0324_v2.docx [retrieved-on Oct. 2, 2018] the whole document.
Van Der Auwera (QUALCOMM) G., et al., "CE3-related: On MDIS and intra interpolation filter switching", JVET Meeting; Jul. 10, 2018-Jul. 18, 2018; Ljubljana; (The Joint Video Exploration Team of ISO/IEC JTC1/SC29/WG11 and ITU-T SG.16), No. JVET-K0064, Jul. 13, 2018 (Jul. 13, 2018), XP030199604, 7 pages, Retrieved from the Internet: URL:http://phenix.int-evry.fr/jvet/doc_end user/documents/11_Ljubljana/wg11/JVET-K0064-v2zip JVET-K0064_v2.docx [retrieved on Jul. 13, 2018] Section 2 Proposal.
Anonymous: "Preview Document JVET-L1001 for Macao Meeting," Oct. 31, 2018 (Oct. 31, 2018), XP055657004, Retrieved from the Internet: URL: http://phenix.int-evry.fr/jvet/ [retrieved on Jan. 10, 2020].
Bossen F., et al., "JVET Common Test Conditions and Software Reference Configurations for SDR video," 11th Meeting; Ljubljana, SI, Jul. 10-18, 2018, Joint Collaborative Team on Video Coding (Jct-Vc) of ITU-T SG 16 WP 3 and ISO/IEC JTC 1/SC 29/WG 1, No. JVET-K1010_v2, 6 pp.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et aL, "Versatile Video Coding (Draft 2)", 11. JVET Meeting; Jul. 11, 2018-Jul. 18, 2018; Ljubljana; (The Joint Video Exploration Team of ISO/IEC JTC1/SC29/WG11 and ITU-T SG.16), No. JVET-K1001, Sep. 21, 2018 (Sep. 21, 2018), XP030193577, 135 Pages, Retrieved from the Internet: URL: http://phenix.int-evry.fr/jvetidoc_end_user/documents/11_Ljubljana/wg11/JVET-K1001-v6.zip JVET-K1001-v6.docx [retrieved on Sep. 21, 2018] pp. 56-68, paragraph 8.2.4.2—paragraph 8.2.4.2.9; figures 8-1, tables 8-5.
Chen J, et al., "Algorithm Description for Versatile Video Coding and Test Model 2 (VTM 2)", 11. JVET Meeting, Jul. 11, 2018-Jul. 18, 2018, LJUBLJANA, (The Joint Video Exploration Team of ISO/IEC JTC1/SC29/WG11 and ITU-TSG.16), No. JVET-K1002-v1, Aug. 10, 2018 (Aug. 10, 2018), XP030193537, 19 pages, Retrieved from the Internet: URL: http://phenix.int-evry.fr/jvet/doc_end_user/documents/11_Ljubljana/wg11/JVET-K1002-v1.zip JVET-K1002-v1. locx, [retrieved on Aug. 10, 2018], Sections 1-3, figure 1.
Chen J., et aL, "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, Ch, Oct. 19-21, 2015, 27 pages, JVET-A1001.
Chien W-J., et al., "Parsing friendly intra mode coding", Joint Collaborative Team on Video Coding (JCT-VC) of ITU-T SG16 WP3 and ISO/IEC JTC1/SC29/WG11, 6th Meeting: Torino, IT, 2011-07, JCTVC-F459_r2, pp. 1-5.
Chuang T-D., et al.,"Luma Intra Prediction Mode Coding", 6. JCT-VC Meeting; 97. Mpeg Meeting; Jul. 14, 2011—Jul. 22, 2011; Torino; (Joint Collaborative Team on Video Coding of ISO/IEC JTC1/SC29/WG11 and ITU-T SG. 16) ; URL: HTTP://WFTP3.ITU.INT/AV-ARCH/JCIVC-SITE/ No. JCTVC-F062-r1, Jul. 15, 2011 (Jul. 15, 2011), 5 pages, XP030009085.
Ergen S., "ZigBee/IEEE 802.15.4 Summary", Sep. 10, 2004, 37 Pages.

(56) References Cited

OTHER PUBLICATIONS

Filippov A., et al., "CE3: A Combination of Tests 3.1.2 and 3.1.4 for Intra Reference Sample Interpolation Filter", Joint Video Experts Team (JVET) of ITU-T SG 16 WP 3 and ISO/IEC JTC 1/SC 29/WG 11, JVET-L0628-v2, Oct. 2018, 5 pages.

Francois E., et al., "CE6b: Intra mode coding with 4 MPMs and mode ranking", Joint Collaborative Team on Video eroding (JCT-VC) of ITU-T SG16 WP3 and ISO/IEC JTC1/SC29/WG11, 7th Meeting, Geneva, CH, Nov. 21-30, 2011, Document: JCTVC-G243, XP030110227, 8 pages.

"High Efficiency Video Coding, Recommendation ITU-T H.265", ITU-T, Oct. 2014, H.265, (Oct. 2014), pp. 117-119, 125-128.

IEEE Std 802.11ad-2012: "Part 11: Wireless Lan Medium Access Control (MAC) and Physical Layer (PHY) Specifications—Amendment 3: Enhancements for Very High Throughput in the 60 GHz Band", LAN/MAN Standards committee of the IEEE Computer Society, Dec. 28, 2012, 628 Pages.

TU-T H.223, Series H: Audiovisual and Multimedia Systems, Infrastructure of Audiovisual Services—Transmission Vlultiplexing and Synchronization, Multiplexing Protocol for Low Bit Rate Multimedia Communication, The International Telecommunication Union, Jul. 2001, 74 Pages.

ITU-T H265, "Series H: Audiovisual and Multimedia Systems, Infrastructure of Audiovisual Services- Coding of Moving Video, High efficiency Video Coding," The International Telecommunication Union. Dec. 2016, 664 Pages.

Kumakura T., et al., "Intra Prediction Mode Coding based on Direction Difference," Joint Collaborative Team on Video Coding (JCT-VC) of ITU-T SG16 WP3 and ISO/IEC JTC1/SC29/WG11, 6th Meeting: Torino, IT, Jul. 2011, JCTVC-F339, pp. 1-13.

Lin P., et al., "Non-CE3: Harmonization Between WAIP and Intra Smoothing Filters,"126. MPEG Meeting, Mar. 25, 2019-Mar. 29, 2019, Geneva, (Motion Picture Expert Group or ISO/IEC JTC1/SC29/WG11), No. m47097, Mar. 22, 2019 (Mar. 22, 2019), XP030210668, 3 pages, Retrieved from the Internet: URL: http://phenix.int-evry.fr/mpeg/doc_end_user/documents/126_Geneva/wg11/m47097-JVET-N4035-v3-JVET-N0435-v3.zip-JVET-N0435-v2.docx [retrieved on Mar. 22, 2019] the whole document.

Van Der Auwera G., et al., "Description of Core Experiment 3: Intra Prediction and Mode Coding", Joint Video Experts Team (JVET) of ITU-T SG 16 WP 3 and ISO/IEC JTC 1/SC 29/WG 11, Jul. 10-18, 2018, JVET-K1023-v1, 32 pages.

Zhao L., et al., "CE3-related: Unification of Angular Intra Prediction for Square and Non-square Blocks," 12, JVET Meeting, Oct. 10, 2018—Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

\* cited by examiner

INTRA PREDICTION AND INTRA MODE CODING

This application claims the benefit of U.S. Provisional Application Ser. No. 62/181,744, filed Jun. 18, 2015, and U.S. Provisional Patent Application Ser. No. 62/192,310, filed Jul. 14, 2015, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques for intra prediction and intra prediction mode coding, which may be used in the context of advanced video codecs, such as extensions of the High Efficiency Video Coding (HEVC) standard, or the next generation of video coding standards.

In one example, this disclosure describes a method of encoding a block of video data may include deriving M most probable modes (MPMs) for intra prediction of the block of video data from among a plurality of intra prediction modes, wherein M is greater than 3, the MPMs including an MPM for a left neighboring column and an MPM for an above neighboring row, and deriving the M most probable modes comprises at least one of: (i) defining a representative intra prediction mode for the left neighboring column and using the representative intra prediction mode for the left neighboring column as the MPM for the left neighboring column, or (ii) defining a representative intra prediction mode for the above neighboring row and using the representative intra prediction mode for the above neighboring row as the MPM for the above neighboring row; encoding a syntax element that indicates whether a MPM index or a non-MPM index is used to indicate a selected intra prediction mode of the plurality of intra prediction modes for intra prediction of the block of video data; encoding the indicated one of the MPM index or the non-MPM index, wherein the MPM index indicates which of the M MPMs is the selected intra prediction mode, and wherein the non-MPM index indicates which of the plurality of intra prediction modes other than the M MPM is the selected intra prediction mode; and encoding the block of video data based on the selected intra prediction mode.

In another example, this disclosure describes a method of decoding a block of video data may include deriving M MPMs for intra prediction of the block of video data from among a plurality of intra prediction modes, wherein M is greater than 3, the MPMs including an MPM for a left neighboring column and an MPM for an above neighboring row, and deriving the M most probable modes comprises at least one of: (i) defining a representative intra prediction mode for the left neighboring column and using the representative intra prediction mode for the left neighboring column as the MPM for the left neighboring column, or (ii) defining a representative intra prediction mode for the above neighboring row and using the representative intra prediction mode for the above neighboring row as the MPM for the above neighboring row; decoding a syntax element that indicates whether a MPM index or a non-MPM index is used to indicate a selected intra prediction mode of the plurality of intra prediction modes for intra prediction of the block of video data; decoding the indicated one of the MPM index or the non-MPM index, wherein the MPM index indicates which of the M MPMs is the selected intra prediction mode, and wherein the non-MPM index indicates which of the plurality of intra prediction modes other than the M MPM is the selected intra prediction mode; and reconstructing the block of video data based on the selected intra prediction mode.

In another example, this disclosure describes a device for encoding video data may include a memory configured to store the video data; and one or more processors configured to: derive M MPMs for intra prediction of the block of video data from among a plurality of intra prediction modes, wherein M is greater than 3, the MPMs including an MPM for a left neighboring column and an MPM for an above neighboring row, and the one or more processors are configured such that, as part of deriving the M most probable modes comprises, the one or more processors perform at least one of: (i) defining a representative intra prediction mode for the left neighboring column and using the representative intra prediction mode for the left neighboring column as the MPM for the left neighboring column, or (ii) defining a representative intra prediction mode for the above neighboring row and using the representative intra prediction mode for the above neighboring row as the MPM for the above neighboring row; encode a syntax element that indicates whether a MPM index or a non-MPM index is used to indicate a selected intra prediction mode of the plurality of intra prediction modes for intra prediction of the block of video data; encode the indicated one of the most probable mode index or the non-most probable mode index, wherein the most probable mode index indicates which of the M MPMs is the selected intra prediction mode, and wherein the non-MPM index indicates which of the plurality of intra prediction modes other than the M MPMs is the selected intra prediction mode; and encode the block of video data based on the selected intra prediction mode.

In another example, this disclosure describes a device for decoding video data may include a memory configured to store the video data; and one or more processors configured to: derive M MPMs for intra prediction of the block of video data from among a plurality of intra prediction modes, wherein M is greater than 3, the MPMs including an MPM for a left neighboring column and an MPM for an above neighboring row, and the one or more processors are configured such that, as part of deriving the M most probable modes, the one or more processors perform at least one of: (i) defining a representative intra prediction mode for the left neighboring column and using the representative intra prediction mode for the left neighboring column as the MPM for the left neighboring column, or (ii) defining a representative intra prediction mode for the above neighboring row and using the representative intra prediction mode for the above neighboring row as the MPM for the above neighboring row; decode a syntax element that indicates whether a MPM index or a non-MPM index is used to indicate a selected intra prediction mode of the plurality of intra prediction modes for intra prediction of the block of video data; decode the indicated one of the most probable mode index or the non-most probable mode index, wherein the most probable mode index indicates which of the M MPMs is the selected intra prediction mode, and wherein the non-MPM index indicates which of the plurality of intra prediction modes other than the M MPMs is the selected intra prediction mode; and reconstruct the block of video data based on the selected intra prediction mode.

In another example, this disclosure describes a video coding device may include means for deriving M MPMs for intra prediction of the block of video data from among a plurality of intra prediction modes, wherein M is greater than 3, the MPMs including an MPM for a left neighboring column and an MPM for an above neighboring row, and the means for deriving the M most probable modes comprises at least one of: (i) means for defining a representative intra prediction mode for the left neighboring column and using the representative intra prediction mode for the left neighboring column as the MPM for the left neighboring column, or (ii) means for defining a representative intra prediction mode for the above neighboring row and using the representative intra prediction mode for the above neighboring row as the MPM for the above neighboring row; means for coding a syntax element that indicates whether a MPM index or a non-MPM index is used to indicate a selected intra prediction mode of the plurality of intra prediction modes for intra prediction of the block of video data; means for coding the indicated one of the MPM index or the non-MPM index, wherein the MPM index indicates which of the M MPMs is the selected intra prediction mode, and wherein the non-MPM index indicates which of the plurality of intra prediction modes other than the M MPM is the selected intra prediction mode; and means for coding the block of video data based on the selected intra prediction mode.

In another example, this disclosure describes a computer readable medium stores instructions that, when executed by one or more processors cause the one or more processors to: derive M MPMs for intra prediction of a block of video data from among a plurality of intra prediction modes, wherein M is greater than 3, the MPMs including an MPM for a left neighboring column and an MPM for an above neighboring row, and as part of causing the one or more processors to derive the M most probable modes, the instructions, when executed by the one or more processors, cause the one or more processors to perform at least one of: (i) defining a representative intra prediction mode for the left neighboring column and using the representative intra prediction mode for the left neighboring column as the MPM for the left neighboring column, or (ii) defining a representative intra prediction mode for the above neighboring row and using the representative intra prediction mode for the above neighboring row as the MPM for the above neighboring row; code a syntax element that indicates whether a MPM index or a non-MPM index is used to indicate a selected intra prediction mode of the plurality of intra prediction modes for intra prediction of the block of video data; code the indicated one of the MPM index or the non-MPM index, wherein the MPM index indicates which of the M MPMs is the selected intra prediction mode, and wherein the non-MPM index indicates which of the plurality of intra prediction modes other than the M MPM is the selected intra prediction mode; and code the block of video data based on the selected intra prediction mode.

The details of one or more examples are set forth in the accompanying drawings and the description below. Other features, objects, and advantages will be apparent from the description and drawings, and from the claims.

DETAILED DESCRIPTION

Figure 1:
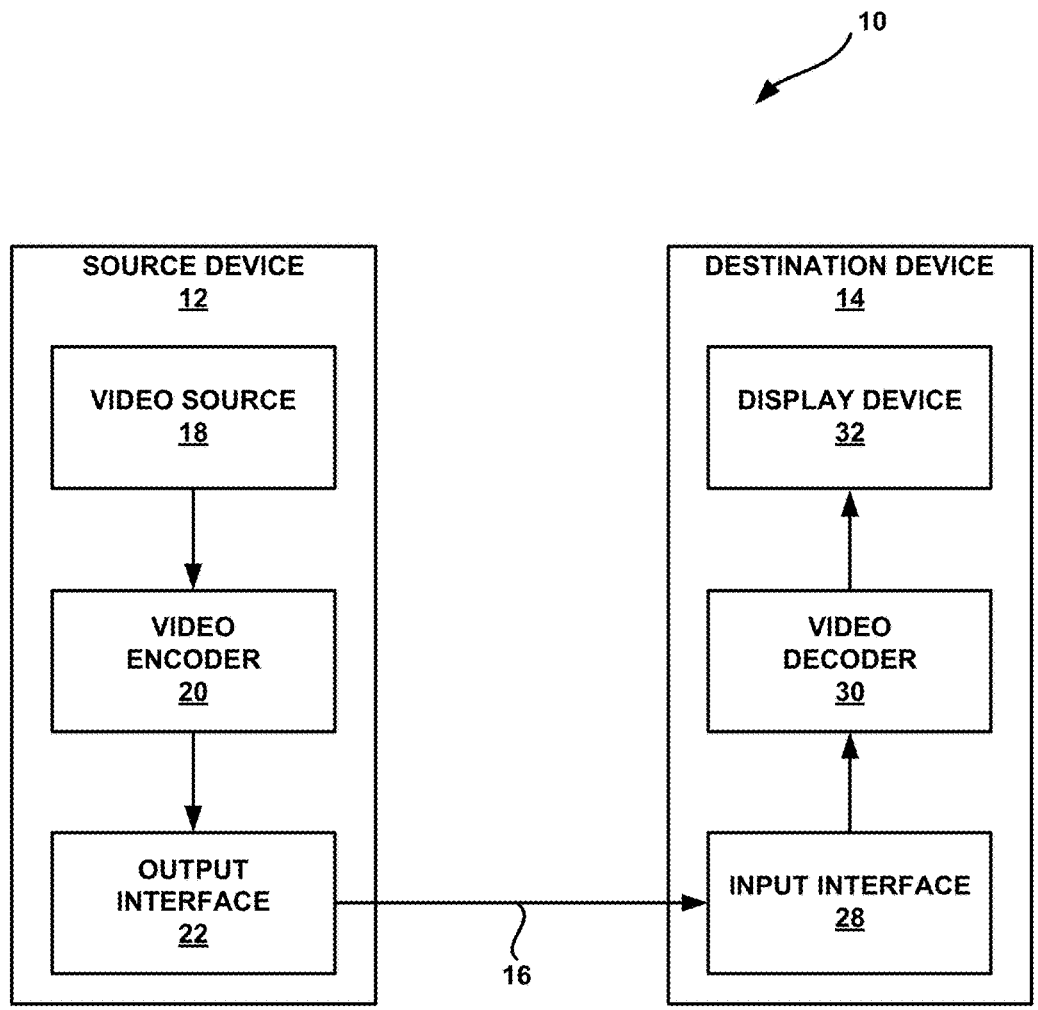
FIG. 1 is a block diagram illustrating an example video coding system that may utilize the techniques described in this disclosure.

In general, this disclosure describes techniques for intra prediction and intra prediction mode coding, which may be used in the context of advanced video codecs, such as extensions of the HEVC standard, or the next generation of video coding standards. For example, this disclosure describes techniques for deriving, selecting and/or signaling most-probable modes (MPMs) for intra prediction. Examples described in this disclosure also include techniques for intra prediction using an increased number of angular modes. The techniques for intra prediction using an increased number of angular modes may include techniques for applying an N-tap Intra interpolation filter, where N is larger than 2. The disclosure also describes techniques that may allow multiple Intra prediction directions per block, e.g. respective directions for sub-blocks of the block, which may not require additional signaling of multiple intra prediction modes.

Intra prediction and intra mode coding are techniques that may be used in the context of advanced video codecs, such as extensions of the High Efficiency Video Coding (HEVC) standard, or the next generation of video coding standards.

In intra mode coding in HEVC, for each intra prediction unit (PU), a selected intra prediction mode is signaled. To select the intra prediction mode, three intra modes are first identified, which are assumed to have higher probability to be actually selected, namely the Most Probable Modes (MPMs). In HEVC, there are 35 modes for the intra prediction of a luma block, including a planar intra prediction mode, a DC intra prediction mode and 33 different prediction directions associated with respectively angular intra prediction modes.

The 35 fixed prediction angles of the existing design of Intra prediction in HEVC may be inefficient to capture very flexible edge direction distributions. However, applying more prediction angles may result in undesired encoder complexity increase. For example, a direct extension to 65 prediction angles based on the HEVC reference software may require an approximately doubled number of SATD checks. Furthermore, the efficiency of current intra mode coding, using three MPMs, in HEVC can be limited because it may not accurately correspond to the actual probability distribution of all available intra prediction modes.

This disclosure describes techniques that may remediate one or more of these deficiencies in HEVC. For example, in accordance with some techniques of this disclosure, a video coder may derive more than three MPMs. In some such examples, the video coder may use context modeling for decoding one or more bins of an MPM index indicating which of the MPMs is a selected MPM for a current PU. In some examples where the video coder derives more than three MPMs, the video coder may define, among the MPMs, a representative intra prediction mode for the left neighboring column and using the representative intra prediction mode for the left neighboring column as the MPM for the left neighboring column and/or define a representative intra prediction mode for the above neighboring row and using the representative intra prediction mode for the above neighboring row as the MPM for the above neighboring row. Furthermore, in some examples where the video coder derives more than three MPMs, the video coder may select one or more additional angular MPMs based on similarity with an angular mode already among the MPMs. In this example, the similarity is determined based on at least one of intra prediction mode index differences or intra prediction angle differences. Furthermore, in some example techniques of this disclosure, a non-MPM index may be encoded in the bitstream as a code word shorter than $\lceil \log_2 N \rceil$ bits if the non-MPM index satisfies a criterion and is encoded as a fixed length code with $\lceil \log_2 N \rceil$ bits otherwise, wherein there is a total of N available values of the non-MPM index.

In some examples of this disclosure where the video coder may use more than 33 angular intra prediction modes, the video coder may use an interpolation filter on neighboring reconstructed samples in which the interpolation has $\frac{1}{32}$-pel accuracy. In some examples of this disclosure, the video coder may calculate a value of a respective sample by applying an N-tap intra interpolation filter to neighboring reconstructed samples to interpolate a value at the determined fractional position, wherein N is greater than 2.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to either video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In some examples, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the internet). The one or more communication media may include routers, switches, base stations, or other equipment that facilitate communication from source device 12 to destination device 14.

In some examples, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In some examples, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device. An apparatus including video encoder 20 and/or video decoder 30 may comprise an integrated circuit, a microprocessor, and/or a wireless communication device, such as a cellular telephone.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto the channel 16.

Many of the techniques described in this disclosure can be performed by both video encoder 20 and video decoder 30. Therefore, for ease of explanation, the techniques may be described with respect to a video coder, which may be a video encoder and/or a video decoder, such as video encoder 20 and video decoder 30. This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, High Efficiency Video Coding (HEVC) has recently been developed by the Joint Collaboration Team on Video Coding (JCT-VC) of ITU-T Video Coding Experts Group (VCEG) and ISO/IEC Motion Picture Experts Group (MPEG). A draft of the HEVC specification is available from: http://phenix.int-evry.fr/jct/doc_end_user/documents/14_Vienna/wg11/JCTVC-N1003-v1.zip, hereinafter, "JCTVC-N1003."

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order. For instance, a slice may be an integer number of CTUs contained in one independent slice segment and all subsequent dependent slice segments, if any, that precede the next independent slice segment, if any, within the same access unit.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

Typically, a reference picture list construction for the first or the second reference picture list (e.g., RefPicList0 or RefPicList1) of a B picture includes two steps: reference picture list initialization and reference picture list reordering (modification). The reference picture list initialization is an explicit mechanism that puts the reference pictures in the reference picture memory (also known as decoded picture buffer) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification) may be put in a very further position in the list. However, if a position of a picture exceeds the number of active reference pictures of the list, the picture is not considered as an entry of the final reference picture list. The number of active reference pictures may be signaled in the slice header for each list. After reference picture lists are constructed (namely RefPicList0 and RefPicList1, if available), a reference index to a reference picture list can be used to identify any reference picture included in the reference picture list.

Video encoder 20 may encode certain blocks of video data using intra prediction mode encoding, and provide information indicating a selected intra prediction mode used to encode the block. Video encoder 20 may intra prediction encode blocks of any type of frame or slice (e.g., I-frames or I-slices, in addition to P-frames or P-slices and B-frames or B-slices) using an intra prediction mode. When video encoder 20 determines that a block should be intra prediction mode encoded, video encoder 20 may perform a rate-distortion analysis to select a most appropriate intra prediction mode. Intra prediction modes may also be referred to as "intra modes." For example, video encoder 20 may calculate rate-distortion values for one or more intra prediction modes, and select one of the modes having acceptable rate-distortion characteristics.

Video encoder 20 may, in some examples, be configured to begin analysis for selection of an intra prediction mode with the most probable mode, based on the context. When the most probable mode achieves suitable rate-distortion characteristics, in some examples, video encoder 20 may select the most probable mode. In other examples, video encoder 20 need not begin the selection process with the most probable mode.

After video encoder 20 generates predictive block (e.g., a predictive luma, Cb, and Cr block) for one or more PUs of a CU, video encoder 20 may generate a luma residual block for the CU. Each sample in a residual block may indicate a difference between a sample in a predictive block and a corresponding sample in an original coding block. Each sample in the luma residual block of the CU indicates a difference between a luma sample in one of the predictive luma blocks of the CU and a corresponding sample in the original luma coding block of the CU. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression.

Thus, following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. For instance, following quantization, entropy coding of the quantized data may be performed, e.g., according to content adaptive variable length coding (CAVLC), CABAC, or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may also be configured to determine an encoding context for a block. The context may be determined based on various characteristics of the block such as, for example, a size of the block, which may be determined in terms of pixel dimensions, prediction unit (PU) type such as, in the example of HEVC, 2N×2N, N×2N, 2N×N, N×N, short-distance intra prediction (SDIP) types such as 2N×N/2, N/2×2N, 2N×1, 1×2N, a macroblock type in the example of H.264, a coding unit (CU) depth for the block, or other measurements of size for a block of video data. In some examples, video encoder 20 may determine the context based on how any or all of intra prediction modes for an above-neighboring block, a left-neighboring block, an above-left neighboring block, an above-right neighboring block, or other neighboring blocks. In some examples, video encoder 20 determines the context based on both intra prediction modes for one or more blocks as well as size information for the current block being encoded.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for SEI messages, and so on. NAL units that encapsulate RBSPs for video coding data (as opposed to RBSPs for parameter sets and SEI messages) may be referred to as video coding layer (VCL) NAL units. NAL units that contain parameter sets (e.g., video parameter sets (VPSs), sequence parameter sets (SPSs), picture parameter sets (PPSs), etc.) may be referred to as parameter set NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Thus, in some examples of this disclosure, video decoder 30 may ultimately receive encoded video data, e.g., from input interface 28. In accordance with some techniques of this disclosure, video decoder 30 may receive a codeword or other syntax representative of an intra prediction mode used to encode a block of video data. Video decoder 30 may be configured to determine a coding context for the block in a manner substantially similar to video encoder 20.

As mentioned above, particular NAL units of the bitstream may include VPSs, SPS, and PPSs. In some examples, a VPS is a syntax structure comprising syntax elements that apply to zero or more entire coded video sequences (CVSs). In some examples, an SPS is a syntax structure containing syntax elements that apply to zero or more entire CVSs. An SPS may include a syntax element that identifies a VPS that is active when the SPS is active. Thus, the syntax elements of a VPS may be more generally applicable than the syntax elements of a SPS. In some examples, a PPS is a syntax structure containing syntax elements that apply to zero or more entire coded pictures as determined by a syntax element found in each slice segment header.

A parameter set (e.g., a VPS, SPS, PPS, etc.) may contain an identification that is referenced, directly or indirectly, from a slice header of a slice. In some examples, a slice header is the slice segment header of the independent slice segment that is a current slice segment or the most recent independent slice segment that precedes a current dependent slice segment in decoding order. In such examples, a slice segment header is an integer number of coding tree units ordered consecutively in the tile scan and contained in a single NAL unit. The referencing process is known as "activation." Thus, when video decoder 30 is decoding a particular slice, a parameter set referenced, directly or indirectly, by a syntax element in a slice header of the particular slice is said to be "activated." Depending on the parameter set type, the activation may occur on a per picture basis or a per sequence basis. For example, a slice header of a slice may include a syntax element that identifies a PPS. Thus, when a video coder codes the slice, the PPS may be activated. Furthermore, the PPS may include a syntax element that identifies a SPS. Thus, when a PPS that identifies the SPS is activated, the SPS may be activated. The SPS may include a syntax element that identifies a VPS. Thus, when a SPS that identifies the VPS is activated, the VPS is activated.

As mentioned briefly above, video encoder 20 may encode syntax elements using CABAC encoding. To apply CABAC encoding to a syntax element, video encoder 20 may binarize the syntax element to form a series of one or more bits, which are referred to as "bins." In addition, video encoder 20 may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded. In some examples, when video encoder 20 repeats these steps for the next bin, video encoder 20 may select another coding context.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

Rather than performing regular CABAC encoding on all syntax elements, video encoder 20 may encode some bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

Figure 2:
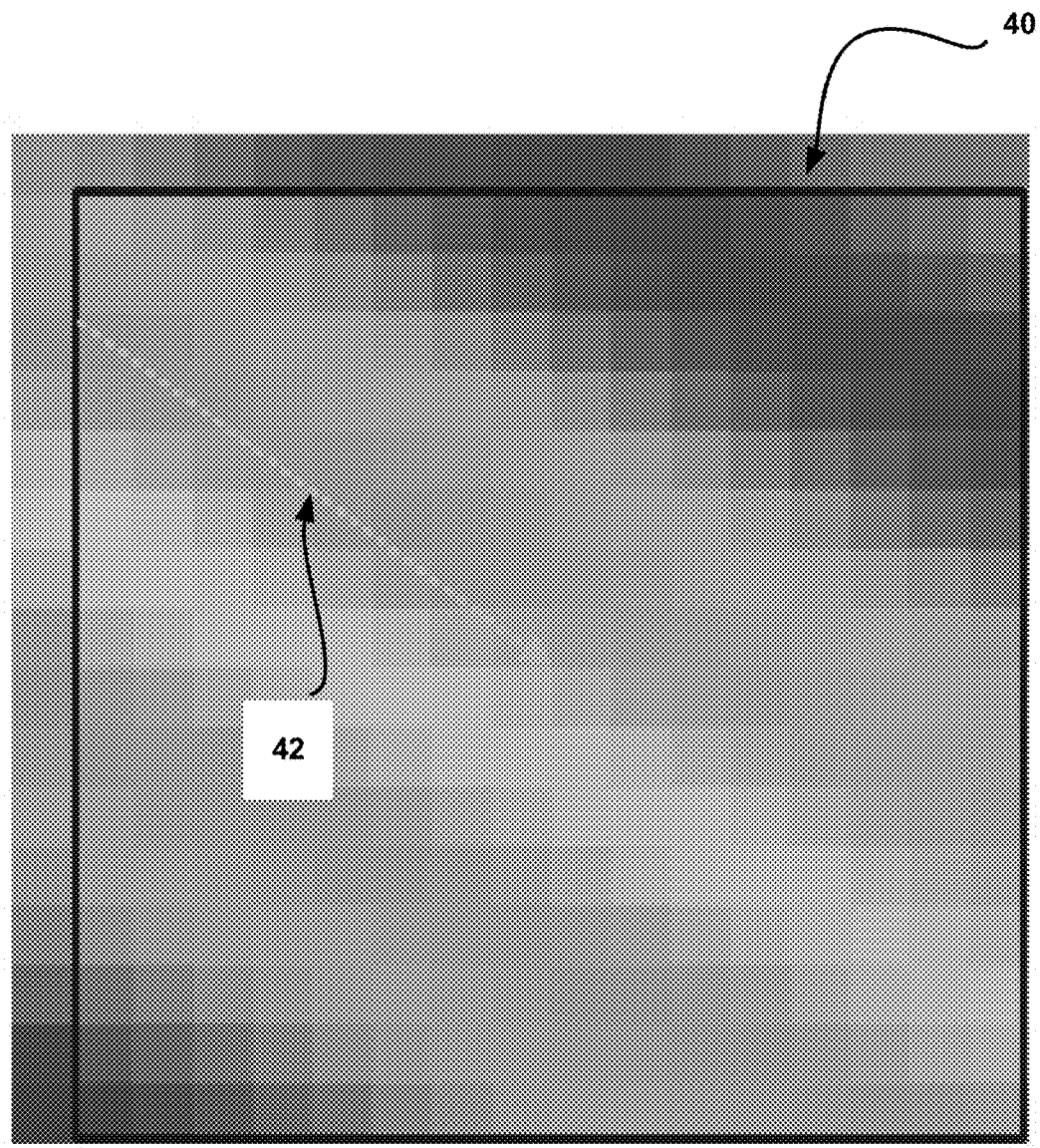
FIG. 2 is a conceptual diagram illustrating an example of intra prediction of a block of video data.

FIG. 2 is a conceptual diagram illustrating an example of intra prediction of a block of video data. For intra prediction, a block of video data (e.g., a PU) is predicted using reconstructed image samples that are spatially neighboring. A typical example of the intra prediction for an image block 40, e.g., a 16×16 image block, is shown in FIG. 2. With intra prediction, image block 40 is predicted by the above and left neighboring reconstructed samples (reference samples) along a selected prediction direction (as indicated by arrow 42).

Figure 3:
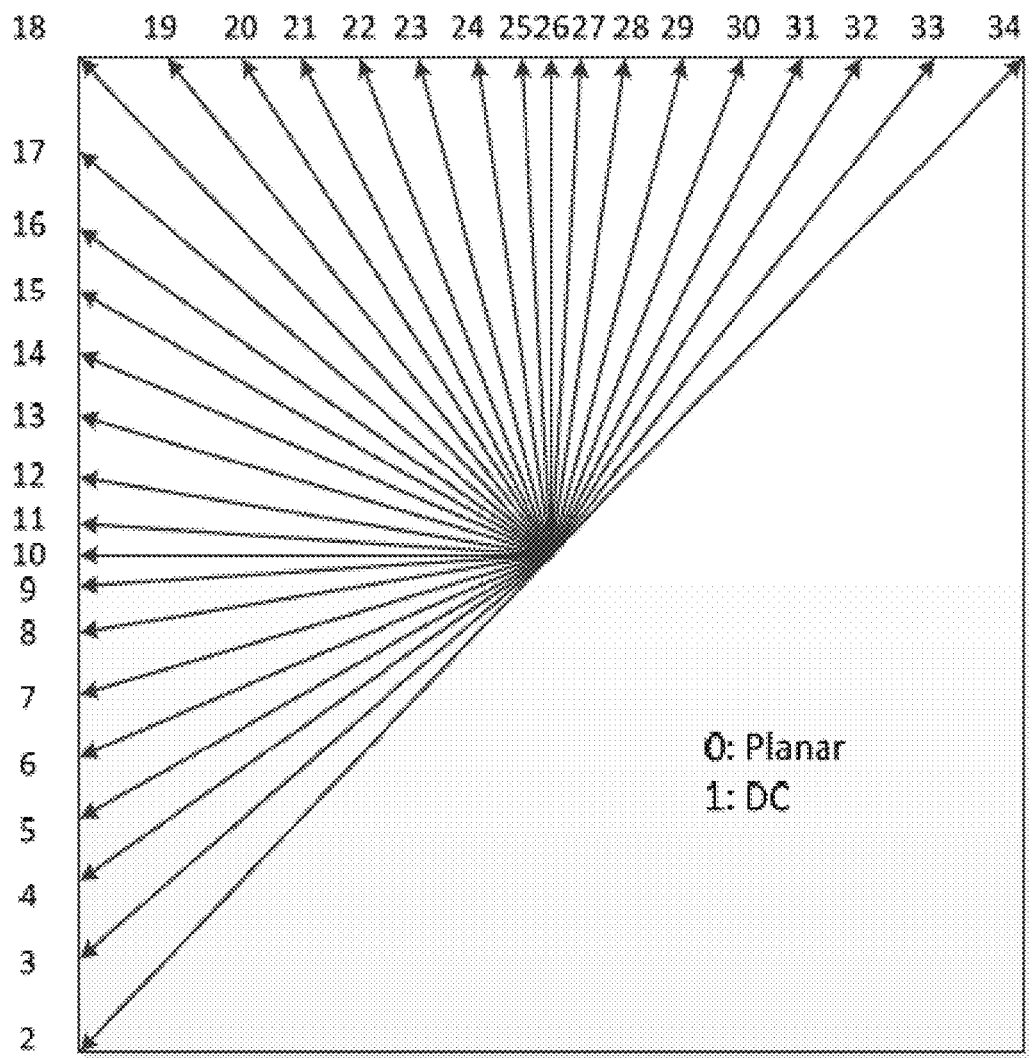
FIG. 3 is a conceptual diagram illustrating an example of intra prediction modes and corresponding mode indexes.

FIG. 3 is a conceptual diagram illustrating an example of intra prediction modes and corresponding mode indexes. In HEVC, there are 35 modes for the intra prediction of a luma block, including a planar mode (i.e., a planar intra prediction mode), a DC mode and 33 angular modes (i.e., angular intra prediction modes), as indicated in FIG. 3. The 35 modes of the intra prediction, as defined in HEVC, are indexed as below table

TABLE 1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2..INTRA_ANGULAR34 |

Figure 4:
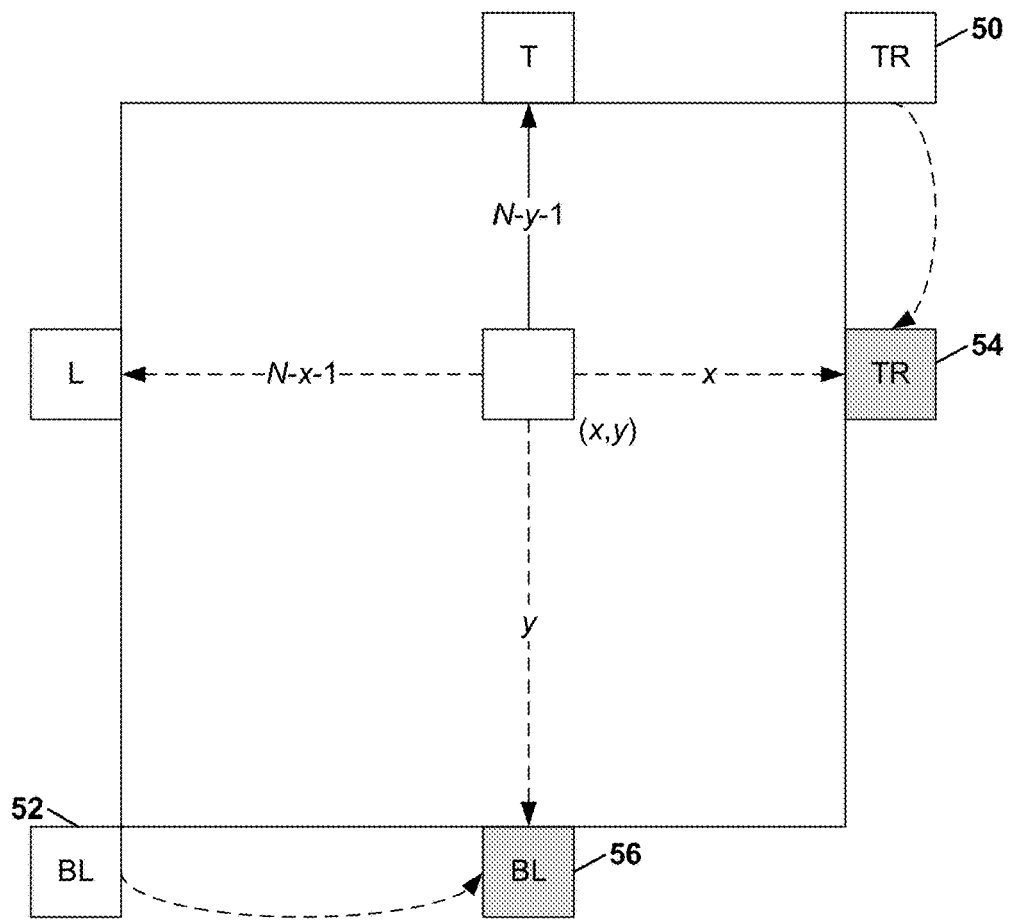
FIG. 4 is a conceptual diagram illustrating an example technique for generating a prediction sample for a block of video data according to a planar intra prediction mode.

FIG. 4 is a conceptual diagram illustrating an example technique for generating a prediction sample for a block of video data according to a planar intra prediction mode. Planar mode is typically the most frequently used Intra prediction mode. To perform a planar prediction for an N×N block, for each sample $p_{xy}$ located at (x, y), as illustrated in FIG. 4, the prediction value is calculated using four specific neighboring reconstructed samples, i.e., reference samples, with a bilinear filter. The four reference samples include a top-right reconstructed sample TR (50), a bottom-left reconstructed sample BL (52), and the two reconstructed samples (54, 56) located at the same column ($r_{x,-1}$) and row ($r_{-1,y}$) of the current sample, as illustrated in FIG. 4. The planar mode can be formulated as: $p_{xy}=(N-x-1)\cdot L+(N-y-1)\cdot T+x\cdot TR+y\cdot BL$. In this formula, N is the height and width of the block.

For a DC mode, the prediction block is simply filled with the average value of the neighboring reconstructed samples. For instance, to generate a predictive block for a PU using a DC intra prediction mode, the video coder may set each sample of the predictive block for the PU equal to an average value of neighboring reconstructed samples. Generally, both the planar and DC intra prediction modes are applied for modeling smoothly varying and constant image regions.

HEVC specifies 33 different prediction directions for its angular intra prediction modes. For each given angular intra prediction, the intra prediction direction can be identified, for example, according to FIG. 3. In the example of FIG. 3, intra prediction mode 10 corresponds to a pure horizontal prediction direction, and intra prediction mode 26 corresponds to a pure vertical prediction direction.

Given a specific intra prediction direction, for each sample of the prediction block, its coordinate (x, y) is first projected to the row/column of neighboring reconstructed samples along the prediction direction, as shown in an example in FIG. 3. Suppose, (x, y) is projected to the fractional position α between two neighboring reconstructed samples L and R, then the prediction value for (x, y) is calculated using a two-tap bi-linear interpolation filter, formulated as follows: $p_{xy}=(1-\alpha)\cdot L+\alpha\cdot R$. To avoid floating point operations, in HEVC, the preceding calculation is actually approximated using integer arithmetic as: $p_{xy}=((32-a)\cdot L+a\cdot R+16)>>5$, where a is an integer equal to 32*α.

For intra mode coding in HEVC, for each intra PU, a selected intra prediction mode is signaled. To signal the selected intra prediction mode, three intra prediction modes are first identified which are assumed to have higher probability to be actually selected, namely the Most Probable Modes (MPM). In HEVC, the MPMs, labeled candModeList[x], x=0, 1, 2, are derived as follows.

Firstly, a left neighboring mode (candIntraPredModeA) and an above neighboring mode (candIntraPredModeB) are derived as follows according to subclause 8.4.2 of JCTVC-N1003:

Input to this process is a luma location (xPb, yPb) specifying the top-left sample of the current luma prediction block relative to the top-left luma sample of the current picture.
1. The neighbouring locations (xNbA, yNbA) and (xNbB, yNbB) are set equal to (xPb−1, yPb) and (xPb, yPb−1), respectively.
2. For X being replaced by either A or B, the variables candIntraPredModeX are derived as follows:
   The availability derivation process for a block in z-scan order as specified in subclause 6.4.1 is invoked with the location (xCurr, yCurr) set equal to (xPb, yPb) and the neighbouring location (xNbY, yNbY) set equal to (xNbX, yNbX) as inputs, and the output is assigned to availableX.
   The candidate intra prediction mode candIntraPredModeX is derived as follows:
      If availableX is equal to FALSE, candIntraPredModeX is set equal to INTRA_DC.
      Otherwise, if CuPredMode[xNbX][yNbX] is not equal to MODE_INTRA or pcm_flag[xNbX][yNbX] is equal to 1, candIntraPredModeX is set equal to INTRA_DC.
      Otherwise, if X is equal to B and yPb−1 is less than ((yPb>>CtbLog2SizeY)<<CtbLog2SizeY), candIntraPredModeB is set equal to INTRA_DC.
      Otherwise, candIntraPredModeX is set equal to IntraPredModeY[xNbX][yNbX].

Thus, if the neighboring sample left of the top left sample of the luma prediction block of a current PU is not available, if the neighboring sample left of the top left sample of the luma prediction block of the current PU is not predicted using intra prediction, or if the neighboring sample left of the top left sample of the luma prediction block of the current PU is encoded using pulse code modulation (PCM), candIntraPredModeA is set to the DC intra prediction mode. Otherwise, candIntraPredModeA is set to the intra prediction mode of a PU whose prediction block contains the neighboring sample left of the top left sample of the luma prediction block of the current PU. Similarly, if the neighboring sample above the top left sample of the luma prediction block of a PU is not available, if the neighboring sample above the top left sample of the luma prediction block of the current PU is not predicted using intra prediction, if the neighboring sample above the top left sample of the luma prediction block of the current PU is encoded using PCM, or if the neighboring sample above the top left sample of the luma prediction block of the current PU is in a different coding tree block from the current PU, candIntraPredModeB is set to the DC intra prediction mode. Otherwise, candIntraPredModeB is set to the luma intra prediction mode of a PU whose prediction block contains the neighboring sample above the top left sample of the luma prediction block of the current PU (i.e., IntraPredModeY[xNbX][yNbX].

Then, in subclause 8.4.2 of JCTVC-N1003, using the derived left neighboring mode (candIntraPredModeA) and above neighboring mode (candIntraPredModeB), the three MPMs are derived as follows:
3. The candModeList[x] with x=0 . . . 2 is derived as follows:
   If candIntraPredModeB is equal to candIntraPredModeA, the following applies:
      If candIntraPredModeA is less than 2 (i.e. equal to INTRA_PLANAR or INTRA_DC), candModeList[x] with x=0 . . . 2 is derived as follows:

$$\text{candModeList}[0]=\text{INTRA\_PLANAR} \quad (8\text{-}15)$$

$$\text{candModeList}[1]=\text{INTRA\_DC} \quad (8\text{-}16)$$

$$\text{candModeList}[2]=\text{INTRA\_ANGULAR26} \quad (8\text{-}17)$$

Otherwise, candModeList[x] with x=0 . . . 2 is derived as follows:

$$\text{candModeList}[0]=\text{candIntraPredMode}A \quad (8\text{-}18)$$

$$\text{candModeList}[1]=2+((\text{candIntraPredMode}A+29)\%32) \quad (8\text{-}19)$$

$$\text{candModeList}[2]=2+((\text{candIntraPredMode}A-2+1)\%32) \quad (8\text{-}20)$$

Otherwise (candIntraPredModeB is not equal to candIntraPredModeA), the following applies:
candModeList[0] and candModeList[1] are derived as follows:

$$\text{candModeList}[0]=\text{candIntraPredMode}A \quad (8\text{-}21)$$

$$\text{candModeList}[1]=\text{candIntraPredMode}B \quad (8\text{-}22)$$

If neither of candModeList[0] and candModeList[1] is equal to INTRA_PLANAR, candModeList[2] is set equal to INTRA_PLANAR,
Otherwise, if neither of candModeList[0] and candModeList[1] is equal to INTRA_DC, candModeList[2] is set equal to INTRA_DC,
Otherwise, candModeList[2] is set equal to INTRA_ANGULAR26.

After the three MPMs are decided, in subclause 8.4.2 of JCTVC-N1003, for each PU, a one-bit flag prev_intra_luma_pred_flag[xPb][yPb] is first signaled to indicate whether the selected intra mode of the current PU is same as one of the three MPMs.
   If prev_intra_luma_pred_flag[xPb][yPb] being signaled as 1, i.e., one of the 3 MPMs is selected for coding the current PU, a index mpm_idx (may equal to 0, 1 or 2), indicating which MPM is selected for coding the current PU, is further signaled. The mpm_idx is binarized using truncated unary code and by-pass coded using no context modeling
   Otherwise (prev_intra_luma_pred_flag[xPb][yPb] being signaled as 0), i.e., non-MPM is used for current PU, an index rem_intra_luma_pred_mode[xPb][yPb], indicating which non-MPM is selected for the current PU, is further signaled. The value of rem_intra_luma_pred_mode[xPb][yPb] could be 0, 1, . . . , 31, and fixed length (5 bits) binarization is used with bypass coding.

As previously discussed, video encoder 20 selects the intra prediction mode for a current PU. The process of selecting the intra prediction mode for a PU may be referred to as an encoder-side intra mode decision. When selecting an intra prediction mode for a current PU, video encoder 20 may select one of the three MPMs determined for the current PU or one of the non-MPM intra prediction modes. If video encoder 20 selects one of the three MPMs for the current PU as the intra prediction mode for the current PU, video encoder 20 may signal, in the bitstream, an MPM index for the current PU. In JCTVC-N1003, the MPM index for a PU having a top left luma sample at coordinates (x, y) is denoted mpm_ind[x][y]. Otherwise, if video encoder 20 does not select one of the three MPMs for the current PU as the intra prediction mode for the current PU, video encoder 20 may signal, in the bitstream, a non-MPM index for the current PU. In JCTVC-N1003, the non-MPM index for a PU having a top left luma sample at coordinates (x, y) is denoted rem_intra_pred_mode[x][y]. Furthermore, video encoder 20 signals, in the bitstream, a syntax element indicating whether an MPM index or a non-MPM index is signaled for the current PU. In JCTVC-N1003, this syntax element for a PU having a top left luma sample at coordinates (x, y) is denoted prev_intra_luma_pred_flag[x][y].

In JCTVC-N1003, an MPM index may only have three potential different values, while a non-MPM index may have many more potential values. Consequently, fewer bits may be required to signal an MPM index than a non-MPM index.

To select an intra prediction mode for a current PU as efficiently as possible, in the design of HEVC reference software (referred to as "the HM"), several fast intra mode decision methods have been integrated. The HM reference software may be downloaded from: https://hevc.hhi.fraunhofer.de/svn/svn_HEVCSoftware/tags/HM-14.0/.

Since there are as many as 35 available intra prediction modes for a luma block, a full rate-distortion optimization based encoder mode decision may be too expensive for a practical implementation. In the latest version of the HM, the intra mode decision is performed as two stages. In the first stage, N Intra mode candidates list is first roughly decided using a much cheaper cost criterion commonly known as "Sum of Absolute Transform Difference" (SATD). The value of N depends on block size, and the default setting in the HM is: N equals to 8 for 4×4 and 8×8, and N equals to 3 for 16×16 and larger block sizes. After that, the left and above neighboring modes, i.e., either candIntraPredModeA or both candIntraPredModeA and candIntraPredModeB (if candIntraPredModeA does not equal to candIntraPredModeA), are appended to the intra mode candidate list, if not already included. In the second stage, the intra mode candidate list is fed into the expensive rate-distortion cost calculation process, and the final best intra prediction mode is decided for the current PU. With this two stage intra mode decision process, the majority of intra prediction modes are skipped for the expensive rate-distortion cost calculation, and the best intra prediction mode is still selected without much penalty of coding performance drop.

In Matsuo et al., "Improved intra angular prediction by DCT-based interpolation filter," Signal Processing Conference (EUSIPCO), 2012 Proceedings of the 20th European, pp. 1568-1572. IEEE, 2012, it is proposed to apply a 4-tap DCT based interpolation filter for 4×4 and 8×8 block sizes and the Intra smoothing filter is also turned off when 4-tap filter is applied, for block sizes larger than or equal to 16×16, the 2-tap bilinear interpolation filter is applied. In Maani, "Interpolation filter for intra prediction of HEVC," U.S. patent application Ser. No. 13/312,946, filed Dec. 6, 2011, a 4-tap interpolation filter can be used when the intra smoothing filter is off, while the 4-tap interpolation filter could be obtained based on a CUBIC interpolation process, a DCT-based interpolation process or a Hermite interpolation process. In M. Guo, X. Guo, and S. Lei, "Improved Intra Mode Coding", Joint Collaborative Team on Video Coding (JCT-VC) of ITU-T SG16 WP3 and ISO/IEC JTC1/SC29/WG11, 4th Meeting: Daegu, Korea, 20-28 Jan. 2011, the binarization of the intra mode is adaptively selected from a set of pre-defined coding trees according to the modes of its neighboring blocks.

There may be a number of problems associated with existing techniques for intra prediction for coding video data, e.g., according to the HEVC standard. For example, the 35 fixed prediction angles of the existing design of intra prediction in HEVC may be inefficient to capture very flexible edge direction distributions. However, applying more prediction angles may result in undesired encoder complexity increases. For example, a direct extension to 65 prediction angles based on the HEVC reference software may require an approximately doubled number of SATD checks relative to the 35 fixed prediction angles of the existing design of intra prediction in HEVC. Additionally, the efficiency of the current intra mode coding, e.g., using three MPMs in HEVC, can be limited because it may not accurately correspond to the actual probability distribution of all available intra prediction modes. In other words, the three MPMs determined in HEVC for a particular PU may not actually be the intra prediction modes that are most likely to be used for the particular PU.

The techniques of this disclosure may resolve the above-identified problems associated with existing techniques for intra prediction for coding video data, e.g., according to the HEVC standard, as well as other problems in the technical fields of intra prediction and video coding and compression. The following itemized methods may be applied individually. Alternatively, any combination of them may be applied.

In accordance with some techniques of this disclosure, more than three MPMs can be used for signaling an intra prediction mode. For instance, a typical example of the number of MPM, denoted by M, can be 4, 5 or 6. The use of additional MPMs may reduce the probability of using non-MPM indexes to signal intra prediction modes of PUs. Because MPM indexes are typically represented using fewer bits than non-MPM indexes, the use of additional MPMs may increase decrease bitstream size.

In some examples where more than three MPMs are used for signaling an intra prediction mode of a PU, video encoder 20 may use an entropy encoding process, such as CABAC, to encode a MPM index and video decoder 30 may use an entropy decoding process, such as CABAC, to decode the MPM index. The MPM index for a PU may be a numerical value identifying which of the MPMs is the intra prediction mode of the PU. As part of using the entropy encoding process to encode the MPM index, video encoder 20 may binarize the MPM index. In other words, video encoder 20 may convert the MPM index into a binary code. In different examples, video encoder 20 may use various binarization methods to convert the MPM index into a binary code. For instance, a video coder may binarize the MPM index using at least one of: a fixed truncated unary code or a fixed Huffman code. Furthermore, in some examples, when coding the MPM index, the binarization method can be a fixed truncated unary code, or a fixed Huffman code or decided based on the coded neighboring intra modes. For instance, a video coder may determine the binarization method based on intra prediction modes used to code one or more neighboring blocks. For instance, for an MPM index of a PU, the video coder may determine the binarization method based on intra prediction modes used to code one or more neighboring blocks adjacent to the PU. After binarizing the MPM index, video encoder 20 may CABAC encode the binarized MPM index and include the CABAC-encoded binarized MPM index in the bitstream. As part of decoding the MPM index, video decoder 30 may obtain the CABAC-encoded binarized MPM index from the bitstream, apply CABAC decoding to the CABAC-encoded binarized MPM index to recover the binarized MPM index, and de-binarize the MPM index to recover the MPM index. In this disclosure, the phrase "bins of an MPM index" may refer to bins of the binarized MPM index.

In some examples of this disclosure, video encoder 20 and video decoder 30 may use context modeling when coding (e.g., CABAC coding) one or more bins of an MPM index. In other words, video encoder 20 and video decoder 30 may select, for each respective bin of one or more bins of the MPM index, a respective coding context for the respective bin. Video encoder 20 and video decoder 30 may use the respective coding context for the respective bin to code the respective bin. For example, when coding the MPM index, the first or selected N coded bins can be coded using context modeling, while the context index is decided using the coded neighboring intra prediction modes. For instance, for an MPM index of a PU in a current picture, the video coder may determine the context index based on intra prediction modes used to code one or more neighboring PUs adjacent in the current picture to the PU. In this example, N is an integer. In some various examples, N may be equal to 1, 2, or 3. Thus, in some examples, the one or more context-modeled bins consists of the first bin of the MPM index. In other examples, the one or more the one or more context-modeled bins consists of a selected N bins of the MPM index, where N is set equal to M−K, wherein K is a pre-defined number.

In one example where video encoder 20 and video decoder 30 use context modeling when coding one or more bins of an MPM index of a current PU, the context index is dependent on the cases of left and above neighboring intra prediction modes. In case 0 of this example, left and above neighboring intra prediction modes are same and neither of the intra prediction modes is DC or planar. In case 1 of this example, the left and the above neighboring intra prediction modes are same and at least one of the intra prediction modes is DC or planar. In case 2 of this example, the left and the above neighboring intra prediction modes are different and neither is planar. In case 3 of this example, left and above neighboring intra prediction modes are different and at least one of the intra prediction modes is planar. The left and above neighboring intra prediction modes may be the intra prediction modes of PUs left and above the current PU. In this example, video encoder 20 and video decoder 30 may calculate the context index based on a pre-defined mapping table which maps from the case index (e.g., case 0, case 1, case 2, or case 3) to a context index number. In other words, a video coder may use a case index to context index mapping table to determine a context index from the case index. The context index number may identify a predefined coding context in a set of predefined coding contexts.

Thus, in this example, when a video coder selects a context index for a context-modeled bin of the MPM index, the video coder may select a first context index if intra prediction modes used to decode a left neighboring block and an above neighboring block are the same and neither of the intra prediction modes used to decode the left neighboring block nor the above neighboring block is DC or planar. Furthermore, in this example, the video coder may select a second context index if intra prediction modes used to decode the left neighboring block and the above neighboring block are same and at least one of the intra prediction modes used to decode the left neighboring block and the above neighboring block is DC or planar. In this example, the video coder may select a third context index if intra prediction modes used to decode the left neighboring block and the above neighboring block are different and neither of the intra prediction modes used to decode the left neighboring block nor the above neighboring block is planar. In this example, the video coder may select a fourth context index if intra prediction modes used to decode the left neighboring block and the above neighboring block are different and at least one of the intra prediction modes used to decode the left neighboring block and the above neighboring block is DC or planar.

In some examples, different case index to context index mapping tables are used for different bins. For example, a video coder, such as video encoder 20 or video decoder 30, may use a first case index to context index mapping table for bin 0 of the MPM index, a second case index to context index mapping table for bin 1 of the MPM index, a third case index to context index mapping table for bin 2 of the MPM index, and so on. The different case index to context index mapping tables of this example may assign different contexts to the cases (e.g., case 0, case 1, case 2, and case 3) described above. For instance, the mapping described in the previous paragraph may apply for the first bin of the MPM index, but for a second bin of the MPM index, the video coder may select the second context index if intra prediction modes used to decode a left neighboring block and an above neighboring block are the same and neither of the intra prediction modes used to decode the left neighboring block nor the above neighboring block is DC or planar; select the third context index if intra prediction modes used to decode the left neighboring block and the above neighboring block are same and at least one of the intra prediction modes used to decode the left neighboring block and the above neighboring block is DC or planar; and so on.

In some examples where video encoder 20 and video decoder 30 use context modeling when coding one or more bins of an MPM index of a current PU, only one context is applied for coding each of the first or selected N bins, and the context may not depend on the neighboring intra prediction modes. For instance, in such examples, video encoder 20 and video decoder 30 perform the coding context selection process once for the MPM index and do not repeat for the coding context selection process for subsequent bins of the MPM index. In other words, a video coder may select a common context index for each of the one or more context-modeled bins of the MPM index.

As mentioned above, in some examples, video encoder 20 and video decoder 30 may use context modeling when coding N coded bins of an MPM index. In one such example, N is set equal to (M−K), where K is a pre-defined number and M is the number of MPMs. For example, K may be equal to 1, 2 or 3.

Thus, in the examples above, video encoder 20 may derive M MPMs for intra prediction of the block of video data from among a plurality of intra prediction modes. In this example, M is greater than 3. Furthermore, encoding a syntax element that indicates whether a most probable mode index or a non-most probable mode index is used to indicate a selected intra prediction mode of the plurality of intra prediction modes for intra prediction of the block of video data. The MPM index indicates which of the M MPMs is the selected intra prediction mode the non-MPM index indicates which of the plurality of intra prediction modes other than the M MPMs is the selected intra prediction mode. Based on the indicated one of the MPM index or the non-MPM index being the MPM index, video encoder 20 may select, for each of one or more context-modeled bins of the MPM index, based on intra prediction modes used to decode one or more neighboring blocks, a context index for the context-modeled bin. Video encoder 20 may encode the block of video data based on the selected intra prediction mode.

In this example, the block of video data may be a current CU in a current picture of the video data and the selected intra prediction mode for the block of video data is a selected intra prediction mode for a current PU of the current CU. In this example, to encode the syntax element that indicates whether a MPM index or a non-MPM index is used to indicate the selected intra prediction mode, video encoder 20 may encode a syntax element (e.g., prev_intra_luma_pred_flag) that indicates whether a MPM index (e.g., mpm_idx)

or a non-MPM index (e.g., rem_intra_luma_pred_mode) is used to indicate a selected intra prediction mode of the plurality of intra prediction modes for intra prediction of the PU. Video encoder 20 may for each of the one or more context-modeled bins of the MPM index, use the selected context index for the context-modeled bin to perform CABAC encoding of the context-modeled bin. Furthermore, as part of encoding the block of video data based on the selected intra prediction mode, video encoder 20 may generate, based on the selected intra prediction mode of the current PU, a predictive block for the current PU. Video encoder 20 may generate residual data that represents pixel differences between the current CU and the predictive block. In this example, video encoder 20 may output a bitstream that includes a sequence of bits that forms a representation of coded pictures and associated data, the coded pictures including the current picture.

Similarly, in some examples, video decoder 30 may derive M MPMs for intra prediction of the block of video data from among a plurality of intra prediction modes. In this example, M is greater than 3. Furthermore, video decoder 30 may decode a syntax element that indicates whether a MPM index or a non-MPM index is used to indicate a selected intra prediction mode of the plurality of intra prediction modes for intra prediction of the block of video data. The MPM index indicates which of the M MPMs is the selected intra prediction mode and the non-MPM index indicates which of the plurality of intra prediction modes other than the M MPMs is the selected intra prediction mode. Based on the indicated one of the MPM index or the non-MPM index being the MPM index, video decoder 30 may select, for each of one or more context-modeled bins of the MPM index, based on intra prediction modes used to decode one or more neighboring blocks, a context index for the context-modeled bin. Furthermore, video decoder 30 may reconstruct the block of video data based on the selected intra prediction mode.

For instance, in this example, the block of video data may be a current CU in a current picture of the video data and the selected intra prediction mode for the block of video data is a selected intra prediction mode for a current PU of the current CU. In this example, to decoded the syntax element that indicates whether the MPM index or the non-MPM index is used to indicate the selected intra prediction mode, video decoder 30 may decode, from a bitstream, a syntax element (e.g., prev_intra_luma_pred_flag) that indicates whether a MPM index (e.g., mpm_idx) or a non-MPM index (e.g., rem_intra_luma_pred_mode) is used to indicate a selected intra prediction mode of the plurality of intra prediction modes for intra prediction of the current PU. In this example, for each of the one or more context-modeled bins of the MPM index, video decoder 30 may use the selected context index for the context-modeled bin to perform CABAC decoding of the context-modeled bin of the MPM index. Furthermore, as part of reconstructing the block of video data based on the selected intra prediction mode, video decoder 30 may generate a predictive block for the current PU using the selected intra prediction mode. In this example, video decoder 30 may reconstruct the current CU using residual values by adding samples of the predictive blocks of PUs of the CU to corresponding samples of transform blocks of TUs of the current CU. In this example, video decoder 30 may receive a bitstream that includes a sequence of bits that forms a representation of coded pictures and associated data, the coded pictures including the current picture.

As briefly discussed above, the efficiency of intra prediction mode coding using the three MPMs specified in HEVC may be limited because the three MPMs specified in HEVC frequently do not accurately correspond to the actual probability distribution of all available intra prediction modes. For instance, the probability of the intra prediction mode of a PU being a particular non-MPM intra prediction mode may be greater than the probabilities of the intra prediction mode of the PU being any of the three MPMs specified in HEVC.

Thus, in accordance with some examples of this disclosure, when deriving the MPMs, a representative intra prediction mode is defined for left (or above) neighboring column (or row) and the representative intra prediction mode is used as the MPM candidate from the left (or above) neighboring column. For instance, a video coder may define a representative intra prediction mode for a left neighboring column and use the representative mode for the left neighboring column as an MPM candidate. The video coder may use the representative mode for the left neighboring column as an MPM candidate in addition to the MPM defined in HEVC for the left neighboring block or in place of the MPM defined in HEVC for the left neighboring block (candIntraPredModeA). Moreover, the video coder may define a representative intra prediction mode for an above neighboring row and use the representative mode for the above neighboring row as an MPM candidate. The video coder may use the representative mode for the above neighboring row as an MPM candidate in addition to the MPM defined in HEVC for the above neighboring block or in place of the MPM defined in HEVC for the above neighboring block (candIntraPredModeB).

The left neighboring column may include a column of samples immediately left in a picture of a column of samples containing a current sample of a current PU for a CU of the picture. For instance, the left neighboring column may include (or consist of) each sample immediately left of the current PU. The above neighboring row may include a row of samples immediately above in a picture of a row of samples containing a current sample of a current PU for a CU of the picture. For instance, the above neighboring row may include (or consist of) each sample immediately above the current PU.

For example, as part of encoding video data, video encoder 20 may encode a block of video data in part by deriving M MPMs for intra prediction of the block of video data from among a plurality of intra prediction modes. In some examples, M is greater than 3. In this example, the MPMs may include an MPM for the left neighboring column and an MPM for the above neighboring row. In some examples, video encoder 20 defines a representative intra prediction mode for the left neighboring column and uses the representative intra prediction mode for the left neighboring column as the MPM for the left neighboring column. In some examples, video encoder 20 defines a representative intra prediction mode for the above neighboring row and using the representative intra prediction mode for the above neighboring row as the MPM for the above neighboring row.

Furthermore, video encoder 20 may encode a syntax element that indicates whether a MPM index or a non-MPM index is used to indicate a selected intra prediction mode of the plurality of intra prediction modes for intra prediction of the block of video data, and encodes the indicated one of the MPM index or the non-MPM index. For example, video encoder 20 may include, in the bitstream, data indicating a prev_intra_luma_pred_flag syntax element that indicates whether the bitstream includes data indicating an mpm_index or a rem_intra_luma_pred_mode syntax element. The MPM index indicates which of the M MPMs is the selected intra prediction mode. The non-MPM index indicates which of the intra prediction modes other than the M MPMs is the selected intra prediction mode. Video encoder 20 encodes the block of video data based on the selected intra prediction mode.

In this example, the block of video data is a current CU in a current picture of the video data and the selected intra prediction mode for the block of video data is a selected intra prediction mode for a current PU of the current CU. To encode the block of video data based on the selected in intra prediction mode, video encoder 20 may reconstruct the block of video data in part by generating a predictive block for the current PU using the selected intra prediction mode. Furthermore, video encoder 20 may reconstruct the current CU using residual values by adding samples of the predictive blocks of PUs of the CU to corresponding samples of transform blocks of TUs of the current CU.

In a similar example of selecting an intra prediction mode to be used for intra prediction for coding video data, video decoder 30 may decode a block of video data in part by deriving M MPMs for intra prediction of the block of video data from among a plurality of intra prediction modes. In this example, M may be greater than 3. The MPMs may include an MPM for the left neighboring column and an MPM for the above neighboring row. In some examples, video decoder 30 defines a representative intra prediction mode for the left neighboring column and uses the representative intra prediction mode for the left neighboring column as the MPM for the left neighboring column. In some examples, video decoder 30 defines a representative intra prediction mode for the above neighboring row and uses the representative intra prediction mode for the above neighboring row as the MPM for the above neighboring row.

Furthermore, video decoder 30 may decode a syntax element that indicates whether a MPM index or a non-MPM index is used to indicate a selected intra prediction mode of the plurality of intra prediction modes for intra prediction of the block of video data, and decodes the indicated one of the most probable mode index or the non-most probable mode index. For instance, video decoder 30 may obtain a prev_intra_pred_flag from a bitstream. The MPM index indicates which of the M MPMs is the selected intra prediction mode. The non-MPM index indicates which of the plurality of intra prediction modes other than the M MPMs is the selected intra prediction mode.

Video decoder 30 may then reconstruct a video block based on the resulting selected intra prediction mode. In this example, the block of video data may be a current CU in a current picture of the video data and the selected intra prediction mode for the block of video data is a selected intra prediction mode for a current PU of the current CU. In this example, as part of reconstructing the video block based on the resulting selected intra prediction mode, video decoder 30 may use the selected intra prediction mode to generate a predictive block for the video block. For instance, the video block may be a CU and video decoder 30 may use the selected intra prediction mode to generate a predictive block for a PU of the CU. Furthermore, video decoder 30 may reconstruct at least some samples of the video block by adding samples of the predictive block to corresponding residual samples for the video block. For instance, the video block may be a CU and video decoder 30 may add samples of the predictive block to corresponding residual samples in one or more transform blocks of TUs of the CU.

In various examples, a video coder may determine a representative intra prediction mode in different ways. In one example, it is defined as a function of all the intra prediction modes used by the neighboring blocks. For example, the number of actually used intra prediction modes of the left (or above) neighboring column (or row), in unit of the smallest PU size (e.g., 4), are counted, and the most frequently used one is defined as the representative intra prediction mode. Thus, in the examples above, video encoder 20 and video decoder 30 may define the representative intra prediction mode for the left neighboring column based on a most frequent intra prediction mode of the left neighboring column, and define the representative intra prediction mode for the above neighboring column based on a most frequent intra prediction mode of the above neighboring row.

Alternatively, the counting is based on the PU size of the current block. For instance, a video coder may determine the most frequent intra prediction mode of the neighboring blocks based on at least one of: (i) a smallest prediction unit size, or (ii) a prediction unit size of the block of video data. In one example, instead of counting based on the unit of a smallest PU size (e.g., 4×4), a different unit size may be used for a different PU size of current block. For example, if the PU size of the current block is 64×64, the counting is based on an 8×8 PU size or a 16×16 PU size, instead of the smallest PU size (4×4).

In some examples, a representative intra prediction mode may be defined as one of the intra prediction modes used by a selected neighboring block in the left (or above) neighboring column (or row). For example, the intra prediction mode of the sample (or block equal to the smallest PU size) located at the middle position of the left (right) neighboring column (row), which is not the left (top)-most or the right (bottom)-most one, is defined as the representative intra prediction mode of the left (or above) neighboring mode. Furthermore, in the examples above, the most frequent intra prediction mode of the neighboring blocks may be determined based on at least one of a smallest prediction unit size, or a prediction unit size of the block of video data. In another example, video encoder 20 and video decoder 30 may define the representative intra prediction mode for the left neighboring column as an intra prediction mode used by a selected neighboring block in the left neighboring column, and may define the representative intra prediction mode for the above neighboring row as an intra prediction mode used by a selected neighboring block in the above neighboring row.

As mentioned above, particular examples of this disclosure allow for M MPMs, where M is greater than three. Thus, in accordance with such examples of this disclosure, video encoder 20 may derive M MPMs for intra prediction of the block of video data from among a plurality of intra prediction modes. In other words, video encoder 20 may derive, from among the plurality of intra prediction modes, M MPMs for intra prediction of a PU of a CU of a current picture of the video data. In this example, M is greater than 3. In this example, M is less than a total number of intra prediction modes in the plurality of intra prediction modes. Furthermore, in this example, video encoder 20 may encode a syntax element that indicates whether a MPM index or a non-MPM index is used to indicate a selected intra prediction mode of the plurality of intra prediction modes for intra prediction of the block of video data. In this example, video encoder 20 may encode the indicated one of the MPM index or the non-MPM index. The MPM index indicates which of the M MPMs is the selected intra prediction mode and the non-MPM index indicates which of the plurality of intra prediction modes other than the M MPMs is the selected intra prediction mode. Video encoder 20 may encode the block of video data based on the selected intra prediction mode.

In this example, the block of video data may be a current CU in a current picture of the video data and the selected intra prediction mode for the block of video data is a selected intra prediction mode for a current PU of the current CU. In this example, video encoder 20 may encode the syntax element that indicates whether a MPM index or a non-MPM index is used to indicate the selected intra prediction mode, video encoder 20 may encode a syntax element (e.g., pre-v_intra_luma_pred_flag) that indicates whether a MPM index (e.g., mpm_idx) or a non-MPM index (e.g., rem_intra_luma_pred_mode) is used to indicate a selected intra prediction mode of the plurality of intra prediction modes for intra prediction of the PU. Furthermore, as part of encoding the block of video data based on the selected intra prediction mode, video encoder 20 may generate, based on the selected intra prediction mode of the current PU, a predictive block for the current PU. Video encoder 20 may generate residual data that represents pixel differences between the current CU and the predictive block. In this example, video encoder 20 may output a bitstream that includes a sequence of bits that forms a representation of coded pictures and associated data, the coded pictures including the current picture.

Moreover, in accordance with such examples of this disclosure, video decoder 30 may derive M MPMs for intra prediction of the block of video data from among a plurality of intra prediction modes. In this example M is greater than 3. M may be less than the total number of intra prediction modes in the plurality of intra prediction modes. Furthermore, in this example, video decoder 30 may decode a syntax element that indicates whether a MPM index or a non-MPM index is used to indicate a selected intra prediction mode of the plurality of intra prediction modes for intra prediction of the block of video data. In this example, video decoder 30 may decode the indicated one of the MPM index or the non-MPM index. Video decoder 30 may reconstruct the block of video data based on the selected intra prediction mode.

For instance, in this example, the block of video data may be a current CU in a current picture of the video data and the selected intra prediction mode for the block of video data is a selected intra prediction mode for a current PU of the current CU. In this example, to decoded the syntax element that indicates whether the MPM index or the non-MPM index is used to indicate the selected intra prediction mode, video decoder 30 may decode, from a bitstream, a syntax element (e.g., prev_intra_luma_pred_flag) that indicates whether a MPM index (e.g., mpm_idx) or a non-MPM index (e.g., rem_intra_luma_pred_mode) is used to indicate a selected intra prediction mode of the plurality of intra prediction modes for intra prediction of the current PU. Furthermore, as part of reconstructing the block of video data based on the selected intra prediction mode, video decoder 30 may generate a predictive block for the current PU using the selected intra prediction mode. In this example, video decoder 30 may reconstruct the current CU using residual values by adding samples of the predictive blocks of PUs of the CU to corresponding samples of transform blocks of TUs of the current CU. In this example, video decoder 30 may receive a bitstream that includes a sequence of bits that forms a representation of coded pictures and associated data, the coded pictures including the current picture.

In some examples, when deciding the M (M>3) MPMs, the original three MPMs defined in HEVC are maintained in the M MPMs, and additional (M−3) intra prediction modes are added. For instance, in some examples, the additional three intra prediction modes can be selected such that, planar and DC modes are always included in the MPMs. In other words, the process of deriving the M MPMs may comprise including a planar mode and a DC mode among the MMPMs.

Alternatively, in some examples, the additional (M−3) intra prediction modes can be selected such that planar, DC, VERTICAL (i.e., INTRA_ANGULAR26) and/or HORIZONTAL (i.e., INTRA_ANGULAR10), and/or DIAGONAL (i.e., INTRA_ANGULAR18) modes are always included in the MPMs. In other words, the process of deriving the M MPMs may comprise including a Planar mode, a DC mode, and at least one of a VERTICAL mode, a HORIZONTAL mode or a DIAGONAL mode among the M MPMs.

In some examples, the additional (M−3) intra prediction modes may be selected from angular modes which are closest to the angular mode already included in the first three MPMs. In this example, the term 'closest' is measured by the difference of intra prediction mode indices or the absolute value of the difference of intra prediction mode indices, or the difference of intra prediction angles. For instance, in this example, as part of deriving the M MPMs, a video coder (e.g., video encoder 20 or video decoder 30) may derive three MPMs, wherein the three MPMs include at least one angular mode. Furthermore, in this example, the video coder may select one or more additional angular MPMs based on similarity with the at least angular mode. In this example, similarity is determined based on at least one of intra prediction mode index differences or intra prediction angle differences In accordance with some examples of this disclosure, in order to reduce the number of bits used for coding index values, certain variations in the number of bits that are utilized to code index values may be included when coding the non-MPM index. Thus, a video coder, such as video encoder 20 and video decoder 30, may determine whether an MPM index or a non-MPM index is being used to indicate a selected intra prediction mode of a plurality of intra prediction modes and, when a non-MPM index is identified, use either a fixed length code to represent the non-MPM index or a variable length code to represent the non-MPM index, depending on whether one or more criteria are met. In various examples, a video coder may determine the various criteria in different ways. For example, the criteria may be met if the non-MPM index is one of a predetermined number of first non-MPM indices of the plurality of intra prediction modes. In some examples, the criteria are met if the non-MPM index is one of a predetermined number of last non-MPM indices. In some examples, the criteria are met if the non-MPM index is one of a predetermined number of selected non-MPM indices.

Thus, in accordance with one example of this disclosure, video encoder 20 may derive M most probable modes for intra prediction of a block of video data from among a plurality of intra prediction modes. In this example, M may be greater than 3. Furthermore, video encoder 20 may encode a syntax element that indicates whether a MPM index or a non-MPM index is used to indicate a selected intra prediction mode of the plurality of intra prediction modes for intra prediction of the block of video data. Furthermore, in this example, video encoder 20 may encode, based on the syntax element indicating the non-MPM index is used to indicate the selected intra prediction mode, the non-MPM index. In this example, the non-MPM index may be encoded in the bitstream as a code word shorter than $\lceil \log_2 N \rceil$ bits if the non-MPM index satisfies a criterion and is encoded as a fixed length code with $\lceil \log_2 N \rceil$ bits otherwise. In this example, there may be a total of N available values of the non-MPM index. Furthermore, video encoder 20 may encode the block of video data based on the selected intra prediction mode. In this disclosure, $\lceil \; \rceil$ represents the rounding up operation.

In this example, the block of video data may be a current CU in a current picture of the video data and the selected intra prediction mode for the block of video data may be a selected intra prediction mode for a current PU of the current CU. Furthermore, in this example, to encode a syntax element that indicates whether an MPM index or a non-MPM index is used to indicate the selected intra prediction mode, video encoder 20 may include, in a bitstream, data indicating a syntax element (e.g., prev_intra_luma_pred_flag) that indicates whether a MPM index (e.g., mpm_idx) or a non-MPM index (e.g., rem_intra_luma_pred_mode) is used to indicate, for the current PU, the selected intra prediction mode of a plurality of intra prediction modes. Furthermore, in some such examples, to encode the block of video data based on the selected intra prediction mode, video encoder 20 may generate a predictive block for the PU using the selected intra prediction mode and video encoder 20 may generate residual data that represents pixel differences between the current CU and the predictive block. In some examples, video encoder 20 may transform and quantize the residual data and include, in a bitstream, entropy encoded syntax elements representing the resulting quantized transform coefficients.

In one example, the criterion may be met if the non-MPM index is one of a predetermined number of first non-MPM indices of the plurality of intra prediction modes. For example, for non-MPM modes, both the encoder and decoder may assign an index value to each of the available non-MPM modes. With the decoded index value, the decoder will know which non-MPM mode is signaled. In one example, when a non-MPM index is one of the first M index values, the non-MPM index may be within the range of 0~(M-1). In another example, the criterion may be met if the non-MPM index is one of a predetermined number of last non-MPM indices. In another example, the criterion may be met if the non-MPM index is one of a predetermined number of selected non-MPM indices.

In a similar example, video decoder 30 may derive M MPMs for intra prediction of the block of video data from among a plurality of intra prediction modes. In this example, M may be greater than 3. Furthermore, in this example, video decoder 30 may decode a syntax element that indicates whether a MPM index or a non-MPM index is used to indicate a selected intra prediction mode of the plurality of intra prediction modes for intra prediction of the block of video data. As before, the MPM index indicates which of the M most probable modes is the selected intra prediction mode, and the non-MPM index indicates which of the plurality of intra prediction modes other than the M MPMs is the selected intra prediction mode. Furthermore, in this example, based on the MPM index indicating the selected intra prediction mode, video decoder 30 may decode the non-MPM index. In this example, the non-MPM index is encoded in the bitstream as a code word shorter than $\lceil \log_2 N \rceil$ bits if the non-MPM index satisfies a criterion and is encoded in the bitstream as a fixed length code with $\lceil \log_2 N \rceil$ bits otherwise. In this example, there is a total of N available values of the non-MPM index. Video decoder 30 may reconstruct the block of video data based on the selected intra prediction mode.

In this example, the block of video data may be a current CU in a current picture of the video data and the selected intra prediction mode for the block of video data may be a selected intra prediction mode for a current PU of the current CU. Furthermore, in this example, to decode the syntax element that indicates whether a MPM index or a non-MPM index is used to indicate the selected intra prediction mode for intra prediction of the current PU, video decoder 30 may decode or otherwise obtain, from a bitstream, a syntax element (e.g., prev_intra_luma_pred_flag) that indicates whether a MPM index (e.g., mpm_idx) or a non-MPM index (e.g., rem_intra_luma_pred_mode) is used to indicate a selected intra prediction mode for the current PU. Furthermore, in some examples, as part of reconstructing the block of video data based on the selected intra prediction mode, video decoder 30 may generate a predictive block for the current PU using the selected intra prediction mode. In such examples, video decoder 30 may reconstruct the current CU using residual values by adding samples of the predictive blocks of PUs of the CU to corresponding samples of transform blocks of TUs of the current CU In one example, the criterion may be met if the non-MPM index is one of a predetermined number of first non-MPM indices of the plurality of intra prediction modes. For instance, the criterion may be that the non-MPM index is one of the first X non-MPM indices of the plurality of intra prediction modes, X being an integer. In another example, the criterion may be met if the non-MPM index is one of a predetermined number of last non-MPM indices. For instance, the criterion may be that the non-MPM index is one of the last X non-MPM indices of the plurality of intra prediction modes, X being an integer. In another example, the criterion may be met if the non-MPM index is one of a predetermined number of selected non-MPM indices. For instance, the criterion may be that the non-MPM index is one of X selected non-MPM indices of the plurality of intra prediction modes, X being an integer.

Thus, when coding the non-MPM index, all the available N non-MPM indexes, except for the first M or the last M or selected M, index values may be coded using fixed length code with $\lceil \log_2 N \rceil$ bits, while the M index values is signaled using code word shorter than $\lceil \log_2 N \rceil$ bits. In this example, M may or may not be equal to the number of MPMs. Alternatively, all the available N non-MPM indexes are coded using fixed length code with $\lceil \log_2 N \rceil$ bits.

Alternatively, in some examples, a one-bit flag, indicating whether the non-MPM index refers to a horizontal or vertical mode, is first signaled with context modeling, then an index further specifying which non-MPM is selected is further signaled. Thus, in this example, video encoder 20 may encode, based on a syntax element (e.g., prev_intra_luma_pred_flag) indicating the non-MPM index (e.g., rem_intra_luma_pred_mode) is used to indicate the selected intra prediction mode for the block of video data, a second syntax element indicating whether the non-MPM index refers to one of a horizontal mode or a vertical mode. Similarly, video decoder 30 may decode, from the bitstream, based on a syntax element (e.g., prev_intra_luma_pred_flag) indicating a non-MPM index is used, a second syntax element indicating whether the non-MPM index refers to one of a horizontal mode or a vertical mode.

In some examples, when more than three MPMs are used for signaling the intra prediction mode, during the encoder mode decision, for each PU, the first K (K>=2) MPMs are inserted into the candidate intra prediction mode list which is to be checked by rate-distortion optimization. The value of K may depend on whether the left neighboring intra prediction mode IntraModeL and above neighboring intra prediction mode IntraModeA are the same. For example, K=(IntraModeL==IntraModeA) ? 2:3. In other words, in this example, K is set equal to 2 if IntraModeL is equal to IntraModeA and set equal to 3 otherwise.

In some examples, the number of MPMs may depend on CU or PU sizes. For example, the number of MPMs may be greater for larger CU or PU sizes. Alternatively, in some examples, the number of MPMs may be signaled in a sequence parameter set, a picture parameter set, or a slice header.

In accordance with some examples of this disclosure, a video coder, such as video encoder 20 and video decoder 30, may use more than 33 angular intra prediction modes. For example, the video coder may use 65 angular modes. In this example, the 65 prediction angles (directions) may be defined such that the interpolation is performed in 1/32 pel (pixel) accuracy. As discussed above, when a PU is encoded using an angular intra prediction mode, a video coder may determine a fractional position between two reconstructed neighboring samples by projecting, along a prediction direction associated with the angular intra prediction mode, the coordinates of a sample of the predictive block of the PU. When the interpolation is performed in 1/32 pel accuracy, 31 equidistant positions are defined between the two adjacent reconstructed neighboring pixels and the video coder sets the determined fractional position as to the closest one of the reconstructed neighboring pixels or the 31 positions. Using a limited number of positions instead of a real number line may simplify the processing involved in performing the interpolation calculations. As briefly described above, performing interpolation using 1/32 pel accuracy despite more than 33 angular intra prediction modes being available may increase accuracy while keeping the level of complexity the same. In particular, in order to perform interpolations with increased accuracy, an increased number of different interpolation filters would need to be designed and stored at both the encoder and the decoder. Therefore, for example, by avoiding the need for increased interpolation accuracy, the complexity (only 32 different interpolation filters still being utilized) of the video coder may remain the same using 1/32 pel interpolations.

Thus, in the examples above where more than 33 angular intra prediction modes are used (e.g., 65 angular intra prediction modules are used) and interpolation is performed in 1/32 pel accuracy, as part of encoding a block of the video data, video encoder 20 may encode syntax information (e.g., mpm_idx or rem_intra_luma_pred_mode) that indicates a selected intra prediction mode for the block of video data from among a plurality of intra prediction modes that includes more than 33 angular intra prediction modes. In this example, the angular intra prediction modes are defined such that interpolation is performed in 1/32 pel accuracy. Furthermore, in this example, video encoder 20 may encode the block of video data based on the selected intra prediction mode.

Figure 5:
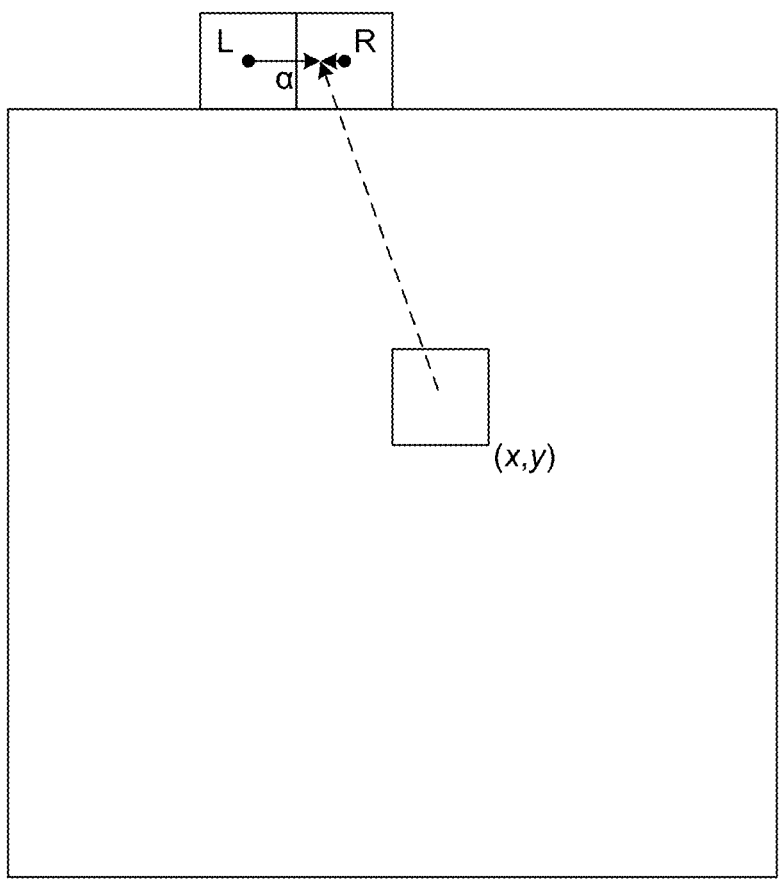
FIG. 5 is a conceptual diagram illustrating an example technique for generating a prediction sample for a block of video data according to an angular intra prediction mode.

In this example, the block of video data may be a current CU in a current picture of the video data and the selected intra prediction mode for the block of video data is a selected intra prediction mode for a current PU of the current CU. Furthermore, in this example, as part of encoding the block of video data, video encoder 20 may, for each respective sample of a predictive block of the current PU, video encoder 20 may determine a fractional position between two neighboring reconstructed samples of the current picture. FIG. 5 is a conceptual diagram illustrating an example technique for generating a prediction sample for a block of video data according to an angular intra prediction mode. For instance, in the example of FIG. 5, video encoder 20 may determine a fractional position α between neighboring samples L and R. The two neighboring reconstructed samples neighbor the current PU. Video encoder 20 may determine the fractional position by projecting, along a prediction direction associated with the selected intra prediction mode, a coordinate of the respective sample to a row or column of neighboring reconstructed samples containing the two neighboring reconstructed samples. For instance, in the example of FIG. 5, line 60 shows the prediction direction associated with the selected intra prediction mode and (x,y) is the coordinate of the respective sample 62. In this example, video encoder 20 may calculate a prediction value of the respective sample using an interpolation filter that uses values of the two neighboring reconstructed samples to interpolate a value at the determined fractional position. This interpolation is in 1/32 pel accuracy. Additionally, in this example, as part of encoding the block of video data, video encoder 20 may generate residual data that represents pixel differences between the current block and the predictive block. Video encoder 20 may transform and quantize the residual data and include, in a bitstream, entropy encoded syntax elements representing the resulting quantized transform coefficients.

Similarly, in one example, video decoder 30 may decode syntax information (e.g., mpm_idx or rem_intra_luma_pred_mode) that indicates a selected intra prediction mode for a block of video data from among a plurality of intra prediction modes. In this example, the plurality of intra prediction modes includes greater than 33 angular intra prediction modes. The angular intra prediction modes may be defined such that interpolation is performed in 1/32 pel accuracy. Video decoder 30 may reconstruct the block of video data based on the selected intra prediction mode.

Thus, in this example, the block of video data may be a current CU in a current picture of the video data and the selected intra prediction mode for the block of video data may be a selected intra prediction mode for a current PU of the current CU. As part of reconstructing the block of video data, for each respective sample of a predictive block of the current PU, video decoder 30 may determine a fractional position between two neighboring reconstructed samples of the current picture by projecting, along a prediction direction associated with the selected intra prediction mode, a coordinate of the respective sample to a row or column of neighboring reconstructed samples containing the two neighboring reconstructed samples. Additionally, video decoder 30 may calculate a prediction value of the respective sample using an interpolation filter that uses values of the two neighboring reconstructed samples to interpolate a value at the determined fractional position. In this example, this interpolation is in 1/32 pel accuracy. Video decoder 30 may reconstruct a coding block of the current CU using residual values by adding samples of the predictive blocks of PUs of the CU to corresponding samples of transform blocks of TUs of the current CU.

In the examples above, video encoder 20 and video decoder 30 may use more than 33 angular intra prediction modes. For instance, the plurality of angular intra prediction modes may include 65 angular intra prediction modes. Furthermore, in the examples above, the interpolation filter may be a two-tap bi-linear interpolation filter. In some such examples, the interpolation filter is formulated as:

$$p_{xy} = (1-\alpha) \cdot L + \alpha \cdot R$$

where $p_{xy}$ is the calculated value of the respective sample, L and R are values of the two reconstructed neighboring samples, and α is the determined fractional position.

As indicated above, in accordance with some examples of this disclosure, a video coder may use more than 33 angular intra prediction modes. In one such example, for each PU, it is restricted that only N angular modes are available to be used, which are adaptively selected from all the available angular modes using the coded information of the left and above neighboring blocks. For instance, in this example, video encoder 20 is prohibited from (i.e., restricted from) selecting particular angular intra prediction modes when encoding a block (e.g., PU) of a picture. In this example, video encoder 20 may be prohibited from selecting the particular angular intra prediction modes despite the particular angular intra prediction modes being available to video encoder 20 for use in encoding other blocks of the same picture, and despite the fact that the particular angular intra prediction modes may offer better compression performance than angular intra prediction modes that video encoder 20 is allowed to use for encoding the block.

Thus, in an example where only N angular intra prediction modes are available to be used, video encoder 20 and video decoder 30 may select, based on intra prediction modes used to decode one or more neighboring blocks, a subset of N angular intra prediction modes from among the plurality of angular intra prediction modes. In this example, the syntax information that indicates the selected intra prediction mode for the current PU may comprise an index that indicates the selected intra prediction mode. In this example, the index is a fixed length code consisting of $\lceil \log_2 N \rceil$ bits. In this example, N may be various integers, such as 33.

In some examples, the number of total intra prediction modes depends on CU or PU sizes. For instance, a video coder (e.g., video encoder 20 or video decoder 30) may determine, based on at least one of a CU size or a PU size, a total number of intra prediction modes in the plurality of intra prediction modes. For example, if a CU size or a PU size is below a particular threshold only angular intra prediction modes with index values less than a particular number are available. In some examples, a total number of intra prediction modes may be signaled in an SPS, a PPS, or a slice header.

As discussed above, video encoder 20 and video decoder 30 may apply an interpolation filter to reconstructed neighboring samples to determine values of samples in a predictive block. In accordance with some techniques of this disclosure, an N-tap intra interpolation filter can be applied, where N is larger than 2. For instance, N may be 3 and 4. When a video coder, such as video encoder 20 or video decoder 30, uses an N-tap intra interpolation filter to determine the value of a sample in a predictive block, the video coder may calculate the value based on the values of N reconstructed neighboring samples. Using N-tap (N>2) interpolation may be advantageous over existing 2-tap interpolation since it may provide more accurate interpolation results by including more reference samples (N reference samples) during the interpolation. Statistically, using more reference samples will introduce better interpolation accuracy with higher complexity. The N-tap intra interpolation filter may include a sinc interpolation filter, a Gaussian interpolation filter and an interpolation filter derived using an image correlation model. A sinc filter removes all frequency components above a given cutoff frequency, without affecting lower frequencies, and has linear phase response. Thus, the N-tap interpolation filter may comprise at least one of a sinc interpolation filter, a Gaussian interpolation filter and an interpolation filter derived using an image correlation model.

In this way, video encoder 20 may encode syntax information that indicates a selected intra prediction mode for the block of video data from among a plurality of intra prediction modes. For example, video encoder 20 may signal, in a bitstream, a mpm_idx or a rem_intra_luma_pred_mode syntax element for the current PU. Furthermore, video encoder 20 may apply an N-tap intra interpolation filter to neighboring reconstructed samples of the block of video data according to the selected intra prediction mode, where N is greater than 2. Video encoder 20 may apply the N-tap intra interpolation filter to determine filtered neighboring reconstructed samples that may correspond to positions between full-pel neighboring reconstructed samples. Video encoder 20 may encode the block of video data based on the filtered neighboring reconstructed samples according to the selected intra prediction mode. For instance, video encoder 20 may use the filtered neighboring reconstructed samples to generate a predictive block and generate residual data for the block of video data based on the predictive block.

In this example, the block of video data may be a current CU in a current picture of the video data and the selected intra prediction mode for the block of video data is a selected intra prediction mode for a current PU of the current CU. Furthermore, in this example, for each respective sample of a prediction block of the current PU, video encoder 20 may determine a fractional position between two neighboring reconstructed samples of a set of neighboring reconstructed samples by projecting, along a prediction direction associated with the selected intra prediction mode, a coordinate of the respective sample to a row or column of neighboring reconstructed samples containing the two neighboring reconstructed samples. The set of neighboring reconstructed samples including reconstructed samples above and left of the current PU in the current picture. Furthermore, video encoder 20 may calculate a value of the respective sample by applying an N-tap intra interpolation filter to neighboring reconstructed samples to interpolate a value at the determined fractional position, wherein N is greater than 2. As part of encoding the block of video data based on the filtered neighboring reconstructed samples, video encoder 20 may generate residual data that represents pixel differences between the current CU and the predictive block. Video encoder 20 may transform and quantize the residual data and include, in a bitstream, entropy encoded syntax elements representing the resulting quantized transform coefficients.

Similarly, video decoder 30 may decode syntax information that indicates a selected intra prediction mode for the block of video data from among a plurality of intra prediction modes. For example, video decoder 30 may obtain, from a bitstream, a mpm_idx or a rem_intra_luma_pred_ mode syntax element. Furthermore, video decoder 30 may apply an N-tap intra interpolation filter to neighboring reconstructed samples of the block of video data according to the selected intra prediction mode, wherein N is greater than 2. Furthermore, video decoder 30 may reconstruct the block of video data based on the filtered neighboring reconstructed samples according to the selected intra prediction mode.

In this example, the block of video data may be a current CU in a current picture of the video data and the selected intra prediction mode for the block of video data is a selected intra prediction mode for a current PU of the current CU. In this example, for each respective sample of a predictive block of the current PU, video decoder 30 may determine a fractional position between two neighboring reconstructed samples of a set of neighboring reconstructed samples by projecting, along a prediction direction associated with the selected intra prediction mode, a coordinate of the respective sample to a row or column of neighboring reconstructed samples containing the two neighboring reconstructed samples. The set of neighboring reconstructed samples including reconstructed samples above and left of the current PU in the current picture. Video decoder 30 may calculate a prediction value of the respective sample by applying an N-tap intra interpolation filter to neighboring reconstructed samples to interpolate a value at the determined fractional position, wherein N is greater than 2. In this example, as part of reconstructing the block of video data (e.g., the current CU), video decoder 30 may reconstruct a coding block of the current CU using residual values by adding samples of the predictive blocks of PUs of the CU to corresponding samples of transform blocks of TUs of the current CU.

When the interpolation filter is derived using an image correlation model, an image correlation function based on Generalized Gaussian function may be applied, and the interpolation function for each fractional position is further derived using the least mean square estimate. For example, when deriving the interpolation filter using an image correlation model, assuming the image correlation model is $R(i,j)=\rho_x^{|i|}, \rho_y^{|j|}$, where i and j indicates the distance between two image samples in the horizontal and vertical axis, $\rho_x$ is the image correlation factor in horizontal direction, $\rho_y$ is the image correlation factor in vertical direction, both $\rho_x$ and $\rho_y$ may be within the range of [0, 1], meaning that a larger image distance outputs a smaller correlation. In another example, assuming there are four samples, a, b, c and d, and the fractional sample e is to be interpolated. To derive a desirable interpolation filter [f0, f1, f2, f3], the interpolation process $[a, b, c, d]*[f0\ f1, f2, f3]^T=[e]$ may be rewritten as $A*F=E$, where $A=[a, b, c, d]$, $F=[f0\ f1, f2, f3]^T$, and $E=[e]$. According to a least mean square estimate, the optimal filter F is $F^*=(A^T*A)^{-1}*A^T E$, and "$(A^T*A)^{-1}*A^T E$" may be determined by the assumed image correlation model. Therefore, using the image correlation model, the interpolation filter for each fractional sample may be derived using a least mean square estimate.

Thus, in some examples where a video coder derives the intra interpolation filter using an image correlation model, the video coder may apply an image correlation function based on Generalized Gaussian function. Additionally, the video coder may derive an interpolation function for each fractional position using a least mean square estimate.

In some examples, when a video coder applies a Gaussian interpolation filter, the parameter controlling the smoothing strength of the filter may vary depending on block size. Therefore, in such examples, the intra interpolation filter may comprise a Gaussian interpolation filter and a parameter controlling a smoothing strength of the Gaussian interpolation filter varies based on block sizes. For example, the Gaussian interpolation filter may be formulated as:

$$G(x, \sigma) = \frac{1}{\sqrt{2\pi}\,\sigma} e^{-\frac{1}{2\sigma^2}},$$

where
$G(x, \sigma)$, x indicates the fractional position, and $\sigma$ controls the smoothing strength. Therefore, a larger value of $\sigma$ generates a Gaussian interpolation filter with increased smoothing strength.

Furthermore, in some examples, a video coder may select the interpolation filter to apply. In such examples, the selection of the filter may depend on the block sizes and or relative sample position inside the block. Therefore, in such examples, the video coder may select the intra interpolation filter based on at least on of block size or relative sample position inside the block. For example, assuming a set of different interpolation filters have been designed, namely f1, f2, ... fy, different interpolation filters may be used for different pixel positions inside the current block. For example, interpolation filter f1 may be utilized for the first two rows of pixels inside the current block, and interpolation filter f2 may be utilized for the remaining rows of pixels.

Different interpolation filters may be available for intra prediction of a single block, and the selection of the interpolation filter may be explicitly signaled or derived from neighboring decoded information, including the reconstructed sample values and intra prediction modes. Thus, in such examples, the video coder may select the intra interpolation filter based on at least one of reconstructed sample values or intra prediction modes of neighboring blocks. For example, assuming a set of different interpolation filters have been designed, namely f1, f2, ... fy, different interpolation filters may be used for different intra prediction modes. For example, interpolation filter f1 may be utilized for the diagonal Intra prediction mode, and interpolation filter f2 may be utilized for the vertical Intra prediction mode.

In accordance with some examples of this disclosure, multiple intra prediction directions can be allowed for one PU without additional signaling of multiple intra prediction modes. For example, video decoder 30 may decode syntax information that indicates a selected intra prediction mode for a block of video data (e.g., a PU) from among a plurality of intra prediction modes. Furthermore, video decoder 30 may determine one or more additional intra prediction modes for the block without decoding additional syntax information indicting additional intra prediction modes. In this example, video decoder 30 may reconstruct the block of video data according to the selected intra prediction mode and the one or more additional intra prediction modes. For instance, video decoder 30 may reconstruct a CU containing the block based on residual data for the CU and a predictive block for the block generated based on the selected intra prediction mode and the one or more additional intra prediction modes.

In some examples where multiple intra prediction directions are allowed for one PU without additional signaling of multiple intra prediction modes, the PU comprises a plurality of sub-blocks and each sub-block within the PU may have its own intra prediction mode. In this example, a sub-block within a PU is a 4×4 block. In this way, in one example, as part of determining the one or more additional intra prediction modes for the block of video data mentioned above, video decoder 30 may determine respective intra prediction modes for each of a plurality of sub-blocks of the block of video data without decoding additional syntax information indicating additional intra prediction modes. Furthermore, in this example, as part of reconstructing the block of video data, video decoder 30 may reconstruct the sub-blocks according to the respective determined intra prediction modes.

Furthermore, in some examples, the intra prediction direction for one sub-block can be derived as the intra prediction mode of the closest above or left reference block. In this way, as part of determining respective intra prediction modes for each of a plurality of sub-blocks of the block of video data, video decoder 30 may derive a respective intra prediction mode for at least one of the sub-blocks as an intra prediction mode of a closest above or left reference block. In some examples, for each sub-block of the current PU, the prediction is a weighted sum of two prediction directions, which come from the closest block in the above reference row and the left reference column. In this way, as part of determining respective intra prediction modes for each of a plurality of sub-blocks of the block of video data, video decoder 30 may derive a respective intra prediction mode for at least one of the sub-blocks based on one or both of an above reference block and a left reference block.

Similarly, as part of a process of encoding video data, video encoder 20 may encode syntax information that indicates a selected intra prediction mode for a block of video data (e.g., a PU) from among a plurality of intra prediction modes. Video encoder 20 may determine one or more additional intra prediction modes for the block of video data without encoding additional syntax information indicting additional intra prediction modes. Video encoder 20 may encode the block of video data according to the selected intra prediction mode and the one or more additional intra prediction modes. In some examples, as part of determining one or more additional intra prediction modes for the block of video data, video encoder 20 may determine respective intra prediction modes for each of a plurality of sub-blocks of the block of video data without encoding additional syntax information indicting additional intra prediction modes, and, as part of encoding the block of video data, video encoder 20 may encode the sub-blocks according to the respective determined intra prediction modes. In some examples, as part of determining respective intra prediction modes for each of a plurality of sub-blocks of the block of video data, video encoder 20 may derive a respective intra prediction mode for at least one of the sub-blocks as an intra prediction mode of a closest above or left reference block. In some examples, as part of determining respective intra prediction modes for each of a plurality of sub-blocks of the block of video data, video encoder 20 may derive a respective intra prediction mode for at least one of the sub-blocks based on one or both of an above reference block and a left reference block.

As mentioned above, video encoder 20 may perform a process to decide which intra prediction mode to select for a PU. Because performing a full rate-distortion optimization process for all 35 available intra prediction modes in HEVC may be impractical in some instances, video encoder 20 may determine a list of N intra prediction mode candidates by checking intra prediction modes using a "Sum of Absolute Transform Difference" (SATD) criterion. When more than 35 intra prediction modes are available, as is the case in some examples of this disclosure, even checking the intra prediction modes using the SATD criterion may become excessively time consuming or resource intensive.

Hence, in accordance with an example of this disclosure, to reduce, e.g., largely reduce, the number of SATD checks for intra angular prediction at video encoder 20, a K stage SATD check scheme is proposed. In this example, K is greater than 2. In this example, for each stage of SATD check, only a selected number of intra prediction modes, which come from a pre-defined subset of intra prediction angles, may be checked with SATD cost. For instance, in a first stage of SATD check, video encoder 20 may check each of the intra prediction angles from the pre-defined subset of intra prediction modes with SATD cost, and may decide the best N intra prediction modes. In this example, N is a pre-defined constant value depending on the block size. After that, for each remaining stage of the SATD check, video encoder 20 only checks the intra prediction angles which are close, in terms of prediction angle difference, to the best N intra prediction modes decided in the previous stage with SATD cost, and video encoder 20 decides the best N intra prediction modes for the next stage.

In one example, when the proposed 65 angular modes are applied, video encoder 20 applies a two stage SATD check scheme to decide which of the intra prediction modes will be further examined with more efficient cost criterion (e.g., rate-distortion (R-D) cost) at the encoder side. In the first stage, video encoder 20 checks only the original 35 intra prediction modes as defined in HEVC, including Planar, DC and 33 angular modes, with SATD cost, then the best N (N can be the same as used in HEVC reference software) intra prediction modes are decided. In the second stage, video encoder 20 further checks only the intra angular modes which are the direct neighbors (angular mode index±1) of, i.e., adjacent to, the best N angular modes with SATD cost. Video encoder 20 may decide to further check the final best N intra prediction modes with R-D cost.

Thus, in some examples, video encoder 20 may determine a respective SATD cost for encoding the block of video data according to each of a first subset of intra prediction modes. Additionally, video encoder 20 may determine a second subset of the intra prediction modes based on the determined SATD costs of the first subset of intra prediction modes. Video encoder 20 may determine a respective SATD cost for encoding the block of video data according to each of the second subset of intra prediction modes. Furthermore, video encoder 20 may select one of the intra prediction modes based on the determined SATD costs of the first and second subsets of intra prediction modes. Video encoder 20 may encode the block of video data according to the selected one of the intra prediction modes.

In this example, as part of determining the second subset of the intra prediction modes based on the determined SATD costs of the first subset of intra prediction modes comprises, video encoder 20 may identify N intra prediction modes of the first subset of intra prediction modes having a lowest N of the determined SATD costs. Video encoder 20 may include intra prediction modes having intra prediction angles proximate to intra prediction angles of the identified N intra prediction modes in the second subset of intra prediction modes. As part of including intra prediction modes having intra prediction angles proximate to intra prediction angles of the identified N intra prediction modes in the second subset of intra prediction modes, video encoder 20 may include intra prediction modes having intra prediction angles adjacent to intra prediction angles of the identified N intra prediction modes in the second subset of intra prediction modes.

Furthermore, in some examples, as part of selecting one of the intra prediction modes based on the determined SATD costs of the first and second subsets of intra prediction modes, video encoder 20 may identify N intra prediction modes of the first and second subsets of intra prediction modes having a lowest N of the determined SATD costs. In this example, video encoder 20 may determine a respective rate-distortion cost for each of the identified N intra prediction modes. Moreover, in this example, video encoder 20 may select one of the identified N intra prediction modes based on the determined rate-distortion costs.

In the examples of this disclosure related to the SATD checks, the value of N depends on a block size of the block of video data. Furthermore, in some such examples, the first subset of intra prediction modes may include a Planar intra prediction mode, a DC intra prediction mode, and 33 angular prediction modes.

In some examples of this disclosure related to the SATD checks, the first and second subsets of intra prediction modes comprise first and second ones of K subsets of intra prediction modes and K is greater than or equal to 2. In such examples, for each current subset of the K subsets of intra prediction modes, video encoder 20 may determine a respective SATD cost for encoding the block of video data according to each intra prediction mode of the current subset of intra prediction modes. Additionally, video encoder 20 may determine a next subset of the K subsets of intra prediction modes based on the determined SATD costs of the current subset of intra prediction modes.

Figure 6:
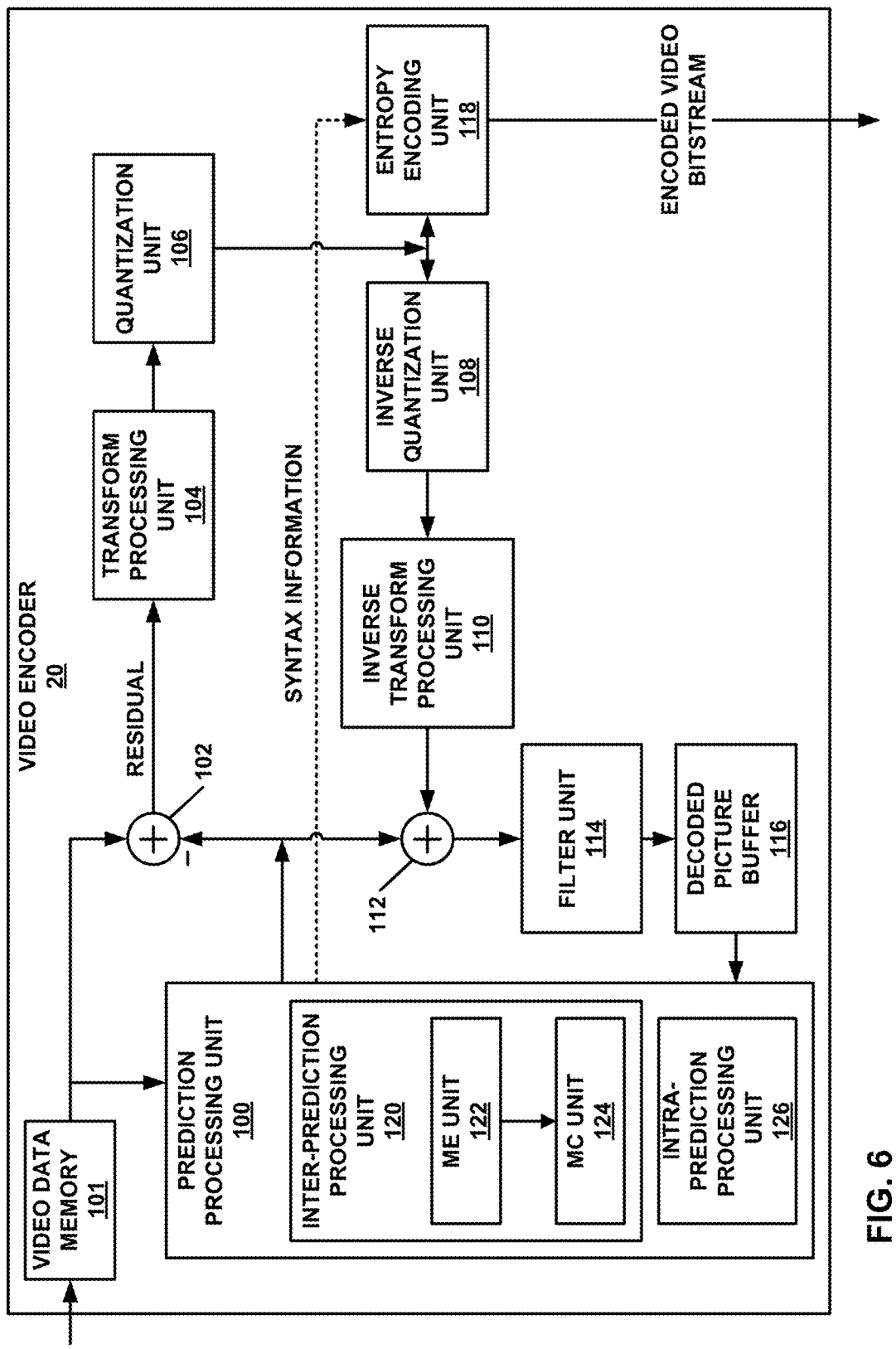
FIG. 6 is a block diagram illustrating an example video encoder that may implement the techniques described in this disclosure.

FIG. 6 is a block diagram illustrating an example video encoder 20 that may implement the techniques of this disclosure. FIG. 6 is provided for purposes of explanation and should not be considered limiting of the techniques as broadly exemplified and described in this disclosure. The techniques of this disclosure may be applicable to any of a variety of coding standards or methods.

In the example of FIG. 6, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra prediction processing unit 126. Inter-prediction processing unit 120 includes a motion estimation (ME) unit 122 and a motion compensation (MC) unit 124. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Intra prediction processing unit 126 may generate predictive data for a PU by performing intra prediction on the PU. The predictive data for the PU may include predictive blocks for the PU and various syntax elements. Intra prediction processing unit 126 may perform intra prediction on PUs in I slices, P slices, and B slices.

To perform intra prediction on a PU, intra prediction processing unit 126 may use multiple intra prediction modes to generate multiple sets of predictive blocks for the PU. When performing intra prediction using a particular intra prediction mode, intra prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra prediction processing unit 126 may use various numbers of intra prediction modes, e.g., DC, planar, or directional/angular prediction modes, as described herein. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

Video encoder 20 is an example of a video encoder configured to perform any of the techniques described in this disclosure. In accordance with one or more techniques of this disclosure, one or more units within video encoder 20 may perform the techniques described herein as part of a video encoding process. For example, intra prediction processing unit 126 and/or entropy encoding unit 118, may be configured to perform the techniques described herein as part of a video encoding process. In some examples, intra prediction processing unit 126 may be configured to perform the techniques described herein for deriving or selecting intra prediction modes and/or MPMs for intra prediction, the techniques using an increased number of MPMs and/or angular modes, and the techniques for applying an N-tap intra interpolation filter, where N is larger than 2. Intra prediction processing unit 126 may be configured to perform the techniques described herein for allowing multiple Intra prediction directions per block, e.g. respective directions for sub-blocks of the block, which may not require additional signaling of multiple intra prediction modes.

Intra prediction processing unit 126 may provide syntax information to entropy encoding unit 118, such as a selected intra prediction mode and/or MPM index for intra prediction. Intra prediction processing unit 126 and/or entropy encoding unit 118 may be configured to implement the techniques described herein for encoding or signaling the syntax information related to intra prediction, e.g., the selected intra prediction mode and/or MPM index for intra prediction, in an encoded video bitstream, which may be decoded by video decoder 30.

Figure 7:
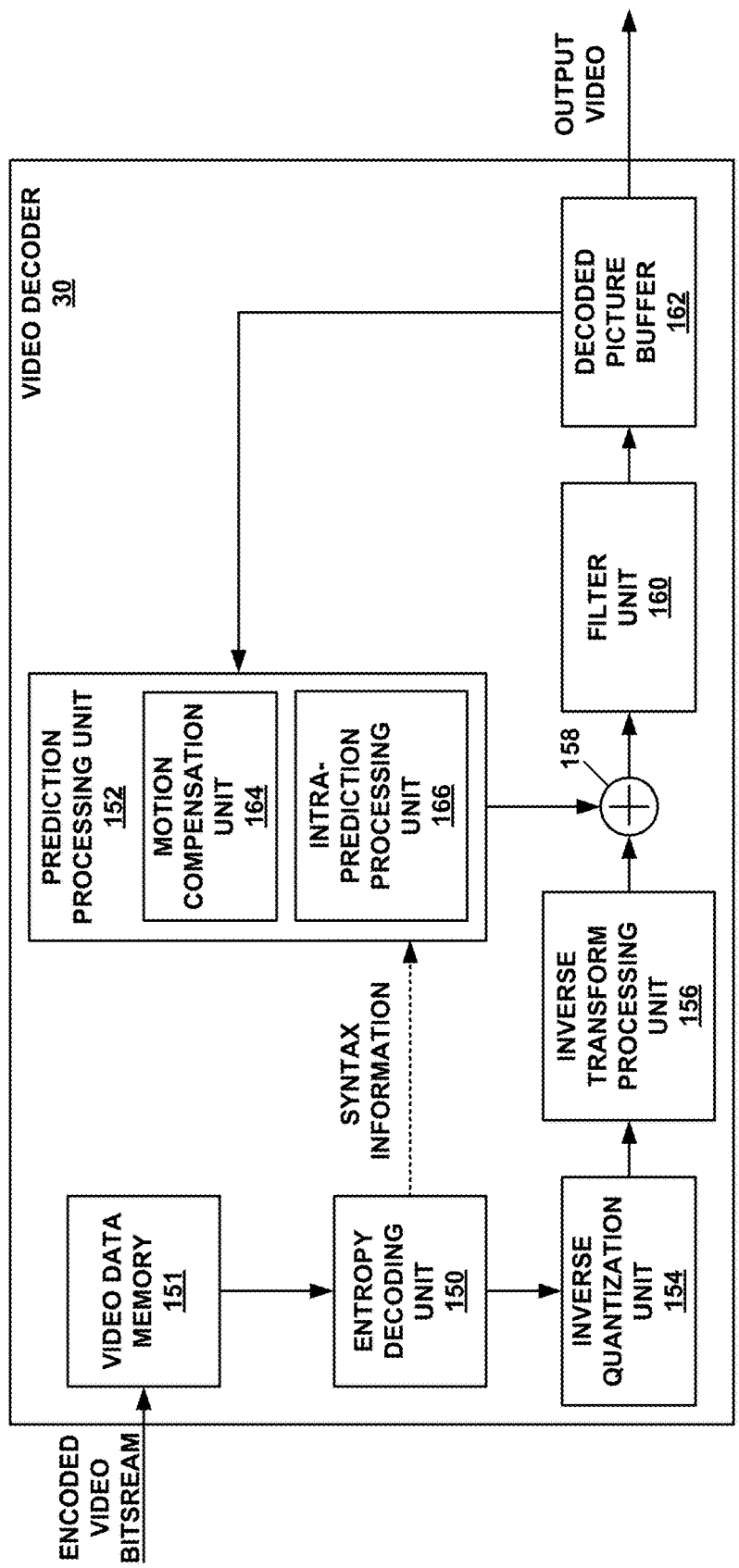
FIG. 7 is a block diagram illustrating an example video decoder that may implement the techniques described in this disclosure.

FIG. 7 is a block diagram illustrating an example video decoder 30 that is configured to implement the techniques of this disclosure. FIG. 7 is provided for purposes of explanation and is not limiting on the techniques as broadly exemplified and described in this disclosure. The techniques of this disclosure may be applicable to a variety of coding standards or methods.

In the example of FIG. 7, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra prediction processing unit 166. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices.

A coded picture buffer (CPB) formed by video data memory 151 may receive and store encoded video data (e.g., NAL units) of a bitstream. Entropy decoding unit 150 may receive NAL units from CPB formed by video data memory 151 and parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra prediction processing unit 166 may perform intra prediction to generate predictive blocks for the PU. Intra prediction processing unit 166 may use an intra prediction mode to generate the predictive luma, Cb, and Cr blocks for the PU based on reconstructed sample values of spatially-neighboring blocks. Intra prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive luma, Cb, and Cr blocks for the PU.

Reconstruction unit 158 may use the residual values from the luma, Cb, and Cr transform blocks associated with TUs of a CU and the predictive luma, Cb, and Cr blocks of the PUs of the CU, i.e., either intra prediction data or inter-prediction data, as applicable, to reconstruct the luma, Cb, and Cr coding blocks of the CU. For example, reconstruction unit 158 may add samples of the luma, Cb, and Cr transform blocks to corresponding samples of the predictive luma, Cb, and Cr blocks to reconstruct the luma, Cb, and Cr coding blocks of the CU.

Filter unit 160 may perform a deblocking operation to reduce blocking artifacts associated with the luma, Cb, and Cr coding blocks of the CU. Video decoder 30 may store the luma, Cb, and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Video decoder 30 is an example of a video decoder configured to perform any of the techniques described in this disclosure. In accordance with one or more techniques of this disclosure, one or more units within video decoder 30 may perform the techniques described herein as part of a video decoding process. For example, intra prediction processing unit 166 and/or entropy decoding unit 150 may be configured to perform the techniques described herein as part of a video decoding process. In some examples, intra prediction processing unit 166 may be configured to perform the techniques described herein for deriving or selecting intra prediction modes and/or MPMs for intra prediction, the techniques using an increased number of MPMs and/or angular modes, and the techniques for applying an N-tap Intra interpolation filter, where N is larger than 2. Intra prediction processing unit 166 may be configured to perform the techniques described herein for allowing multiple intra prediction directions per block, e.g. respective directions for sub-blocks of the block, which may not require additional signaling of multiple intra prediction modes.

Intra prediction processing unit 166 may receive syntax information from entropy decoding unit 150, such as a selected intra prediction mode and/or MPM index for intra prediction. Intra prediction processing unit 166 and/or entropy decoding unit 150 may be configured to implement the techniques described herein for decoding the syntax information related to intra prediction, e.g., the selected intra prediction mode and/or MPM index for intra prediction, from an encoded video bitstream.

In following subsections, examples implementations of particular techniques of this disclosure are be provided. In practice, any combination of any part of the examples may be used as a new example. The example implementations are shown in the form of edits to the JCTVC-N1003. In the following, text added to JCTVC-N1003 is shown between tags <ins> and </ins>, "ins" being short for "insert". Text deleted from JCTVC-N1003 is shown between tags <dlt> and </dlt>, "dlt" being short for "delete."

Several examples were described above in which video encoder 20 and video decoder 30 use more than three MPMs for signaling an intra prediction mode of a PU. In some such examples, video encoder 20 and video decoder 30 use CABAC coding to encode and decode MPM indexes. As part of CABAC encoding, video encoder 20 applies a binarization process to an MPM index to convert the MPM index into a binary code and video decoder 30 de-binarizes the binary code to recover the MPM index. In accordance with a technique of this disclosure, as shown in Table 9-32 below, the MPM index (mpm_idx) is binarized using a truncated Rice binarization process (TR) and the input parameter cMax is changed from 2 to 5 to accommodate larger values of the MPM index. Section 9.3.3.2 of JCTVC-N1003 describes an implementation of the Truncated Rice binarization process.

process for ctxInc for that binIdx is further specified in the subclauses given in parenthesis. As further described in subclause 9.3.4.2.1. of JCTVC-N1003, ctxInc is used to determine a value of ctxIdx, which is an index of a coding context. As shown in the edited version of Table 9-37 below, the first three bins of the MPM index may be coded using coding contexts selected using the context modeling methods of the added subclause 9.3.4.x.x below and remaining bins of the MPM index may be coded using bypass coding.

TABLE 9-37

Assignment of ctxInc to syntax elements with context coded bins

| Syntax element | binIdx | | | | | |
|---|---|---|---|---|---|---|
| | 0 | 1 | 2 | 3 | 4 | >=5 |
| ... | ... | ... | ... | ... | ... | ... |
| pcm_flag[ ][ ] | terminate | na | na | na | na | na |
| prev_intra_luma_pred_flag[ ][ ] | 0 | na | Na | na | na | na |
| mpm_idx[ ][ ] | <dlt>bypass</dlt> <ins>0,1,2 (subclause 9.3.4.x.x)</ins> | <del>bypass</del> <ins>3,4,5 (subclause 9.3.4.x.x)</ins> | <del>bypass</del> <ins>7,8 (subclause 9.3.4.x.x)</ins> | <dlt>na</dlt> <ins>bypass</ins> | <dlt>na</dlt> <ins>bypass</ins> | <dlt>na</dlt> <ins>bypass</ins> |
| rem_intra_luma_pred_mode[ ][ ] | bypass | bypass | bypass | bypass | bypass | bypass |
| intra_chroma_pred_mode[ ][ ] | 0 | bypass | bypass | na | na | na |
| ... | ... | ... | ... | ... | ... | ... |

TABLE 9-32

Syntax elements and associated binarizations

| Syntax element | Binarization | |
|---|---|---|
| | Process | Input parameters |
| ... | ... | ... |
| cu_transquant_bypass_flag | FL | cMax = 1 |
| cu_skip_flag | FL | cMax = 1 |
| pred_mode_flag | FL | cMax = 1 |
| part_mode | 9.3.3.5 | ( xCb, yCb ) = (x0, y0), log2CbSize |
| pcm_flag[ ][ ] | FL | cMax = 1 |
| prev_intra_luma_pred_flag[ ][ ] | FL | cMax = 1 |
| mpm_idx[ ][ ] | TR | cMax = <dlt>2</dlt><ins>5</ins>, cRiceParam = 0 |
| rem_intra_luma_pred_mode[ ][ ] | FL | cMax = 31 |
| intra_chroma_pred_mode[ ][ ] | 9.3.3.6 | — |
| rqt_root_cbf | FL | cMax = 1 |

Furthermore, as described above, video encoder 20 and video decoder 30 may use context modeling when coding (e.g., CABAC coding) one or more bins of an MPM index. In JCTVC-N1003, a binarized MPM index (i.e., mpm_idx) consists of three bins. However, in this disclosure, with larger numbers of MPMs, the binarized MPM index may include five or more bins. As specified in subclause 9.3.4.2.1 of JCTVC-N1003, a variable ctxInc is specified by the corresponding entry in Table 9-37 and when more than one value is listed in Table 9-37 for a binIdx, the assignment <ins>9.3.3.x Binarization Process for rem_intra_luma_pred_ mode
Input to this process is a request for a binarization for the syntax element rem_intra_luma_pred_mode.
Output of this process is the binarization of the syntax element.
    If rem_intra_luma_pred_mode equals to 28, the binarization string is "111";
    Otherwise, the binarization is fixed-length code with 5 bins.
9.3.4.x.x Derivation Process of ctxInc for the Syntax Element mpm_idx
Inputs to this process are the intra modes of the left neighboring block candIntraPredModeA, and the above neighboring block candIntraPredModeB.
Output of this process is the variable ctxInc.
The variable csbfCtx is derived using the current location (xS, yS), two previously decoded bins of the syntax element coded_sub_block_flag in scan order, and the transform block size log 2TrafoSize, as follows:
    When candIntraPredModeA equals to candIntraPredModeB, ctxInc is derived as follows
        ctxInc=candIntraPredMode$A$>1?0:1
    Otherwise
        ctxInc=(candIntraPredMode$A$ && candIntraPredMode$B$)?2:3</ins>

In accordance with some examples of this disclosure, more than three MPMs are defined. The following text describes example changes to JCTVC-N1003 to implement six MPMs.
8.4.2 Derivation Process for Luma Intra Prediction Mode
Input to this process is a luma location (xPb, yPb) specifying the top-left sample of the current luma prediction block relative to the top-left luma sample of the current picture<ins>, a prediction block size nPbS</ins>.
In this process, the luma intra prediction mode IntraPredModeY[xPb][yPb] is derived.

Table 8-1 specifies the value for the intra prediction mode and the associated names.

TABLE 8-1

Specification of intra prediction mode and associated names

| Intra prediction mode | Associated name |
|---|---|
| 0 | INTRA_PLANAR |
| 1 | INTRA_DC |
| 2 . . . 34 | INTRA_ANGULAR2..INTRA_ANGULAR34 |

Figure 8:
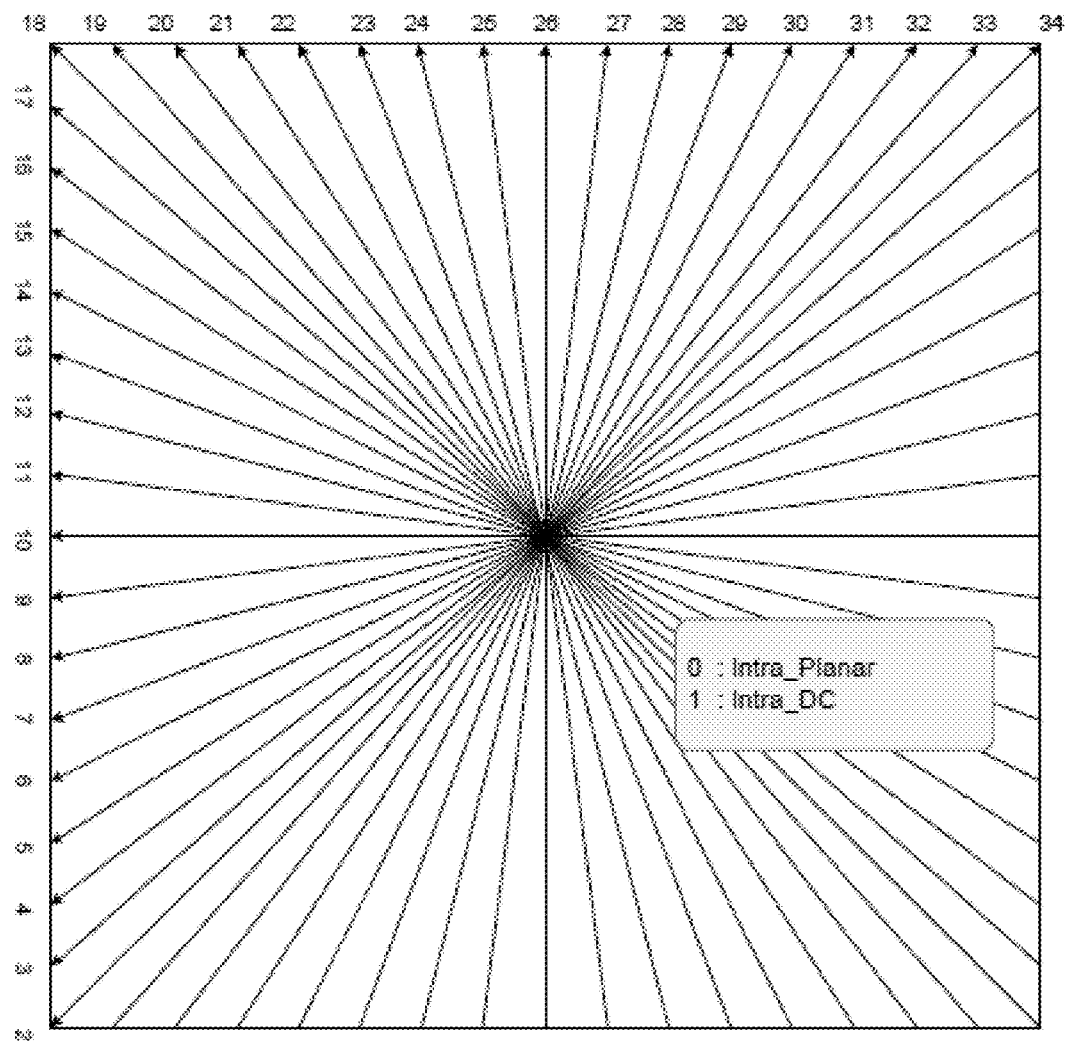
FIG. 8 is a conceptual diagram illustrating an example of intra prediction modes and corresponding mode indexes according to the techniques of this disclosure.

IntraPredModeY[xPb][yPb] labelled 0 . . . 34 represents directions of predictions as illustrated in FIG. 8-1, which is FIG. 8 of this disclosure.
IntraPredModeY[xPb][yPb] is derived by the following ordered steps:
  4. The neighbouring locations (xNbA, yNbA) and (xNbB, yNbB) are set equal to (xPb−1, yPb) and (xPb, yPb−1), respectively.
  5. For X being replaced by either A or B, the variables candIntraPredModeX are derived as follows:
    <ins>
      candIntraPredModeX is initialized as INTRA_DC.
      Initialize the counts of intra mode usage as 0: cntIntraPredModeX[i]=0, i=0, 1, . . . , 34
      Initialize the maximum count of intra mode usage as 0: cntMaxIntraPredModeX=0;
      For x=0 . . . nPbS−1, the following applies $$(xCurr, yCurr) = (X == A) ? (xNbA+x, yNbA) : (xNbA, yNbA+x)$$

The availability derivation process for a block in z-scan order as specified in subclause 6.4.1 is invoked with the location (xCurr, yCurr) set equal to (xPb, yPb) and the neighbouring location (xNbY, yNbY) set equal to (xNbX, yNbX) as inputs, and the output is assigned to availableX.
        If availableX is equal to TRUE and CuPredMode[xNbX][yNbX] is equal to MODE_INTRA, the following applies.
          cntIntraPredModeX[CuPredMode[xCurr][yCurr]]++
          if cntIntraPredModeX[CuPredMode[xCurr][yCurr]]>cntMaxIntraPredModeX, the following applies:
            cntMaxIntraPredModeX=cntIntraPredModeX[CuPredMode[xCurr][yCurr]];
            candIntraPredModeX=CuPredMode[xCurr][yCurr]
    </ins>
  <dlt>
    The availability derivation process for a block in z-scan order as specified in subclause 6.4.1 is invoked with the location (xCurr, yCurr) set equal to (xPb, yPb) and the neighbouring location (xNbY, yNbY) set equal to (xNbX, yNbX) as inputs, and the output is assigned to availableX.
    The candidate intra prediction mode candIntraPredModeX is derived as follows:
      If availableX is equal to FALSE, candIntraPredModeX is set equal to INTRA_DC.
      Otherwise, if CuPredMode[xNbX][yNbX] is not equal to MODE_INTRA or pcm_flag[xNbX][yNbX] is equal to 1, candIntraPredModeX is set equal to INTRA_DC,
      Otherwise, if X is equal to B and yPb−1 is less than ((yPb>>CtbLog2SizeY)<<CtbLog2SizeY), candIntraPredModeB is set equal to INTRA_DC.
      Otherwise, candIntraPredModeX is set equal to IntraPredModeY[xNbX][yNbX].</dlt>
  6. The candModeList[x] with x=0 . . . <dlt>2</dlt><ins>5</ins> is derived as follows:
    <ins> idxPlanar is set as 0, idxDC is set as 1;</ins>
    If candIntraPredModeB is equal to candIntraPredModeA, the following applies:
      If candIntraPredModeA is less than 2 (i.e. equal to INTRA_PLANAR or INTRA_DC), candModeList[x] with x=0 . . . <dlt>2</dlt><ins>5</ins> is derived as follows:

candModeList[0]=INTRA_PLANAR     (8-15)

candModeList[1]=INTRA_DC     (8-16)

candModeList[2]=INTRA_ANGULAR26     (8-17)

<ins>candModeList[3]=INTRA_ANGULAR10     (8-17)

candModeList[4]=INTRA_ANGULAR2     (8-17)

candModeList[5]=INTRA_ANGULAR18     (8-17)</ins>

Otherwise, candModeList[x] with x=0 . . . 5 is derived as follows:

candModeList[0]=candIntraPredMode$A$     (8-18)

<dlt>candModeList[2]=2+((candIntraPredMode$A$+29)%32)     (8-19)

candModeList[2]=2+((candIntraPredMode$A$−2+1)%32)     (8-20)</dlt>

<ins>candModeList[1]=INTRA_PLANAR     (8-20)

candModeList[2]=2+((candIntraPredMode$A$−1)%32)     (8-19)

candModeList[3]=2+((candIntraPredMode$A$+29)%32)     (8-20)

candModeList[4]=2+((candModeList[2]−1)%32)     (8-20)

candModeList[5]=INTRA_DC     (8-20)

idxPlanar=1 idxDC=5</ins>

Otherwise (candIntraPredModeB is not equal to candIntraPredModeA), the following applies:
      candModeList[0] and candModeList[1] are derived as follows:

candModeList[0]=candIntraPredMode$A$     (8-21)

candModeList[1]=candIntraPredMode$B$     (8-22)

If neither of candModeList[0] and candModeList[1] is equal to INTRA_PLANAR, candModeList[2] is set equal to INTRA_PLANAR, <ins> and the following applies:

maxDir=max(candModeList[0],candModeList[1])

minDir=min(candModeList[0],candModeList[1])

idxPlanar=2
      If either of candModeList[0] and candModeList[1] is equal to INTRA_DC, the following applies:

candModeList[3]=2+((maxDir+29)%32)  (8-21)

candModeList[4]=2+((maxDir−1)%32)  (8-22)

candModeList[5]=2+((candModeList[4]1)%32)  (8-22)

idxDC=(candModeList[0]==INTRA_DC)?0:1

Otherwise, candModeList[3]=INTRA_DC  (8-21)

candModeList[4]=2+((maxDir−1)%32)  (8-22)

If candModeList[4] equals to minDir, candModeList[4]++ candModeList[5]=2+((candModeList[4]+29)%32)  (8-22)

If candModeList[5] equals to maxDir, candModeList[5]−−
If candModeList[5] equals to candModeList[4], candModeList[5]=minDir+1 idxDC=3</ins>

Otherwise, if neither of candModeList[0] and candModeList[1] is equal to INTRA_DC, candModeList[2] is set equal to INTRA_DC, <ins> the following applies:

candModeList[3]=2+((candIntraPredMode*A*+29)%32)

candModeList[4]=2+((candIntraPredMode*A*−1)%32)

candModeList[5]=2+((candModeList[4]−1)%32)

idxPlanar=(candModeList[0]==INTRA_PLANAR)?0:1 idxDC=2</ins>

Otherwise, candModeList[2] is set equal to INTRA_ANGULAR26, the following applies:

<ins>candModeList[3]=INTRA_ANGULAR10 candModeList[4]=INTRA_ANGULAR2 candModeList[5]=INTRA_ANGULAR18 idxPlanar=(candModeList[0]==INTRA_PLANAR)?0:1 idxDC=1−idxPlanar</ins>

7. IntraPredModeY[xPb][yPb] is derived by applying the following procedure:
   If prev_intra_luma_pred_flag[xPb][yPb] is equal to 1, the IntraPredModeY[xPb][yPb] is set equal to candModeList[mpm_idx].
   Otherwise, IntraPredModeY[xPb][yPb] is derived by applying the following ordered steps:
   1) The array candModeList[x], x=0 . . . <dlt>2</dlt><ins>5</ins> is modified as the following ordered steps: <ins>
      i. candModeList[idxPlanar]=candModeList[0]
      ii. candModeList[idxDC]=candModeList[1]
      iii. candModeList[0]=INTRA_PLANAR
      iv. candModeList[1]=INTRA_DC</ins>
      v. When candModeList[<dlt>0</dlt><ins>2</ins>] is greater than candModeList[<dlt>1</dlt><ins>3</ins>], both values are swapped as follows:

(candModeList[<dlt>0</dlt><ins>2</ins>],candModeList[<dlt>1</dlt><ins>3</ins>])=Swap(candModeList[<dlt>0</dlt><ins>2</ins>],candModeList[<dlt>1</dlt><ins>3</ins>])  (8-23)

vi. When candModeList[<dlt>0</dlt><ins>2</ins>] is greater than candModeList[<dlt>2</dlt><ins>4</ins>], both values are swapped as follows:

(candModeList[<dlt>0</dlt><ins>2</ins>],candModeList[<dlt>2</dlt><ins>4</ins>])=Swap(candModeList[<dlt>0</dlt><ins>2</ins>],candModeList[<dlt>2</dlt><ins>4</ins>])  (8-24)

vii. <ins>When candModeList[2] is greater than candModeList[5], both values are swapped as follows:

candModeList[2],candModeList[5])=Swap(candModeList[2],candModeList[5])</ins> viii. When candModeList[<dlt>1</dlt><ins>3</ins>] is greater than candModeList[<dlt>2</dlt><ins>4</ins>], both values are swapped as follows:

(candModeList[<dlt>1</dlt><delete><ins>3</ins>],candModeList[<dlt>2</dlt><ins>4</ins>])=Swap(candModeList[<dlt>1</dlt><ins>3</ins>],candModeList[<dlt>2</dlt><ins>4</ins>])  (8-25)

ix. <ins>When candModeList[3] is greater than candModeList[5], both values are swapped as follows:

(candModeList[3],candModeList[5])=Swap(candModeList[3],candModeList[5])

x. When candModeList[4] is greater than candModeList[5], both values are swapped as follows:

(candModeList[4],candModeList[5])=Swap(candModeList[4],candModeList[5])</ins>

2) IntraPredModeY[xPb][yPb] is derived by the following ordered steps:
      i. IntraPredModeY[xPb][yPb] is set equal to rem_intra_luma_pred_mode[xPb][yPb].
      ii. For i equal to 0 to <dlt>2</dlt><ins>5</ins>, inclusive, when IntraPredModeY[xPb][yPb] is greater than or equal to candModeList[i], the value of IntraPredModeY[xPb][yPb] is incremented by one.

In the example adapted version of subclause 8.4.2 of JCTVC-N1003 shown above, the derivation process for the MPMs of the current PU includes a derivation process for a representative intra prediction mode (candIntraPredModeA) for a left neighboring column and a representative intra prediction mode (candIntraPredModeB) for an above neighboring row. In this example, is left neighboring column corresponds to samples (xNbA, yNbA+x) for x=x . . . nPbs and the above neighboring row corresponds to samples (xNbA+x, yNbA) for x=0 . . . nPbs), where nPbs is the width and height of the prediction block of the current PU.

Furthermore, in the example adapted version of subclause 8.4.2 of JCTVC-N1003 shown above, the list of MPM candidates (i.e., candModeList) always includes the planar, DC, vertical (i.e., INTRA_ANGULAR26), horizontal (i.e., INTRA_ANGULAR10), and diagonal (i.e., INTRA_ANGULAR18) intra prediction modes if candIntraPredModeA is the same as candIntraPredModeB and candIntraPredModeA is planar or DC. However, in this example, if candIntraPredModeA is not planar and not DC, the list of MPM candidates includes candIntraPredModeA, the planar intra prediction, three angular intra prediction modes closest to candIntraPredModeA, and the DC intra prediction mode. The three angular intra prediction modes closest to candIntraPredModeA are calculated as:

2+((candIntraPredModeA−1)%32), (2+((candIntraPredModeA+29)%32), and

2+((candModeList[2]−1)%32)

In the formulae above, % denotes the modulo operation.

Similarly, in the example adapted version of subclause 8.4.2 of JCTVC-N1003 shown above, if candIntraPredModeA is not equal to candIntraPredModeB, the video coder may include in the list of MPM candidates, other angular intra prediction modes determined to be closest either candIntraPredModeA or candIntraPredModeB using the formulae shown in the example adapted version of subclause 8.4.2 of JCTVC-N1003 that include modulo operations.

As described above, in some examples of this disclosure, video encoder 20 and video decoder 30 may use more than 33 angular intra prediction modes. The following text describes examples changes to JCTVC-N1003 to implement 65 angular intra prediction modes.

Figure 9:
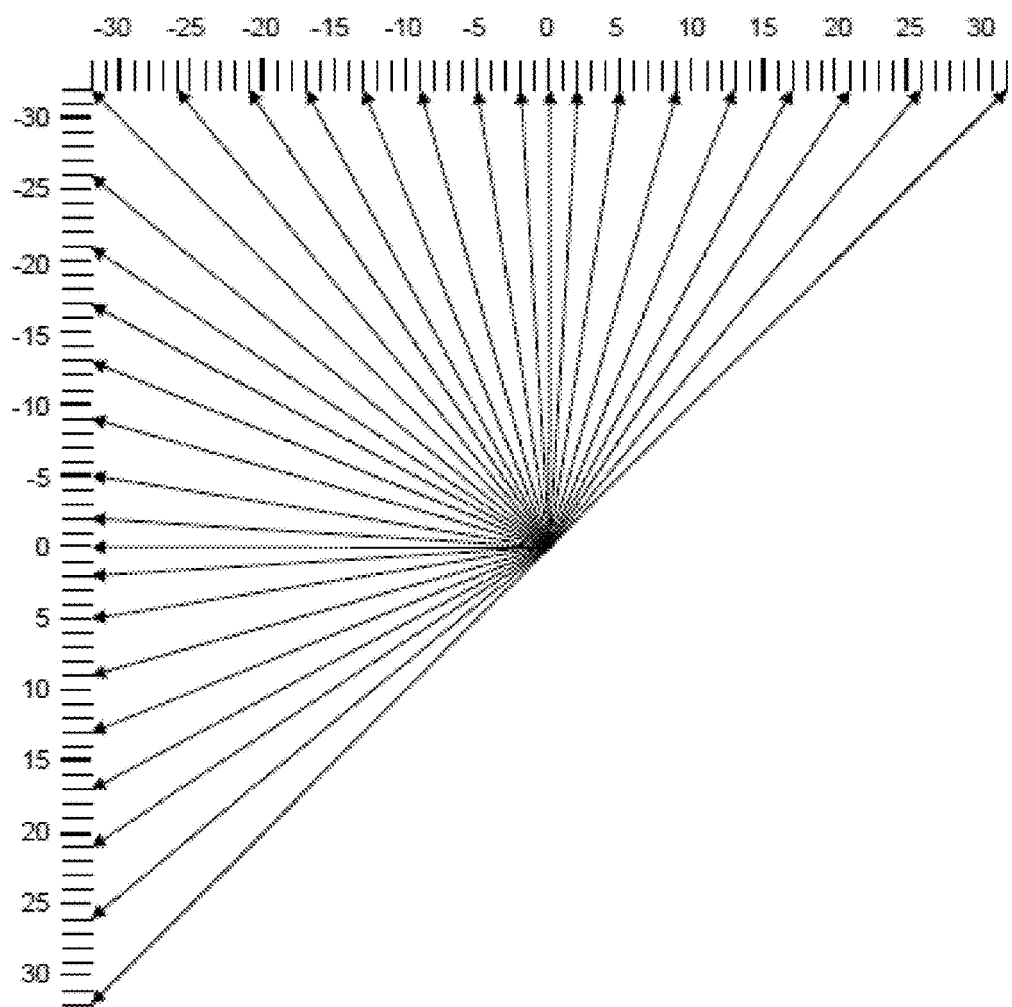
FIG. 9 is a conceptual diagram illustrating example intra prediction angles according to the techniques of this disclosure.

8.4.4.2.6 Specification of Intra Prediction Mode in the Range of INTRA_ANGULAR2 . . . INTRA_ANGULAR34
Inputs to this process are:
the intra prediction mode predModeIntra,
the neighbouring samples p[x][y], with x=−1, y=−1 . . . nTbS*2−1 and x=0 . . . nTbS*2−1, y=−1,
a variable nTbS specifying the transform block size,
a variable cIdx specifying the colour component of the current block.
Outputs of this process are the predicted samples predSamples[x][y], with x, y=0 . . . nTbS−1.
FIG. 8-2, which is FIG. 9 of this disclosure, illustrates the total 33 intra angles and Table 8-4 specifies the mapping table between predModeIntra and the angle parameter intraPredAngle.

Table 8-5 further specifies the mapping table between predModeIntra and the inverse angle parameter invAngle.

TABLE 8-5

Specification of invAngle

| predModeIntra | 11 | 12 | 13 | 14 | 15 | 16 | 17 | 18 |
|---|---|---|---|---|---|---|---|---|
| invAngle | −4096 | −1638 | −910 | −630 | −482 | −390 | −315 | −256 |
| predModeIntra | 19 | 20 | 21 | 22 | 23 | 24 | 25 | 26 |
| invAngle | −315 | −390 | −482 | −630 | −910 | −1638 | −4096 | — |

The values of the prediction samples predSamples[x][y], with x, y=0 . . . nTbS−1 are derived as follows:
If predModeIntra is equal or greater than 18, the following ordered steps apply:
1. The reference sample array ref[x] is specified as follows:
The following applies:

$$\text{ref}[x]=p[-1+x][-1], \text{ with } x=0 \ldots n\text{TbS} \quad (8\text{-}47)$$

If intraPredAngle is less than 0, the main reference sample array is extended as follows:
When (nTbS*intraPredAngle)>>5 is less than −1, $$\text{ref}[x]=p[-1][-1+((x*\text{invAngle}+128)>>8)], \text{ with } x=-1 \ldots (n\text{TbS}*\text{intraPredAngle})>>5 \quad (8\text{-}48)$$

Otherwise, $$\text{ref}[x]=p[-1+x][-1], \text{ with } x=n\text{TbS}+1 \ldots 2*n\text{TbS} \quad (8\text{-}49)$$

2. The values of the prediction samples predSamples[x][y], with x, y=0 . . . nTbS−1 are derived as follows:
a. The index variable iIdx and the multiplication factor iFact are derived as follows:

$$i\text{Idx}=((y+1)*\text{intraPredAngle})>>5 \quad (8\text{-}50)$$

$$i\text{Fact}=((y+1)*\text{intraPredAngle}) \& 31 \quad (8\text{-}51)$$

b. Depending on the value of iFact, the following applies:
If iFact is not equal to 0, the value of the prediction samples predSamples[x][y] is derived as follows:

$$\text{predSamples}[x][y]=((32-i\text{Fact})*\text{ref}[x+i\text{Idx}+1]+i\text{Fact}*\text{ref}[x+i\text{Idx}+2]+16)>>5 \quad (8\text{-}52)$$

TABLE 8-4

<dlt>TABLE 8-4 - Specification of intraPredAngle

| predMode Intra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 26 | 21 | 17 | 13 | 9 | 5 | 2 | 0 | −2 | −5 | −9 | −13 | −17 | −21 | −26 |
| predMode Intra | 18 | 19 | 20 | 21 | 22 | 23 | 24 | 25 | 26 | 27 | 28 | 29 | 30 | 31 | 32 | 33 | 34 |
| intraPredAngle | −32 | −26 | −21 | −17 | −13 | −9 | −5 | −2 | 0 | 2 | 5 | 9 | 13 | 17 | 21 | 26 | 32 |

</dlt>

<ins>TABLE 8-4 - Specification of intraPredAngle

| predMode Intra | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| intraPredAngle | — | — | 32 | 29 | 26 | 23 | 21 | 19 | 17 | 15 | 13 | 11 | 9 | 7 | 5 | 3 | 2 |
| predMode Intra | 17 | 18 | 19 | 20 | 21 | 22 | 23 | 24 | 25 | 26 | 27 | 28 | 29 | 30 | 31 | 32 | 33 |
| intraPredAngle | 1 | 0 | 1 | 2 | 3 | 5 | 7 | 9 | 11 | 13 | 15 | 17 | 19 | 21 | 23 | 26 | 29 |
| predMode Intra | 34 | 35 | 36 | 37 | 38 | 39 | 40 | 41 | 42 | 43 | 44 | 45 | 46 | 47 | 48 | 49 | 50 |
| intraPredAngle | 32 | 29 | 26 | 23 | 21 | 19 | 17 | 15 | 13 | 11 | 9 | 7 | 5 | 3 | 2 | 1 | 0 |
| predMode Intra | 51 | 52 | 53 | 54 | 55 | 56 | 57 | 58 | 59 | 60 | 61 | 62 | 63 | 64 | 65 | 66 | 67 |
| intraPredAngle | 1 | 2 | 3 | 5 | 7 | 9 | 11 | 13 | 15 | 17 | 19 | 21 | 23 | 26 | 29 | 32 | — |

</ins>

Otherwise, the value of the prediction samples predSamples[x][y] is derived as follows:

$$predSamples[x][y]=ref[x+iIdx+1] \quad (8\text{-}53)$$

c. When predModeIntra is equal to 26 (vertical), cIdx is equal to 0 and nTbS is less than 32, the following filtering applies with x=0, y=0 . . . nTbS−1:

$$predSamples[x][y]=Clip1_Y(p[x][-1]+((p[-1][y]-p[-1][-1])>>1)) \quad (8\text{-}54)$$

Otherwise (predModeIntra is less than 18), the following ordered steps apply:
1. The reference sample array ref[x] is specified as follows:
   The following applies:

$$ref[x]=p[-1][-1+x], \text{ with } x=0 \ldots nTbS \quad (8\text{-}55)$$

If intraPredAngle is less than 0, the main reference sample array is extended as follows:
When (nTbS*intraPredAngle)>>5 is less than −1, $$ref[x]=p[-1+((x*invAngle+128)>>8)][-1], \text{ with } x=-1 \ldots (nTbS*intraPredAngle)>>5 \quad (8\text{-}56)$$

Otherwise, $$ref[x]=p[-1][-1+x], \text{ with } x=nTbS+1 \ldots 2*nTbS \quad (8\text{-}57)$$

2. The values of the prediction samples predSamples[x][y], with x, y=0 . . . nTbS−1 are derived as follows:
   a. The index variable iIdx and the multiplication factor iFact are derived as follows:

$$iIdx=((x+1)*intraPredAngle)>>5 \quad (8\text{-}58)$$

$$iFact=((x+1)*intraPredAngle) \ \& \ 31 \quad (8\text{-}59)$$

b. Depending on the value of iFact, the following applies:
If iFact is not equal to 0, the value of the prediction samples predSamples[x][y] is derived as follows:

$$predSamples[x][y]=((32-iFact)*ref[y+iIdx+1]+iFact*ref[y+iIdx+2]+16)>>5 \quad (8\text{-}60)$$

Otherwise, the value of the prediction samples predSamples[x][y] is derived as follows:

$$predSamples[x][y]=ref[y+iIdx+1] \quad (8\text{-}61)$$

c. When predModeIntra is equal to 10 (horizontal), cIdx is equal to 0 and nTbS is less than 32, the following filtering applies with x=0 . . . nTbS−1, y=0:

$$predSamples[x][y]=Clip1_Y(p[-1][y]+((p[x][-1]-p[-1][-1])>>1)) \quad (8\text{-}62)$$

Table 8-5 further specifies the mapping table between predModeIntra and the inverse angle parameter invAngle.

TABLE 8-5

Specification of invAngle

| predModeIntra | 11 | 12 | 13 | 14 | 15 | 16 | 17 | 18 |
|---|---|---|---|---|---|---|---|---|
| invAngle | −4096 | −1638 | −910 | −630 | −482 | −390 | −315 | −256 |
| predModeIntra | 19 | 20 | 21 | 22 | 23 | 24 | 25 | 26 |
| invAngle | −315 | −390 | −482 | −630 | −910 | −1638 | −4096 | — |

The values of the prediction samples predSamples[x][y], with x, y=0 . . . nTbS−1 are derived as follows:

If predModeIntra is equal or greater than 18, the following ordered steps apply:

. . .

7.4.9.11 Residual Coding Semantics
For intra prediction, different scanning orders are used. The variable scanIdx specifies which scan order is used where scanIdx equal to 0 specifies an up-right diagonal scan order, scanIdx equal to 1 specifies a horizontal scan order, and scanIdx equal to 2 specifies a vertical scan order. The value of scanIdx is derived as follows:
   If CuPredMode[x0][y0] is equal to MODE_INTRA and one or more of the following conditions are true:
      log 2TrafoSize is equal to 2.
      log 2TrafoSize is equal to 3 and cIdx is equal to 0.
   predModeIntra is derived as follows:
      If cIdx is equal to 0, predModeIntra is set equal to IntraPredModeY[x0][y0].
      Otherwise, predModeIntra is set equal to IntraPredModeC.
   scanIdx is derived as follows:
      If predModeIntra is in the range of <dlt>6</dlt><ins>10</ins> to <dlt>14</dlt><ins>26</ins>, inclusive, scanIdx is set equal to 2.
      Otherwise if predModeIntra is in the range of <dlt>22</dlt><ins>42</ins> to <dlt>30</dlt><ins>58</ins>, inclusive, scanIdx is set equal to 1.
      Otherwise, scanIdx is set equal to 0.
   Otherwise, scanIdx is set equal to 0.
8.4.4.2.3 Filtering Process of Neighbouring Samples
Inputs to this process are:
   the neighbouring samples p[x][y], with x=−1, y=−1 . . . nTbS*2−1 and x=0 . . . nTbS*2−1, y=−1,
   a variable nTbS specifying the transform block size.
Outputs of this process are the filtered samples pF[x][y], with
x=−1, y=−1 . . . nTbS*2−1 and x=0 . . . nTbS*2−1, y=−1.
The variable filterFlag is derived as follows:
   If one or more of the following conditions are true, filterFlag is set equal to 0:
      predModeIntra is equal to INTRA_DC.
      nTbS is equal 4.
   Otherwise, the following applies:
      The variable minDistVerHor is set equal to Min(Abs(predModeIntra−26), Abs(predModeIntra−10)).
      The variable intraHorVerDistThres[nTbS] is specified in Table 8-3.
      The variable filterFlag is derived as follows:
         If minDistVerHor is greater than intraHorVerDistThres[nTbS], filterFlag is set equal to 1.
         Otherwise, filterFlag is set equal to 0.
7.4.9.11 Residual Coding Semantics
For intra prediction, different scanning orders are used. The variable scanIdx specifies which scan order is used where scanIdx equal to 0 specifies an up-right diagonal scan order, scanIdx equal to 1 specifies a horizontal scan order, and scanIdx equal to 2 specifies a vertical scan order. The value of scanIdx is derived as follows:
   If CuPredMode[x0][y0] is equal to MODE_INTRA and one or more of the following conditions are true:
      log 2TrafoSize is equal to 2.
      log 2TrafoSize is equal to 3 and cIdx is equal to 0.
   predModeIntra is derived as follows:
      If cIdx is equal to 0, predModeIntra is set equal to IntraPredModeY[x0][y0].
      Otherwise, predModeIntra is set equal to IntraPredModeC.

scanIdx is derived as follows:
    If predModeIntra is in the range of <dlt>6</dlt><ins>10</ins> to <dlt>14</dlt><ins>26</ins>, inclusive, scanIdx is set equal to 2.
    Otherwise if predModeIntra is in the range of <dlt>22</dlt><ins>42</ins> to <dlt>30</dlt><ins>58</ins>, inclusive, scanIdx is set equal to 1.
    Otherwise, scanIdx is set equal to 0.
Otherwise, scanIdx is set equal to 0.

8.4.4.2.3 Filtering Process of Neighbouring Samples
Inputs to this process are:
    the neighbouring samples p[x][y], with x=−1, y=−1 . . . nTbS*2−1 and x=0 . . . nTbS*2−1, y=−1,
    a variable nTbS specifying the transform block size.
Outputs of this process are the filtered samples pF[x][y], with x=−1, y=−1 . . . nTbS*2−1 and x=0 . . . nTbS*2−1, y=−1.
The variable filterFlag is derived as follows:
    If one or more of the following conditions are true, filterFlag is set equal to 0:
        predModeIntra is equal to INTRA_DC.
        nTbS is equal 4.
    Otherwise, the following applies:
        The variable minDistVerHor is set equal to Min(Abs(predModeIntra−26), Abs(predModeIntra−10)).
        The variable intraHorVerDistThres[nTbS] is specified in Table 8-3.
        The variable filterFlag is derived as follows:
            If minDistVerHor is greater than intraHorVerDistThres[nTbS], filterFlag is set equal to 1.
            Otherwise, filterFlag is set equal to 0.

TABLE 8-3

Specification of intraHorVerDistThres[nTbS] for various transform block sizes

|  | nTbS = 8 | nTbS = 16 | nTbS = 32 |
|---|---|---|---|
| intraHorVerDistThres[nTbS] | <dlt>7</dlt><ins>14</ins> | <dlt>1</dlt><ins>2</ins> | 0 |

When filterFlag is equal to 1, the following applies:
. . .

As described above, in accordance with some techniques of this disclosure, video encoder 20 and video decoder 30 may apply an N-tap intra interpolation filter. The following text describes example changes to JCTVC-N1003 to implement application of a 4-tap intra interpolation filter.
<Ins>x.x.x Intra Interpolation Filter Coefficients Initialization Process</Ins>
Output of this process is the array filterCubic[sFrac][pos]. The array index sFrac specifies the fractional position ranging from 0 to 31, pos specifies the filter coefficient for the $pos^{th}$ sample. The array filterCubic and filterGaussian is derived as follows:

```
<ins>filterCubic [32][4] = {
  {
    { 0, 256, 0, 0 }, // 0
    { −3, 252, 8, −1 }, // 1
    { −5, 247, 17, −3 }, // 2
    { −7, 242, 25, −4 }, // 3
    { −9, 236, 34, −5 }, // 4
    { −10, 230, 43, −7 }, // 5
```

```
    { −12, 224, 52, −8 }, // 6
    { −13, 217, 61, −9 }, // 7
    { −14, 210, 70, −10 }, // 8
    { −15, 203, 79, −11 }, // 9
    { −16, 195, 89, −12 }, // 10
    { −16, 187, 98, −13 }, // 11
    { −16, 179, 107, −14 }, // 12
    { −16, 170, 116, −14 }, // 13
    { −17, 162, 126, −15 }, // 14
    { −16, 153, 135, −16 }, // 15
    { −16, 144, 144, −16 }, // 16
  };
};
sigma = 0.9
for( i=0; i<17; i++ )
{
  for( c=0; c<4; c++ )
  {
    filterGaussian [b][i][c] = ( 256.0 * exp(−((c−delta)/sigma)$^2$) / sum + 0.5 );
  }
}
for( i=17; i<32; i++ )
{
  for( c=0; c<4; c++ )
  {
    filterCubic [b][i][c] = filterCubic [b][32−i][3−c];
    filterGaussian [b][i][c] = filterGaussian [b][32−i][3−c];
  }
}
</ins>
```

8.4.4.2.6 Specification of intra prediction mode in the range of INTRA_ANGULAR2 . . . INTRA_ANGULAR34
Inputs to this process are:
    the intra prediction mode predModeIntra,
    the neighbouring samples p[x][y], with x=−1, y=−1 . . . nTbS*2−1 and x=0 . . . nTbS*2−1, y=−1,
    a variable nTbS specifying the transform block size,
    a variable cIdx specifying the colour component of the current block.
Outputs of this process are the predicted samples predSamples[x][y], with x, y=0 . . . nTbS−1.
. . .
The values of the prediction samples predSamples[x][y], with x, y=0 . . . nTbS−1 are derived as follows:
    If predModeIntra is equal or greater than 18, the following ordered steps apply:
    3. The reference sample array ref[x] is specified as follows:
        The following applies:

ref[x]=p[−1+x][−1], with x=0 . . . nTbS          (8-47)

If intraPredAngle is less than 0, the main reference sample array is extended as follows:
            When (nTbS*intraPredAngle)>>5 is less than −1, ref[x]=p[−1][−1+((x*invAngle+128)>>8)], with x=−1 . . . (nTbS*intraPredAngle)>>5          (8-48)

Otherwise, ref[x]=p[−1+x][−1], with x=nTbS+1 . . . 2*nTbS          (8-49)

4. The values of the prediction samples predSamples[x][y], with x, y=0 . . . nTbS−1 are derived as follows:
        a. The index variable iIdx and the multiplication factor iFact are derived as follows:

iIdx=((y+1)*intraPredAngle)>>5          (8-50)

iFact=((y+1)*intraPredAngle) & 31          (8-51)

b. Depending on the value of iFact, the following applies:
   If iFact is not equal to 0, the value of the prediction samples predSamples[x][y] is derived as follows:

<dlt>predSamples[x][y]=((32−iFact)*ref[x+iIdx+1]+iFact*ref[x+iIdx+2]+16)>>5      (8-52)</dlt>

<ins>For p=0, . . . , 3, pF[p]=(cIdx==0 && nTbS<=8)?

filterCubic[iFact][p]:filterGaussian[iFact][p]

P[1]=ref[x+iIdx+1]

P[2]=ref[x+iIdx+2]

P[0]=(x==0)?ref[x+iIdx+1]:ref[x+iIdx]

P[3]=(x==nTbS−1)?ref[x+iIdx+2]:ref[x+iIdx+3]

predSamples[x][y]=(pF[0]*P[0]+pF[1]*P[1]+pF[2]*P[2]+pF[3]*P[3]+128)>>8      (8-52)</ins>

Otherwise, the value of the prediction samples predSamples[x][y] is derived as follows:

predSamples[x][y]=ref[x+iIdx+1]      (8-53)

c. When predModeIntra is equal to 26 (vertical), cIdx is equal to 0 and nTbS is less than 32, the following filtering applies with x=0, y=0 . . . nTbS−1:

predSamples[x][y]=Clip1$_Y$(p[x][−1]+((p[−1][y]−p[−1][−1])>>1))      (8-54)

Otherwise (predModeIntra is less than 18), the following ordered steps apply:
3. The reference sample array ref[x] is specified as follows:
   The following applies:

ref[x]=p[−1][−1+x], with x=0 . . . nTbS      (8-55)

If intraPredAngle is less than 0, the main reference sample array is extended as follows:
   When (nTbS*intraPredAngle)>>5 is less than −1, ref[x]=p[−1+((x*invAngle+128)>>8)][−1], with x=−1 . . . (nTbS*intraPredAngle)>>5      (8-56)

Otherwise, ref[x]=p[−1][−1+x], with x=nTbS+1 . . . 2*nTbS      (8-57)

4. The values of the prediction samples predSamples[x][y], with x, y=0 . . . nTbS−1 are derived as follows:
   d. The index variable iIdx and the multiplication factor iFact are derived as follows:

iIdx=((x+1)*intraPredAngle)>>5      (8-58)

iFact=((x+1)*intraPredAngle) & 31      (8-59)

e. Depending on the value of iFact, the following applies:
   If iFact is not equal to 0, the value of the prediction samples predSamples[x][y] is derived as follows:

predSamples[x][y]=((32−iFact)*ref[y+iIdx+1]+iFact*ref[y+iIdx+2]+16)>>5      (8-60)

Otherwise, the value of the prediction samples predSamples[x][y] is derived as follows:

predSamples[x][y]=ref[y+iIdx+1]      (8-61)

f. When predModeIntra is equal to 10 (horizontal), cIdx is equal to 0 and nTbS is less than 32, the following filtering applies with x=0 . . . nTbS−1, y=0:

predSamples[x][y]=Clip1$_Y$(p[−1][y]+((p[x][−1]−p[−1][−1])>>1))      (8-62)

Figure 10:
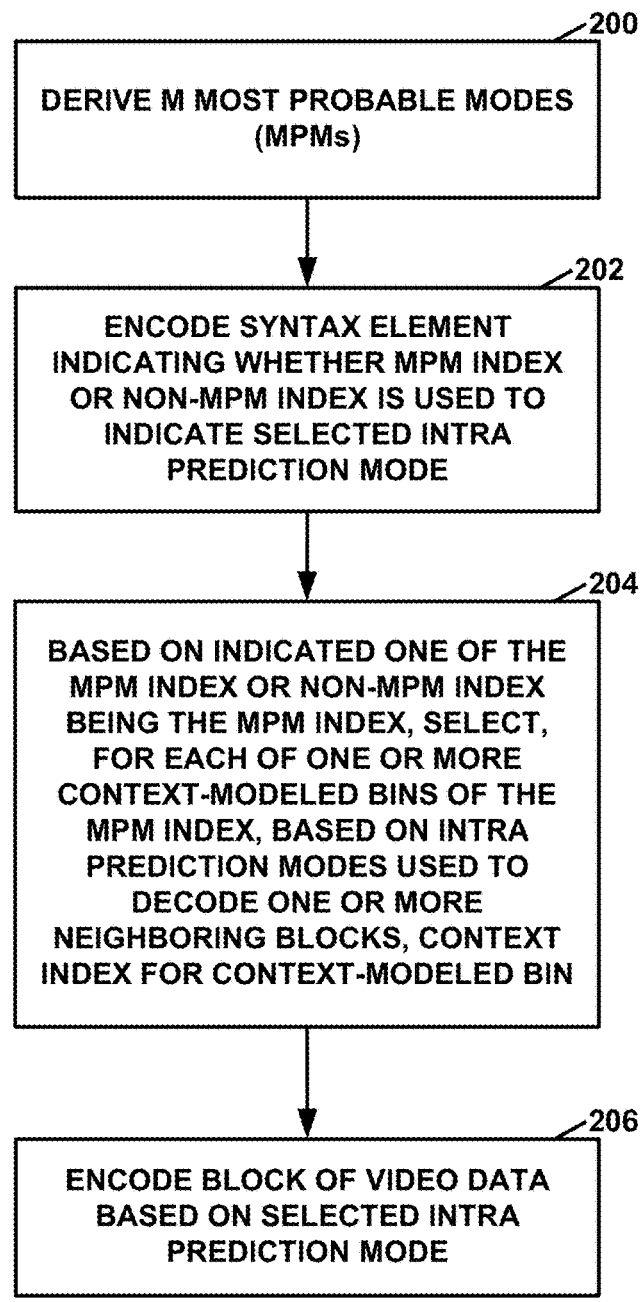
FIG. 10 is a flowchart illustrating a method of encoding video data in accordance with techniques of this disclosure.

FIG. 10 is a flowchart illustrating a method of encoding video data in accordance with techniques of this disclosure. FIG. 10 is described with reference to a generic video encoder. The generic video encoder may, for example, correspond to video encoder 20, although the techniques of this disclosure are not limited to any specific type of video encoder. The video encoder derives, from among a plurality of intra prediction modes, M MPMs for intra prediction of a block of video data (200). In one example, M may be greater than 3. The video encoder encodes a syntax element that indicates whether a MPM index or a non-MPM index is used to indicate a selected intra prediction mode (202) of the plurality of intra prediction modes for intra prediction of the block of video data. The MPM index indicates which of the M MPMs is the selected intra prediction mode. The non-MPM index indicates which of the plurality of intra prediction modes other than the M MPMs is the selected intra prediction mode. Based on the indicated one of the MPM index or the non-MPM index being the MPM index, the video encoder selects, for each of one or more context-modeled bins of the MPM index, based on intra prediction modes used to decode one or more neighboring blocks, a context index for the context-modeled bin (204). The video encoder encodes the block of video data based on the selected intra prediction mode (206).

Figure 11:
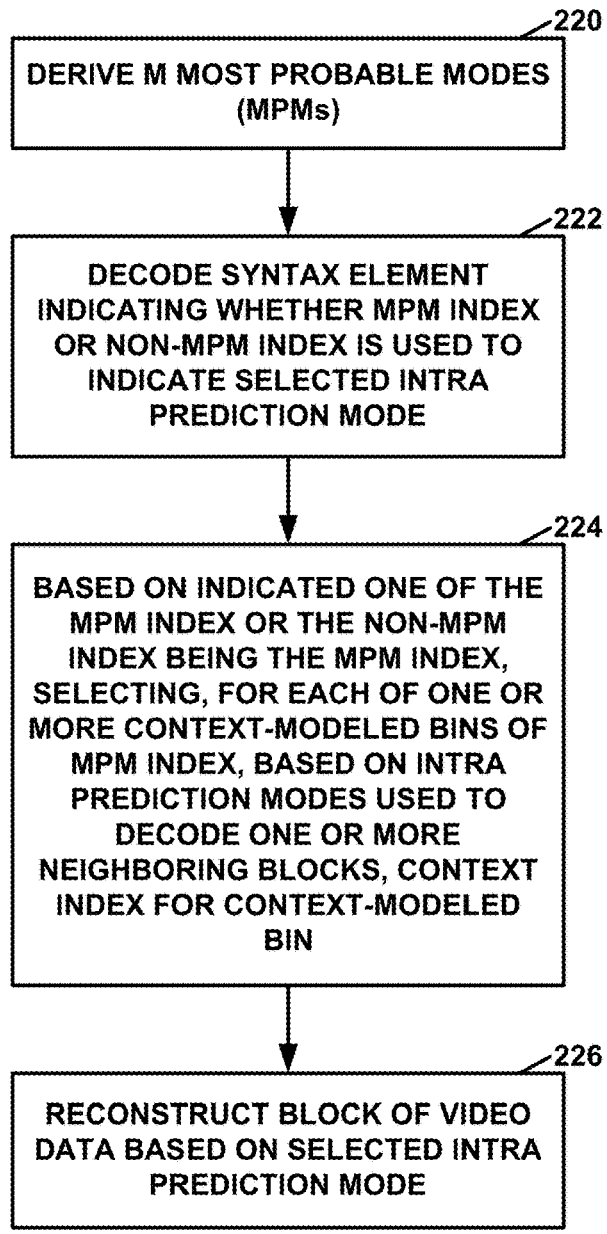
FIG. 11 is a flowchart illustrating a method of decoding video data in accordance with techniques of this disclosure.

FIG. 11 is a flowchart illustrating a method of decoding video data in accordance with techniques of this disclosure. FIG. 11 is described with reference to a generic video decoder. The generic video decoder may, for example, correspond to video decoder 30, although the techniques of this disclosure are not limited to any specific type of video decoder. The video decoder derives, from among a plurality of intra prediction modes, M MPMs for intra prediction of a block of video data (220). In one example, M may be greater than 3. The video decoder encodes a syntax element that indicates whether a MPM index or a non-MPM index is used to indicate a selected intra prediction mode (222) of the plurality of intra prediction modes for intra prediction of the block of video data. The MPM index indicates which of the M MPMs is the selected intra prediction mode. The non-MPM index indicates which of the plurality of intra prediction modes other than the M MPMs is the selected intra prediction mode. Based on the indicated one of the MPM index or the non-MPM index being the MPM index, the video decoder selects, for each of one or more context-modeled bins of the MPM index, based on intra prediction modes used to decode one or more neighboring blocks, a context index for the context-modeled bin (224). The video decoder reconstructs the block of video data based on the selected intra prediction mode (226).

Figure 12:
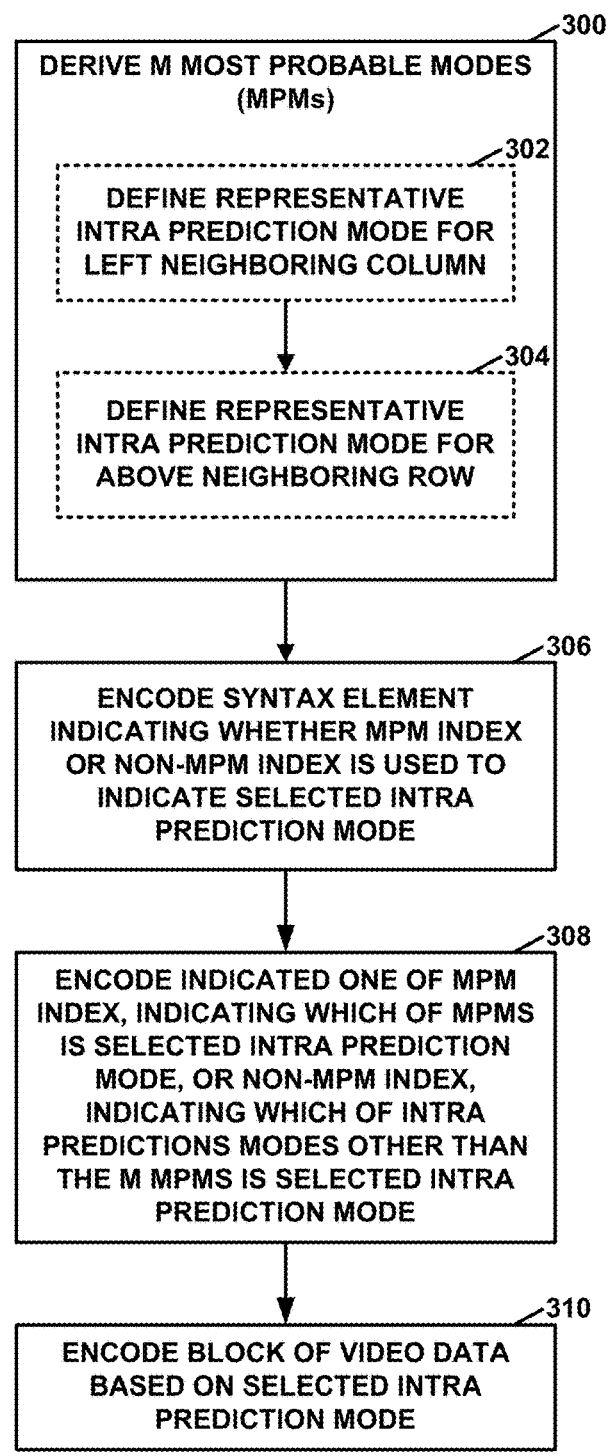
FIG. 12 is a flowchart illustrating a method of encoding video data in accordance with techniques of this disclosure.

FIG. 12 is a flowchart illustrating a method of encoding video data in accordance with techniques of this disclosure. FIG. 12 is described with reference to a generic video encoder. The generic video encoder may, for example, correspond to video encoder 20, although the techniques of this disclosure are not limited to any specific type of video encoder. The video encoder derives M MPMs (300) for intra prediction of the block of video data from among a plurality of intra prediction modes. In one example, M may be greater than 3 and the MPMs may include an MPM for a left neighboring column and an MPM for an above neighboring row. In one example, the M MPMs may be derived by at least one of (i) defining a representative intra prediction mode for the left neighboring column and using the representative intra prediction mode for the left neighboring column as the MPM for the left neighboring column (302), or (ii) defining a representative intra prediction mode for the above neighboring row and using the representative intra prediction mode for the above neighboring row as the MPM for the above neighboring row (304).

The video encoder may encode a syntax element that indicates whether a MPM index or a non-MPM index is used to indicate a selected intra prediction mode of the plurality of intra prediction modes for intra prediction of the block of video data (306). Additionally, the video encoder may encode the indicated one of the MPM index or the non-MPM index (308). The MPM index indicates which of the M MPMs is the selected intra prediction mode. The non-MPM index indicates which of the plurality of intra prediction modes other than the M MPM is the selected intra prediction mode. The video encoder may encode the block of video data based on the selected intra prediction mode (310).

Figure 13:
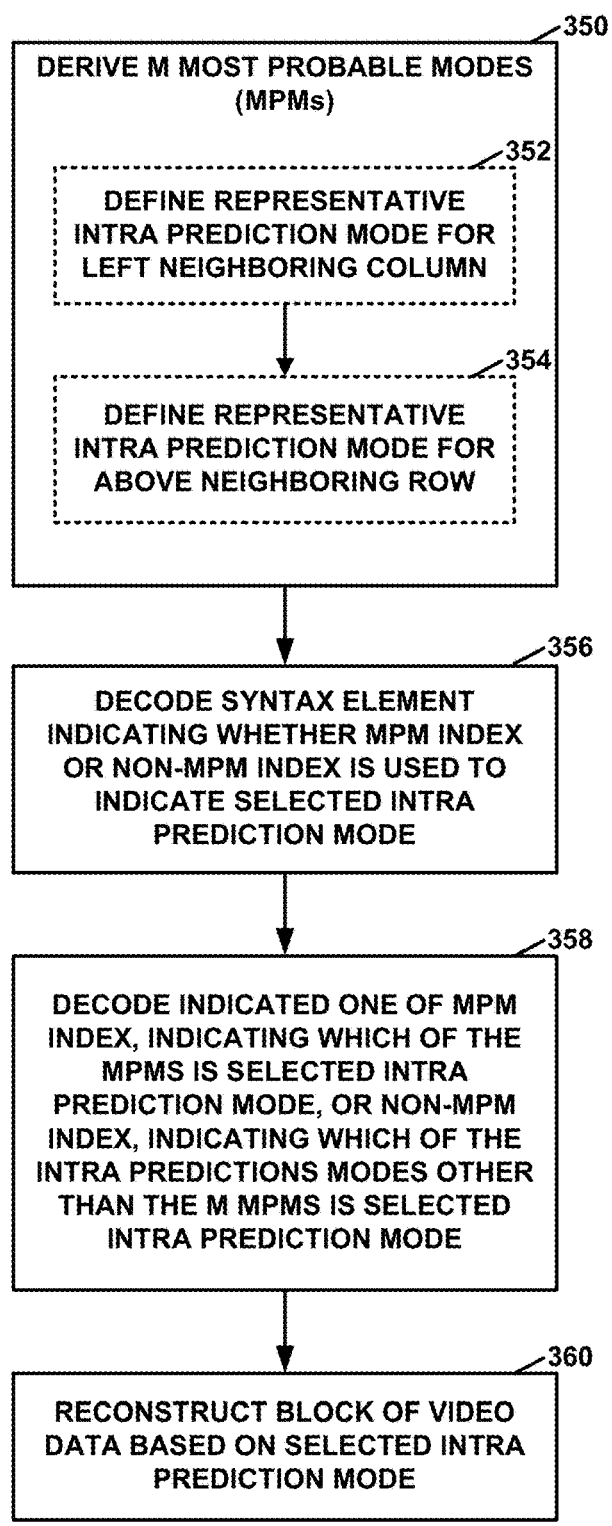
FIG. 13 is a flowchart illustrating a method of decoding video data in accordance with techniques of this disclosure.

FIG. 13 is a flowchart illustrating a method of decoding video data in accordance with techniques of this disclosure. FIG. 13 is described with reference to a generic video decoder. The generic video decoder may, for example, correspond to video decoder 30, although the techniques of this disclosure are not limited to any specific type of video decoder. The video decoder derives M MPMs for intra prediction of the block of video data from among a plurality of intra prediction modes (350). In one example, M may be greater than 3 and the MPMs may include an MPM for a left neighboring column and an MPM for an above neighboring row. The M most probable modes may be derived by at least one of (i) defining a representative intra prediction mode for the left neighboring column and using the representative intra prediction mode for the left neighboring column as the MPM for the left neighboring column (352), or (ii) defining a representative intra prediction mode for the above neighboring row and using the representative intra prediction mode for the above neighboring row as the MPM for the above neighboring row (354).

The video decoder may decode a syntax element that indicates whether a MPM index or a non-MPM index is used to indicate a selected intra prediction mode of the plurality of intra prediction modes for intra prediction of the block of video data (356). Additionally, the video decoder may decode the indicated one of the MPM index or the non-MPM index (358). The MPM index indicates which of the M MPMs is the selected intra prediction mode. The non-MPM index indicates which of the plurality of intra prediction modes other than the M MPM is the selected intra prediction mode. The video decoder may encode the block of video data based on the selected intra prediction mode (360).

Figure 14:
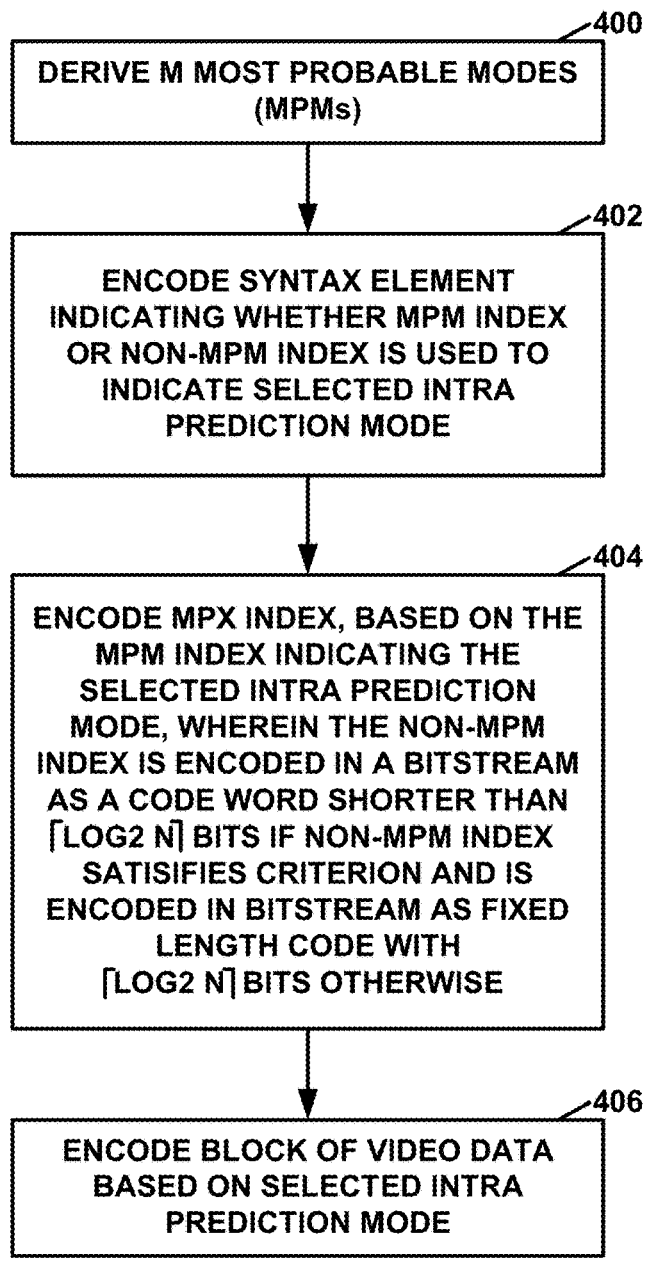
FIG. 14 is a flowchart illustrating a method of encoding video data in accordance with techniques of this disclosure.

FIG. 14 is a flowchart illustrating a method of encoding video data in accordance with techniques of this disclosure. FIG. 14 is described with reference to a generic video encoder. The generic video encoder may, for example, correspond to video encoder 20, although the techniques of this disclosure are not limited to any specific type of video encoder. The video encoder derives M MPMs (400) for intra prediction of the block of video data from among a plurality of intra prediction modes. In one example, M may be greater than 3. The video encoder encodes a syntax element that indicates whether a MPM index or a non-MPM index is used to indicate a selected intra prediction mode of the plurality of intra prediction modes for intra prediction of the block of video data (402). In the example of FIG. 12, the MPM index indicates which of the M MPMs is the selected intra prediction mode. Furthermore, the non-MPM index indicates which of the plurality of intra prediction modes other than the M MPMs is the selected intra prediction mode. Based on the MPM index indicating the selected intra prediction mode, the video encoder encodes the non-MPM index (404). In the example of FIG. 14, the non-MPM index is encoded in the bitstream as a code word shorter than $\lceil \log_2 N \rceil$ bits if the non-MPM index satisfies a criterion and is encoded in the bitstream as a fixed length code with $\lceil \log_2 N \rceil$ bits otherwise. In the example of FIG. 14, there is a total of N available values of the non-MPM index. The video encoder encodes the block of video data based on the selected intra prediction mode (406).

Figure 15:
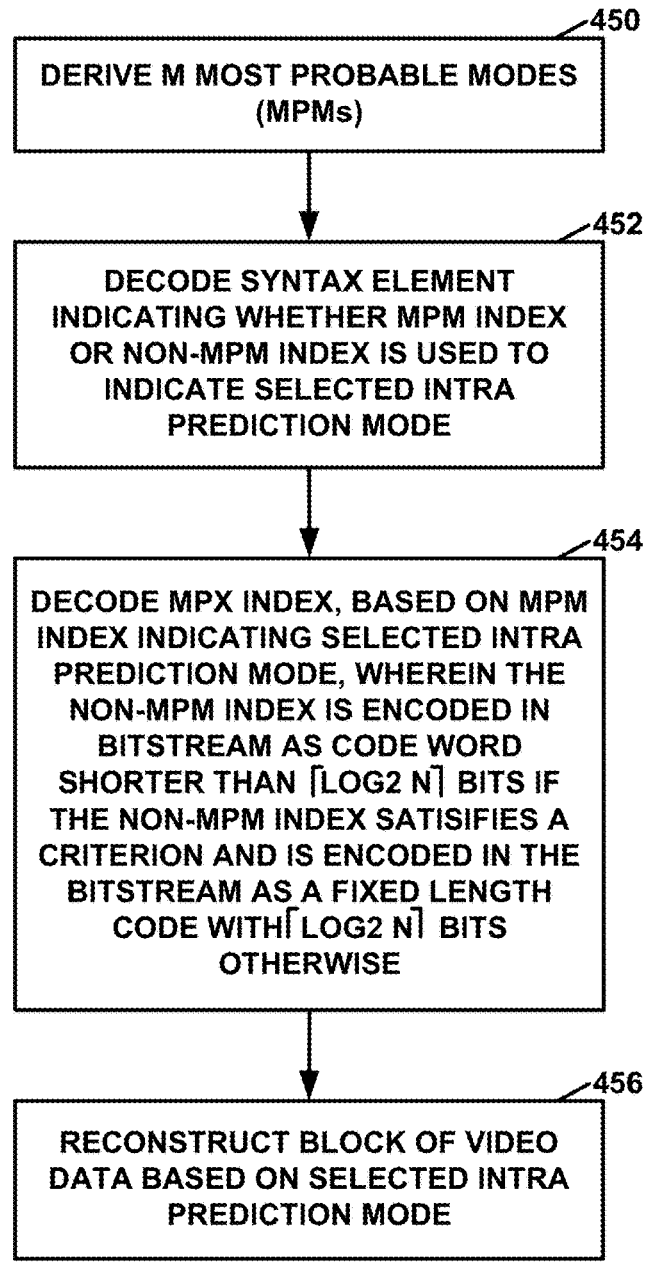
FIG. 15 is a flowchart illustrating a method of decoding video data in accordance with techniques of this disclosure.

FIG. 15 is a flowchart illustrating a method of decoding video data in accordance with techniques of this disclosure. FIG. 15 is described with reference to a generic video decoder. The generic video decoder may, for example, correspond to video decoder 30, although the techniques of this disclosure are not limited to any specific type of video decoder. The video decoder derives M MPMs for intra prediction of the block of video data from among a plurality of intra prediction modes (450). In one example, M may be greater than 3. The video decoder decodes a syntax element that indicates whether a MPM index or a non-MPM index is used to indicate a selected intra prediction mode of the plurality of intra prediction modes for intra prediction of the block of video data (452). The MPM index indicates which of the M MPMs is the selected intra prediction mode. The non-MPM index indicates which of the plurality of intra prediction modes other than the M MPMs is the selected intra prediction mode. Based on the MPM index indicating the selected intra prediction mode, the video decoder decodes the non-MPM index (454). In the example of FIG. 15, the non-MPM index is encoded in the bitstream as a code word shorter than $\lceil \log_2 N \rceil$ bits if the non-MPM index satisfies a criterion and is encoded in the bitstream as a fixed length code with $\lceil \log_2 N \rceil$ bits otherwise. In the example of FIG. 15, there may be a total of N available values of the non-MPM index. Furthermore, in the example of FIG. 15, the video decoder reconstructs the block of video data based on the selected intra prediction mode (456).

Figure 16:
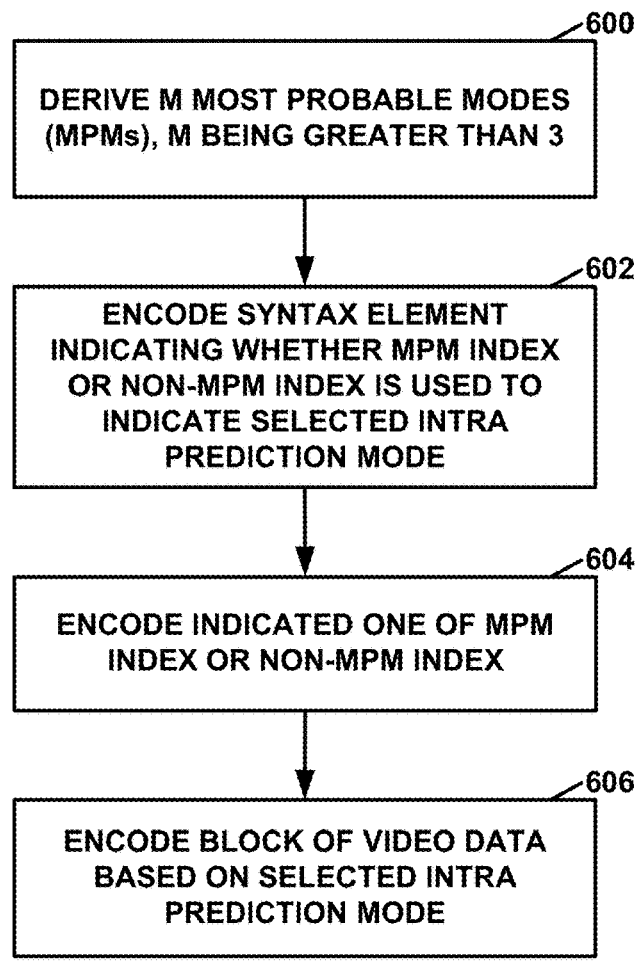
FIG. 16 is a flowchart illustrating a method of encoding video data in accordance with techniques of this disclosure.

FIG. 16 is a flowchart illustrating a method of encoding video data in accordance with techniques of this disclosure. FIG. 16 is described with reference to a generic video encoder. The generic video encoder may, for example, correspond to video encoder 20, although the techniques of this disclosure are not limited to any specific type of video encoder. The video encoder derives M MPMs for intra prediction of the block of video data from among a plurality of intra prediction modes (600). In the example of FIG. 16, M is greater than 3. The video encoder encodes a syntax element that indicates whether a MPM index or a non-MPM index is used to indicate a selected intra prediction mode of the plurality of intra prediction modes for intra prediction of the block of video data (602). The video encoder encodes the indicated one of the MPM index or the non-MPM index (604). The MPM index indicates which of the M MPMs is the selected intra prediction mode. The non-MPM index indicates which of the plurality of intra prediction modes other than the M MPMs is the selected intra prediction mode. The video encoder encodes the block of video data based on the selected intra prediction mode (606).

Figure 17:
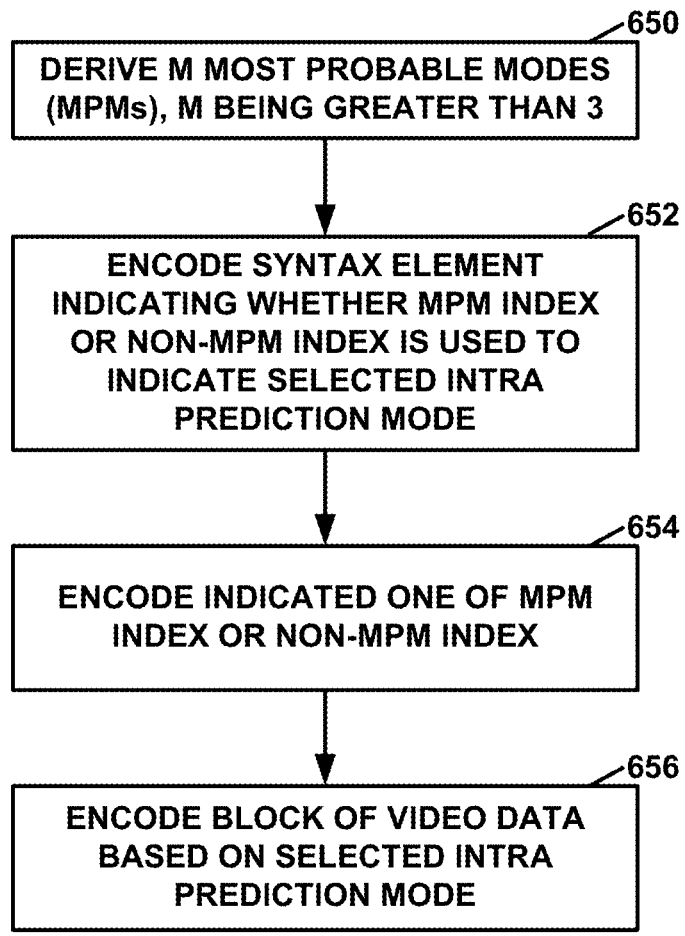
FIG. 17 is a flowchart illustrating a method of decoding video data in accordance with techniques of this disclosure.

FIG. 17 is a flowchart illustrating a method of decoding video data in accordance with techniques of this disclosure. FIG. 17 is described with reference to a generic video decoder. The generic video decoder may, for example, correspond to video decoder 30, although the techniques of this disclosure are not limited to any specific type of video decoder. The video decoder derives M MPMs for intra prediction of the block of video data from among a plurality of intra prediction modes (650). In the example of FIG. 17, M is greater than 3. The video decoder decodes a syntax element that indicates whether a MPM index or a non-MPM index is used to indicate a selected intra prediction mode of the plurality of intra prediction modes for intra prediction of the block of video data (652). The video decoder decodes the indicated one of the MPM index or the non-MPM index (654). The MPM index indicates which of the M MPMs is the selected intra prediction mode. The non-MPM index indicates which of the plurality of intra prediction modes other than the M MPMs is the selected intra prediction mode (654). The video decoder reconstructs the block of video data based on the selected intra prediction mode (656).

Figure 18:
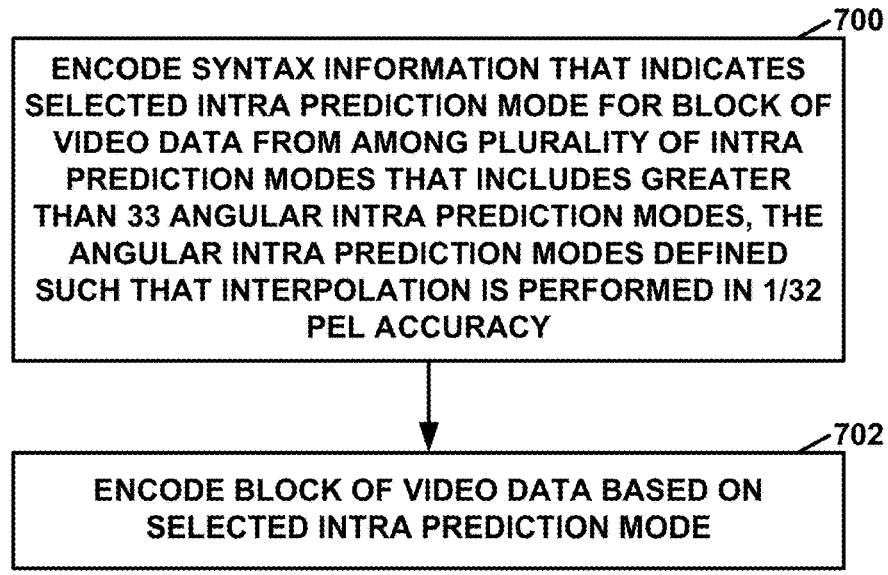
FIG. 18 is a flowchart illustrating a method of encoding video data in accordance with techniques of this disclosure.

FIG. 18 is a flowchart illustrating a method of encoding video data in accordance with techniques of this disclosure. FIG. 18 is described with reference to a generic video encoder. The generic video encoder may, for example, correspond to video encoder 20, although the techniques of this disclosure are not limited to any specific type of video encoder. The video encoder encodes syntax information that indicates a selected intra prediction mode for the block of video data from among a plurality of intra prediction modes (700). In one example, the plurality of intra prediction modes may include greater than 33 angular intra prediction modes. The angular intra prediction modes may be defined such that interpolation is performed in 1/32 pel accuracy. The video encoder encodes the block of video data based on the selected intra prediction mode (702).

Figure 19:
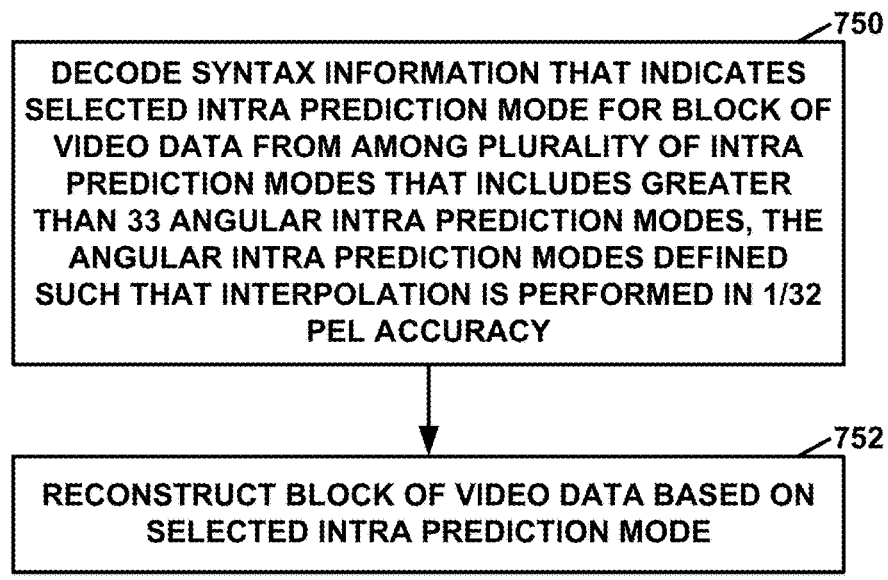
FIG. 19 is a flowchart illustrating a method of decoding video data in accordance with techniques of this disclosure.

FIG. 19 is a flowchart illustrating a method of decoding video data in accordance with techniques of this disclosure. FIG. 19 is described with reference to a generic video decoder. The generic video decoder may, for example, correspond to video decoder 30, although the techniques of this disclosure are not limited to any specific type of video decoder. The video decoder decodes syntax information that indicates a selected intra prediction mode for the block of video data from among a plurality of intra prediction modes (750). In one example, the plurality of intra prediction modes may include greater than 33 angular intra prediction modes, and the angular intra prediction modes may be defined such that interpolation is performed in 1/32 pel accuracy. The video decoder may reconstruct the block of video data based on the selected intra prediction mode (752).

Figure 20:
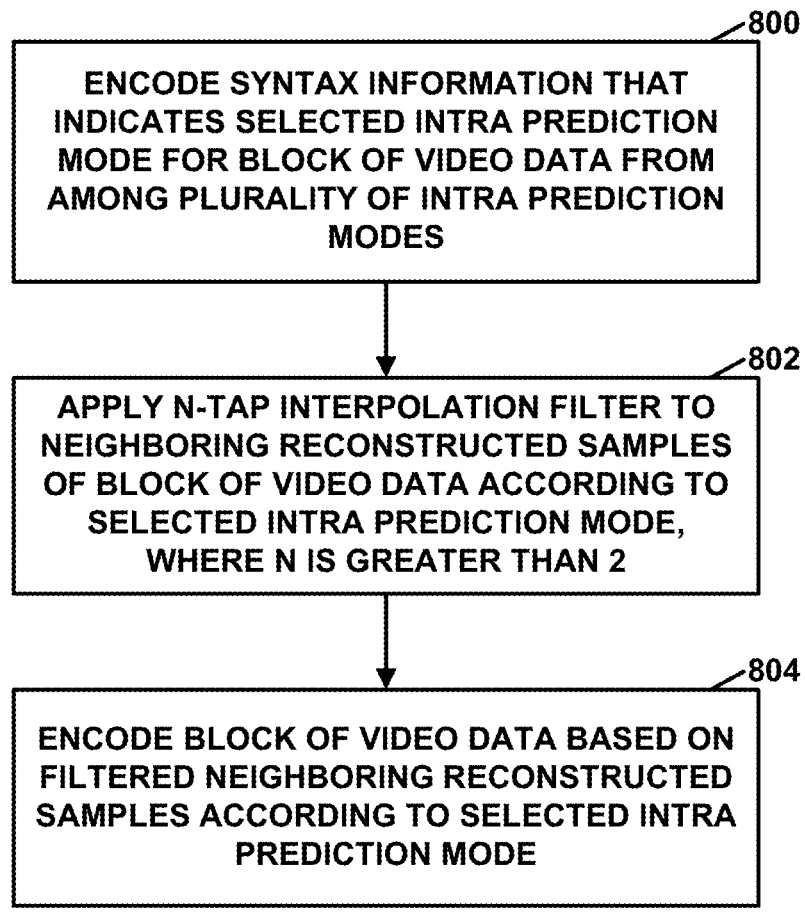
FIG. 20 is a flowchart illustrating a method of encoding video data in accordance with techniques of this disclosure.

FIG. 20 is a flowchart illustrating a method of encoding video data in accordance with techniques of this disclosure. FIG. 20 is described with reference to a generic video encoder. The generic video encoder may, for example, correspond to video encoder 20, although the techniques of this disclosure are not limited to any specific type of video encoder. The video encoder encodes syntax information that indicates a selected intra prediction mode for the block of video data from among a plurality of intra prediction modes (800). The video encoder applies an N-tap intra interpolation filter to neighboring reconstructed samples of the block of video data according to the selected intra prediction mode (802). In one example, N may be greater than 2. The video encoder may encode the block of video data based on the filtered neighboring reconstructed samples according to the selected intra prediction mode (804).

Figure 21:
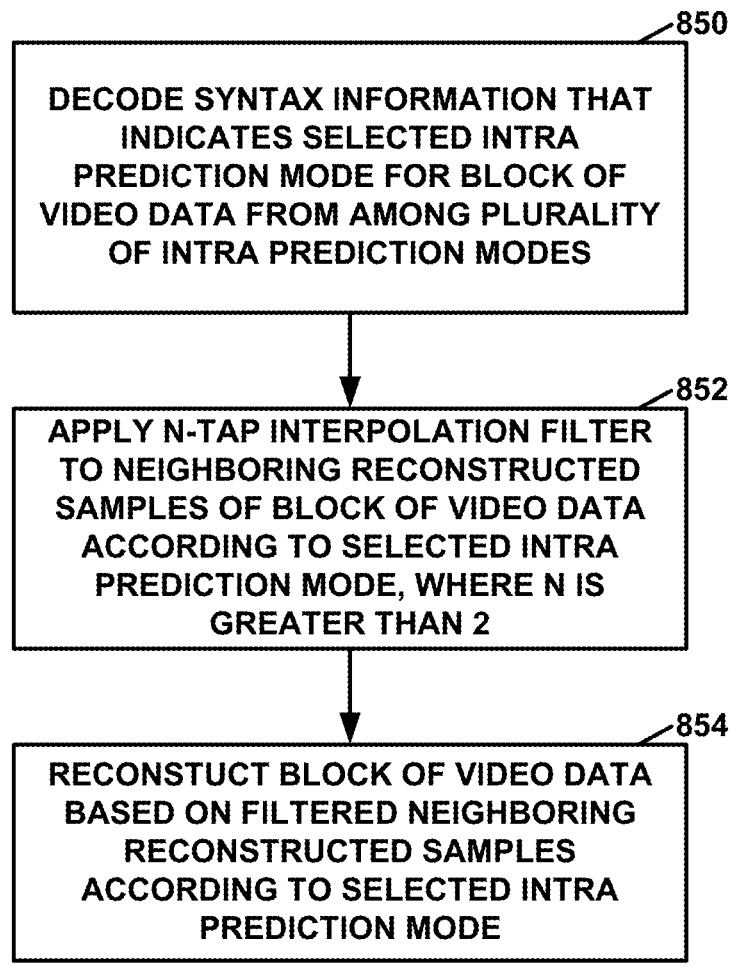
FIG. 21 is a flowchart illustrating a method of decoding video data in accordance with techniques of this disclosure.

FIG. 21 is a flowchart illustrating a method of decoding video data in accordance with techniques of this disclosure. FIG. 21 is described with reference to a generic video decoder. The generic video decoder may, for example, correspond to video decoder 30, although the techniques of this disclosure are not limited to any specific type of video decoder. The video decoder decodes syntax information that indicates a selected intra prediction mode for a block of video data from among a plurality of intra prediction modes (850). The video decoder applies an N-tap intra interpolation filter to neighboring reconstructed samples of the block of video data according to the selected intra prediction mode (852). In one example, N may be greater than 2. The video decoder may reconstruct the block of video data based on the filtered neighboring reconstructed samples according to the selected intra prediction mode (854).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of decoding a block of video data, the method comprising:
deriving M most probable modes (MPMs) for intra prediction of the block of video data from among a plurality of intra prediction modes, wherein M is greater than 3, the MPMs including an MPM for a left neighboring column and an MPM for an above neighboring row, and deriving the M most probable modes comprises at least one of:
(i) counting intra prediction modes used in smallest-prediction unit (PU) sized units within a plurality of neighboring blocks in the left neighboring column;
defining a representative intra prediction mode for the left neighboring column as a most frequent of the intra prediction modes used in the smallest-PU sized units within the plurality of neighboring blocks in the left neighboring column based at least in part on the counting of the intra prediction modes used in the smallest-PU sized units within the plurality of neighboring blocks in the left neighboring column; and
using the defined representative intra prediction mode for the left neighboring column as the MPM for the left neighboring column, or
(ii) counting intra prediction modes used in smallest-PU sized units within a plurality of neighboring blocks in the above neighboring row;
defining a representative intra prediction mode for the above neighboring row as a most frequent of the intra prediction modes used in the smallest-PU sized units within the plurality of neighboring blocks in the above neighboring row based at least in part on the counting of the intra prediction modes used in the smallest-PU sized units within the plurality of neighboring blocks in the above neighboring row; and
using the defined representative intra prediction mode for the above neighboring row as the MPM for the above neighboring row;
decoding a syntax element that indicates whether a MPM index or a non-MPM index is used to indicate a selected intra prediction mode of the plurality of intra prediction modes for intra prediction of the block of video data;
decoding the indicated one of the most probable mode index or the non-most probable mode index, wherein the most probable mode index indicates which of the MMPMs is the selected intra prediction mode, and wherein the non-MPM index indicates which of the plurality of intra prediction modes other than the MMPMs is the selected intra prediction mode; and reconstructing the block of video data based on the selected intra prediction mode.

2. The method of claim 1, wherein:
the block of video data is a current coding unit (CU) in a current picture of the video data,
the selected intra prediction mode for the block of video data is a selected intra prediction mode for a current PU of the current CU, and
reconstructing the block of video data comprises:
generating a predictive block for the current PU using the selected intra prediction mode; and
reconstructing the current CU using residual values by adding samples of the predictive blocks of PUs of the CU to corresponding samples of transform blocks of transform units (TUs) of the current CU.

3. A method of encoding a block of video data, the method comprising:
deriving M most probable modes (MPMs) for intra prediction of the block of video data from among a plurality of intra prediction modes, wherein M is greater than 3, the MPMs including an MPM for a left neighboring column and an MPM for an above neighboring row, and deriving the M most probable modes comprises at least one of:
(i) counting intra prediction modes used in smallest-prediction unit (PU) sized units within a plurality of neighboring blocks in the left neighboring column;
defining a representative intra prediction mode for the left neighboring column as a most frequent of the intra prediction modes used in the smallest-PU sized units within the plurality of neighboring blocks in the left neighboring column based at least in part on the counting of the intra prediction modes used in the smallest-PU sized units within the plurality of neighboring blocks in the left neighboring column; and
using the defined representative intra prediction mode for the left neighboring column as the MPM for the left neighboring column, or
(ii) counting intra prediction modes used in smallest-PU sized units within a plurality of neighboring blocks in the above neighboring row;
defining a representative intra prediction mode for the above neighboring row as a most frequent of the intra prediction modes used in the smallest-PU sized units within the plurality of neighboring blocks in the above neighboring row based at least in part on the counting of the intra prediction modes used in the smallest-PU sized units within the plurality of neighboring blocks in the above neighboring row; and
using the defined representative intra prediction mode for the above neighboring row as the MPM for the above neighboring row;
encoding a syntax element that indicates whether a MPM index or a non-MPM index is used to indicate a selected intra prediction mode of the plurality of intra prediction modes for intra prediction of the block of video data;
encoding the indicated one of the MPM index or the non-MPM index, wherein the MPM index indicates which of the MMPMs is the selected intra prediction mode, and wherein the non-MPM index indicates which of the plurality of intra prediction modes other than the M MPMs is the selected intra prediction mode; and
encoding the block of video data based on the selected intra prediction mode.

4. The method of claim 3, wherein:
the block of video data is a current coding unit (CU) in a current picture of the video data,
the selected intra prediction mode for the block of video data is a selected intra prediction mode for a current PU of the current CU, and
encoding the block of video data based on the selected intra prediction mode comprises:
generating, based on the selected intra prediction mode of the PU, a predictive block for the PU; and
generating residual data that represents pixel differences between the current CU and the predictive block.

5. A device for decoding a block of video data, the device comprising:
a memory configured to store the video data; and
one or more processors configured to:
derive M most probable modes (MPMs) for intra prediction of the block of video data from among a plurality of intra prediction modes, wherein M is greater than 3, the MPMs including an MPM for a left neighboring column and an MPM for an above neighboring row, and the one or more processors are configured such that, as part of deriving the M most probable modes, the one or more processors perform at least one of:
(i) counting intra prediction modes used in smallest-prediction unit (PU) sized units within a plurality of neighboring blocks in the left neighboring column;
defining a representative intra prediction mode for the left neighboring column as a most frequent of the intra prediction modes used in the smallest-PU sized units within the plurality of neighboring blocks in the left neighboring column based at least in part on the counting of the intra prediction modes used in the smallest-PU sized units within the plurality of neighboring blocks in the left neighboring column; and
using the defined representative intra prediction mode for the left neighboring column as the MPM for the left neighboring column, or
(ii) counting intra prediction modes used in smallest-PU sized units within a plurality of neighboring blocks in the above neighboring row;
defining a representative intra prediction mode for the above neighboring row as a most frequent of the intra prediction modes used in the smallest-PU sized units within the plurality of neighboring blocks in the above neighboring row based at least in part on the counting of the intra prediction modes used in the smallest-PU sized units within the plurality of neighboring blocks in the above neighboring row; and
using the defined representative intra prediction mode for the above neighboring row as the MPM for the above neighboring row;
decode a syntax element that indicates whether a MPM index or a non-MPM index is used to indicate a selected intra prediction mode of the plurality of intra prediction modes for intra prediction of the block of video data;
decode the indicated one of the most probable mode index or the non-most probable mode index, wherein the most probable mode index indicates which of the M MPMs is the selected intra prediction mode, and wherein the non-MPM index indicates which of the plurality of intra prediction modes other than the MMPMs is the selected intra prediction mode; and
reconstruct the block of video data based on the selected intra prediction mode.

6. The device of claim 5, wherein:
the block of video data is a current coding unit (CU) in a current picture of the video data,
the selected intra prediction mode for the block of video data is a selected intra prediction mode for a current PU of the current CU, and
the one or more processors are configured such that, as part of reconstructing the block of video data, the one or more processors:
generate a predictive block for the current PU using the selected intra prediction mode; and
reconstruct the current CU using residual values by adding samples of the predictive blocks of PUs of the CU to corresponding samples of transform blocks of transform units (TUs) of the current CU.

7. A device for encoding a block of video data, the device comprising:
a memory configured to store the video data; and
one or more processors configured to:
derive M most probable modes (MPMs) for intra prediction of the block of video data from among a plurality of intra prediction modes, wherein M is greater than 3, the MPMs including an MPM for a left neighboring column and an MPM for an above neighboring row, and the one or more processors are configured such that, as part of deriving the M most probable modes, the one or more processors perform at least one of:
(i) counting intra prediction modes used in smallest-prediction unit (PU) sized units within a plurality of neighboring blocks in the left neighboring column;
defining a representative intra prediction mode for the left neighboring column as a most frequent of the intra prediction modes used in the smallest-PU sized units within the plurality of neighboring blocks in the left neighboring column based at least in part on the counting of the intra prediction modes used in the smallest-PU sized units within the plurality of neighboring blocks in the left neighboring column; and
using the defined representative intra prediction mode for the left neighboring column as the MPM for the left neighboring column, or
(ii) counting intra prediction modes used in smallest-PU sized units within a plurality of neighboring blocks in the above neighboring row;
defining a representative intra prediction mode for the above neighboring row as a most frequent of the intra prediction modes used in the plurality of neighboring blocks in the above neighboring row based at least in part on the counting of the intra prediction modes used in the smallest-PU sized units within the plurality of neighboring blocks in the above neighboring row; and
using the defined representative intra prediction mode for the above neighboring row as the MPM for the above neighboring row;
encode a syntax element that indicates whether a MPM index or a non-MPM index is used to indicate a selected intra prediction mode of the plurality of intra prediction modes for intra prediction of the block of video data;

encode the indicated one of the most probable mode index or the non-most probable mode index, wherein the most probable mode index indicates which of the M MPMs is the selected intra prediction mode, and wherein the non-MPM index indicates which of the plurality of intra prediction modes other than the MMPMs is the selected intra prediction mode; and encode the block of video data based on the selected intra prediction mode.

8. The device of claim 7, wherein:

the block of video data is a current coding unit (CU) in a current picture of the video data, the selected intra prediction mode for the block of video data is a selected intra prediction mode for a current PU of the current CU, and the one or more processors are configured such that, as part of reconstructing the block of video data, the one or more processors:

generate a predictive block for the current PU using the selected intra prediction mode; and reconstruct the current CU using residual values by adding samples of the predictive blocks of PUs of the CU to corresponding samples of transform blocks of transform units (TUs) of the current CU.

9. A video coding device for coding a block of video data, comprising:

means for deriving M most probable modes (MPMs) for intra prediction of the block of video data from among a plurality of intra prediction modes, wherein M is greater than 3, the MPMs including an MPM for a left neighboring column and an MPM for an above neighboring row, and the means for deriving the M most probable modes comprises at least one of:

(i) means for counting intra prediction modes used in smallest-prediction unit (PU) sized units within a plurality of neighboring blocks in the left neighboring column;

means for defining a representative intra prediction mode for the left neighboring column as a most frequent of the intra prediction modes used in the plurality of neighboring blocks in the left neighboring column based at least in part on the counting of the intra prediction modes used in the smallest-PU sized units within the plurality of neighboring blocks in the left neighboring column; and means for using the defined representative intra prediction mode for the left neighboring column as the MPM for the left neighboring column, or (ii) means for counting intra prediction modes used in smallest PU sized units within a plurality of neighboring blocks in the above neighboring row;

means for defining a representative intra prediction mode for the above neighboring row as a most frequent of the intra prediction modes used in the smallest-PU sized units within the plurality of neighboring blocks in the above neighboring row based at least in part on the counting of the intra prediction modes used in the smallest-PU sized units within the plurality of neighboring blocks in the above neighboring row; and means for using the defined representative intra prediction mode for the above neighboring row as the MPM for the above neighboring row;

means for coding a syntax element that indicates whether a MPM index or a non-MPM index is used to indicate a selected intra prediction mode of the plurality of intra prediction modes for intra prediction of the block of video data;

means for coding the indicated one of the MPM index or the non-MPM index, wherein the MPM index indicates which of the M MPMs is the selected intra prediction mode, and wherein the non-MPM index indicates which of the plurality of intra prediction modes other than the M MPM is the selected intra prediction mode; and means for coding the block of video data based on the selected intra prediction mode.

10. A non-transitory computer readable medium that stores instructions that, when executed by one or more processors cause the one or more processors to:

derive M most probable modes (MPMs) for intra prediction of a block of video data from among a plurality of intra prediction modes, wherein M is greater than 3, the MPMs including an MPM for a left neighboring column and an MPM for an above neighboring row, and as part of causing the one or more processors to derive the M most probable modes, the instructions, when executed by the one or more processors, cause the one or more processors to perform at least one of:

(i) counting intra prediction modes used in smallest-prediction unit (PU) sized units within a plurality of neighboring blocks in the left neighboring column;

defining a representative intra prediction mode for the left neighboring column as a most frequent of the intra prediction modes used in the smallest-PU sized units within the plurality of neighboring blocks in the left neighboring column based at least in part on the counting of the intra prediction modes used in the smallest-PU sized units within the plurality of neighboring blocks in the left neighboring column;

and using the defined representative intra prediction mode for the left neighboring column as the MPM for the left neighboring column, or (ii) counting intra prediction modes used in smallest-PU sized units within a plurality of neighboring blocks in the above neighboring row;

defining a representative intra prediction mode for the above neighboring row as a most frequent of the intra prediction modes used in the smallest-PU sized units within the plurality of neighboring blocks in the above neighboring row based at least in part on the counting of the intra prediction modes used in the smallest-PU sized units within the plurality of neighboring blocks in the above neighboring row; and using the defined representative intra prediction mode for the above neighboring row as the MPM for the above neighboring row;

code a syntax element that indicates whether a MPM index or a non-MPM index is used to indicate a selected intra prediction mode of the plurality of intra prediction modes for intra prediction of a block of video data;

code the indicated one of the MPM index or the non-MPM index, wherein the MPM index indicates which of the MMPMs is the selected intra prediction mode, and wherein the non-MPM index indicates which of the plurality of intra prediction modes other than the M MPM is the selected intra prediction mode; and code the block of video data based on the selected intra prediction mode.

* * * * *